(12) United States Patent
Minano et al.

(10) Patent No.: US 8,393,777 B2
(45) Date of Patent: Mar. 12, 2013

(54) ETENDUE-CONSERVING ILLUMINATION-OPTICS FOR BACKLIGHTS AND FRONTLIGHTS

(75) Inventors: Juan Carlos Minano, Madrid (ES); Pablo Benitez, Madrid (ES); Julio Cesar Chaves, Madrid (ES); Waqidi Falicoff, Newport Beach, CA (US); William A. Parkyn, Lomita, CA (US)

(73) Assignee: Light Prescriptions Innovators, LLC, Altadena, CA (US)

( * ) Notice: Subject to any disclaimer, the term of this patent is extended or adjusted under 35 U.S.C. 154(b) by 1093 days.

(21) Appl. No.: 11/997,143

(22) PCT Filed: Jul. 28, 2006

(86) PCT No.: PCT/US2006/029671
§ 371 (c)(1),
(2), (4) Date: Dec. 21, 2008

(87) PCT Pub. No.: WO2007/014371
PCT Pub. Date: Feb. 1, 2007

(65) Prior Publication Data
US 2009/0167651 A1    Jul. 2, 2009

Related U.S. Application Data

(60) Provisional application No. 60/703,644, filed on Jul. 28, 2005, provisional application No. 60/729,188, filed on Oct. 21, 2005.

(51) Int. Cl.
*F21V 8/00* (2006.01)
(52) U.S. Cl. .......... 362/622; 362/84; 362/628; 362/614; 362/616; 362/610; 362/97.1; 362/561
(58) Field of Classification Search .................. 362/622, 362/84, 628, 614, 616, 610, 97.1, 97.2, 561; 385/50, 146, 147, 901; 345/84
See application file for complete search history.

(56) References Cited

U.S. PATENT DOCUMENTS
(Continued)

FOREIGN PATENT DOCUMENTS
| DE | 2552278 | 5/1977 |
|---|---|---|
| EP | 0450560 A2 | 10/1991 |

(Continued)

OTHER PUBLICATIONS

International Search Report, PCT/US03/38024, W004051223, mail date Nov. 10, 2004.

(Continued)

*Primary Examiner* — Sharon Payne
(74) *Attorney, Agent, or Firm* — Drinker Biddle & Reath LLP

(57) ABSTRACT

Some embodiments provide luminance-preserving non-imaging backlights that comprise a luminous source emitting light, an input port that receives the light, an injector and a beam-expanding ejector. The injector includes the input port and a larger output port with a profile that expands away from the input port acting via total internal reflection to keep x-y angular width of the source image inversely proportional to its luminance. The injector is defined by a surface of revolution with an axis on the source and a swept profile that is a first portion of an upper half of a CPC tilted by its acceptance angle. The beam-expanding ejector comprising a planar waveguide optically coupled to the output port of the injector. The ejector includes a smooth upper surface, and a reflective lower surface comprising microstructured facets that refract upwardly reflected light into a collimated direction common to the facets.

18 Claims, 36 Drawing Sheets

U.S. PATENT DOCUMENTS

| | | | |
|---|---|---|---|
| 1,399,973 A | 12/1921 | Limpert |
| 2,254,961 A | 9/1941 | Harris |
| 2,362,176 A | 11/1944 | Swanson |
| 2,908,197 A | 10/1959 | Wells et al. |
| 3,746,853 A | 7/1973 | Kosman et al. |
| 3,760,237 A | 9/1973 | Jaffe |
| 3,774,021 A | 11/1973 | Johnson |
| 3,938,177 A | 2/1976 | Hansen et al. |
| 4,114,592 A | 9/1978 | Winston |
| 4,188,111 A | 2/1980 | Marvin |
| 4,192,994 A | 3/1980 | Kastner |
| 4,211,955 A | 7/1980 | Ray |
| 4,337,759 A | 7/1982 | Popovich et al. |
| 4,342,908 A | 8/1982 | Henningsen et al. |
| 4,384,769 A | 5/1983 | Brei et al. |
| 4,388,673 A | 6/1983 | Maglica |
| 4,464,707 A | 8/1984 | Forrest |
| 4,638,343 A | 1/1987 | Althaus et al. |
| 4,675,725 A | 6/1987 | Parkyn |
| 4,698,730 A | 10/1987 | Sakai et al. |
| 4,709,312 A | 11/1987 | Heinisch et al. |
| 4,727,289 A | 2/1988 | Uchida |
| 4,727,457 A | 2/1988 | Thillays |
| 4,868,723 A | 9/1989 | Kobayashi |
| 4,920,404 A | 4/1990 | Shrimali et al. |
| 5,005,108 A | 4/1991 | Pristash et al. |
| 5,055,892 A | 10/1991 | Gardner et al. |
| 5,140,220 A | 8/1992 | Hasegawa |
| 5,302,778 A | 4/1994 | Maurinus |
| 5,335,157 A | 8/1994 | Lyons |
| 5,343,330 A | 8/1994 | Hoffman et al. |
| 5,404,282 A | 4/1995 | Klinke et al. |
| 5,404,869 A | 4/1995 | Parkyn, Jr. et al. |
| 5,434,754 A | 7/1995 | Li et al. |
| 5,438,453 A | 8/1995 | Kuga |
| 5,452,190 A | 9/1995 | Priesemuth |
| 5,453,877 A | 9/1995 | Gerbe et al. |
| 5,471,371 A | 11/1995 | Koppolu et al. |
| 5,506,929 A * | 4/1996 | Tai et al. ............. 385/146 |
| 5,528,474 A | 6/1996 | Roney et al. |
| 5,557,471 A | 9/1996 | Fernandez |
| 5,577,492 A | 11/1996 | Parkyn et al. |
| 5,580,142 A | 12/1996 | Kurematsu et al. |
| 5,600,487 A | 2/1997 | Kiyomoto et al. |
| 5,608,290 A | 3/1997 | Hutchisson et al. |
| 5,613,769 A | 3/1997 | Parkyn et al. |
| 5,640,483 A * | 6/1997 | Lin ................. 385/146 |
| 5,655,830 A | 8/1997 | Ruskouski |
| 5,655,832 A | 8/1997 | Pelka et al. |
| 5,671,994 A * | 9/1997 | Tai et al. ............. 362/603 |
| 5,676,453 A | 10/1997 | Parkyn, Jr. et al. |
| 5,699,186 A | 12/1997 | Richard |
| 5,757,557 A | 5/1998 | Medvedev |
| 5,777,433 A | 7/1998 | Lester et al. |
| 5,806,955 A | 9/1998 | Parkyn, Jr. et al. |
| 5,813,743 A | 9/1998 | Naka |
| 5,839,812 A | 11/1998 | Ge et al. |
| 5,865,529 A | 2/1999 | Yan |
| 5,894,195 A | 4/1999 | McDermott |
| 5,894,196 A | 4/1999 | McDermott |
| 5,897,201 A | 4/1999 | Simon |
| 5,898,267 A | 4/1999 | McDermott |
| 5,898,809 A | 4/1999 | Taboada et al. |
| 5,924,788 A | 7/1999 | Parkyn |
| 5,926,320 A | 7/1999 | Parkyn et al. |
| 5,966,250 A | 10/1999 | Shimizu |
| 6,019,493 A | 2/2000 | Kuo et al. |
| 6,023,550 A | 2/2000 | Benoit |
| 6,030,099 A | 2/2000 | McDermott |
| 6,044,196 A | 3/2000 | Winston et al. |
| 6,048,083 A | 4/2000 | McDermott |
| 6,055,108 A | 4/2000 | Dreyer |
| 6,097,549 A | 8/2000 | Jenkins et al. |
| 6,139,163 A | 10/2000 | Satoh et al. |
| 6,139,166 A | 10/2000 | Marshall et al. |
| 6,166,860 A | 12/2000 | Medvedev et al. |
| 6,166,866 A | 12/2000 | Kimura et al. |
| 6,177,761 B1 | 1/2001 | Pelka et al. |
| 6,181,476 B1 | 1/2001 | Medvedev |
| 6,201,229 B1 | 3/2001 | Tawa et al. |
| 6,222,623 B1 | 4/2001 | Wetherell |
| 6,252,636 B1 | 6/2001 | Bartlett |
| 6,268,963 B1 | 7/2001 | Akiyama |
| 6,273,596 B1 | 8/2001 | Parkyn |
| 6,282,821 B1 | 9/2001 | Freier |
| 6,296,376 B1 | 10/2001 | Kondo et al. |
| 6,301,064 B1 | 10/2001 | Araki et al. |
| 6,350,041 B1 | 2/2002 | Tarsa et al. |
| 6,356,700 B1 | 3/2002 | Strobel |
| 6,361,190 B1 | 3/2002 | McDermott |
| 6,450,661 B1 | 9/2002 | Okumura |
| 6,473,554 B1 | 10/2002 | Popovich et al. |
| 6,483,976 B2 | 11/2002 | Shie et al. |
| 6,488,392 B1 | 12/2002 | Lu |
| 6,502,964 B1 | 1/2003 | Simon |
| 6,504,301 B1 | 1/2003 | Lowery |
| 6,536,923 B1 | 3/2003 | Merz |
| 6,547,400 B1 | 4/2003 | Yokoyama |
| 6,547,423 B2 | 4/2003 | Marshall et al. |
| 6,554,455 B2 | 4/2003 | Perlo et al. |
| 6,560,038 B1 | 5/2003 | Parkyn et al. |
| 6,578,989 B2 | 6/2003 | Osumi et al. |
| 6,580,228 B1 | 6/2003 | Chen et al. |
| 6,582,103 B1 | 6/2003 | Popovich et al. |
| 6,598,998 B2 | 7/2003 | West et al. |
| 6,603,243 B2 | 8/2003 | Parkyn et al. |
| 6,607,286 B2 | 8/2003 | West et al. |
| 6,616,287 B2 | 9/2003 | Sekita et al. |
| 6,621,222 B1 | 9/2003 | Hong |
| 6,637,924 B2 | 10/2003 | Pelka et al. |
| 6,639,733 B2 | 10/2003 | Minano et al. |
| 6,641,287 B2 | 11/2003 | Suehiro |
| 6,646,813 B2 | 11/2003 | Falicoff |
| 6,647,199 B1 | 11/2003 | Pelka et al. |
| 6,649,939 B1 | 11/2003 | Wirth |
| 6,668,820 B2 | 12/2003 | Cohen et al. |
| 6,674,096 B2 | 1/2004 | Sommers |
| 6,679,621 B2 | 1/2004 | West et al. |
| 6,688,758 B2 | 2/2004 | Thibault |
| 6,691,701 B1 | 2/2004 | Roth |
| 6,692,136 B2 | 2/2004 | Marshall et al. |
| 6,729,746 B2 | 5/2004 | Suehiro et al. |
| 6,744,196 B1 | 6/2004 | Jeon |
| 6,769,772 B2 | 8/2004 | Roddy et al. |
| 6,773,143 B2 | 8/2004 | Chang |
| 6,783,269 B2 | 8/2004 | Pashley et al. |
| 6,786,625 B2 | 9/2004 | Wesson |
| 6,796,698 B2 | 9/2004 | Sommers et al. |
| 6,803,607 B1 | 10/2004 | Chan et al. |
| 6,811,277 B2 | 11/2004 | Amano |
| 6,830,359 B2 | 12/2004 | Fleury |
| 6,846,100 B2 | 1/2005 | Imazeki et al. |
| 6,848,820 B2 | 2/2005 | Natsume |
| 6,863,402 B2 | 3/2005 | Roddy et al. |
| 6,879,354 B1 | 4/2005 | Sawayama et al. |
| 6,882,379 B1 | 4/2005 | Yokoyama et al. |
| 6,886,962 B2 | 5/2005 | Suehiro |
| 6,896,381 B2 | 5/2005 | Benitez |
| 6,924,943 B2 | 8/2005 | Minano et al. |
| 6,926,435 B2 | 8/2005 | Li |
| 6,948,836 B2 | 9/2005 | Ishida et al. |
| 6,953,265 B2 | 10/2005 | Suehiro et al. |
| 6,967,779 B2 | 11/2005 | Fadel et al. |
| 6,988,813 B2 | 1/2006 | Hoelen et al. |
| 6,997,587 B2 | 2/2006 | Albou |
| 7,001,058 B2 | 2/2006 | Inditsky |
| 7,006,306 B2 | 2/2006 | Falicoff et al. |
| 7,021,797 B2 | 4/2006 | Minano |
| 7,042,655 B2 | 5/2006 | Sun |
| 7,144,121 B2 | 12/2006 | Minano et al. |
| 7,152,985 B2 | 12/2006 | Benitez et al. |
| 7,181,378 B2 | 2/2007 | Benitez et al. |
| 7,192,173 B2 | 3/2007 | Vaughnn |
| 7,213,960 B2 * | 5/2007 | Yoo ............................. 362/634 |
| 7,262,912 B2 | 8/2007 | Wood |
| 7,329,029 B2 | 2/2008 | Chaves et al. |
| 7,347,599 B2 | 3/2008 | Minano et al. |

| | | | |
|---|---|---|---|
| 7,377,671 B2 | 5/2008 | Minano et al. | |
| 7,425,407 B1 | 9/2008 | Wood et al. | |
| 7,460,985 B2 | 12/2008 | Benitez et al. | |
| 7,502,169 B2 | 3/2009 | Wood | |
| 7,520,641 B2 | 4/2009 | Minano et al. | |
| 2002/0034012 A1 | 3/2002 | Santoro et al. | |
| 2002/0041499 A1 | 4/2002 | Pedersen | |
| 2002/0080623 A1 | 6/2002 | Pashley | |
| 2002/0135560 A1 | 9/2002 | Akaoka | |
| 2002/0163808 A1 | 11/2002 | West et al. | |
| 2002/0185651 A1 | 12/2002 | Sommers | |
| 2003/0002281 A1 | 1/2003 | Suehiro | |
| 2003/0076034 A1 | 4/2003 | Marshall | |
| 2003/0147232 A1 | 8/2003 | Kraft | |
| 2004/0080938 A1 | 4/2004 | Holman | |
| 2004/0125614 A1 | 7/2004 | Ishida et al. | |
| 2004/0130907 A1 | 7/2004 | Albou | |
| 2004/0145910 A1 | 7/2004 | Lisowski | |
| 2004/0184256 A1* | 9/2004 | Blanchard | 362/31 |
| 2004/0190304 A1 | 9/2004 | Sugimoto et al. | |
| 2004/0218390 A1 | 11/2004 | Holman et al. | |
| 2004/0228131 A1 | 11/2004 | Minano et al. | |
| 2004/0246697 A1 | 12/2004 | Yamashita et al. | |
| 2005/0024744 A1 | 2/2005 | Falicoff | |
| 2005/0086032 A1 | 4/2005 | Benitez et al. | |
| 2005/0088758 A1 | 4/2005 | Minano et al. | |
| 2005/0117125 A1 | 6/2005 | Minano et al. | |
| 2005/0129358 A1 | 6/2005 | Minano et al. | |
| 2005/0135095 A1 | 6/2005 | Geissler | |
| 2005/0169002 A1 | 8/2005 | Steen et al. | |
| 2005/0180145 A1 | 8/2005 | Okuwaki | |
| 2005/0200812 A1 | 9/2005 | Sakata et al. | |
| 2005/0219464 A1 | 10/2005 | Yamasaki et al. | |
| 2005/0225988 A1 | 10/2005 | Chavez | |
| 2005/0243570 A1 | 11/2005 | Chaves et al. | |
| 2006/0067078 A1 | 3/2006 | Beeson et al. | |
| 2007/0036512 A1 | 2/2007 | Winston et al. | |
| 2009/0180276 A1 | 7/2009 | Benitez et al. | |

FOREIGN PATENT DOCUMENTS

| | | | |
|---|---|---|---|
| EP | 0962694 | | 12/1999 |
| EP | 1434277 | | 6/2004 |
| EP | 1434277 A1 | | 6/2004 |
| ES | 2142752 | | 4/2000 |
| ES | 2142752 | | 12/2000 |
| GB | 2205969 | * | 12/1988 |
| JP | S52-075198 A | | 6/1977 |
| JP | H02-007348 A | | 1/1990 |
| JP | H07-248495 A | | 9/1995 |
| JP | H11-231321 A | | 8/1999 |
| JP | 2000-221505 A | | 8/2000 |
| JP | 2001-236809 A | | 8/2001 |
| JP | 2002-042537 A | | 2/2002 |
| JP | 2002-196152 A | | 7/2002 |
| JP | 2003-059323 A | | 2/2003 |
| JP | 2004-146269 A | | 5/2004 |
| JP | 2004-158336 A | | 6/2004 |
| RU | 1282051 A1 | | 1/1987 |
| WO | WO-9909349 | | 2/1999 |
| WO | WO-9913266 | | 3/1999 |
| WO | WO-99/15826 | | 4/1999 |
| WO | WO-0107828 A1 | | 2/2001 |
| WO | WO-01/40702 | | 6/2001 |
| WO | WO-03/071352 | | 8/2003 |
| WO | WO-03066374 A2 | | 8/2003 |
| WO | WO-03066374 A3 | | 8/2003 |
| WO | WO-2004007241 A2 | | 1/2004 |
| WO | WO2007/104028 | | 9/2007 |

OTHER PUBLICATIONS

International Search Report, PCT/US04/16313, WO04104925, mail date Mar. 21, 2005.
International Search Report, PCT/US04/24450, WO05012952, mail date Aug. 3, 2005.
International Search Report, PCT/US04/38584, WO2005050710, mail date Jul. 18, 2005.
International Search Report, PCT/US03/38024, WO2004051321, mail date Nov. 10, 2004 Jul. 29, 2004.
International Search Report, PCT/US04/14938, WO04104642, mail date Mar. 1, 2005.
Office Action from U.S. Appl. No. 10/622,874 dated Jun. 3, 2004.
Office action from U.S. Appl. No. 10/461,557 dated Nov. 24, 2004.
Office action from U.S. Appl. No. 10/726,130 dated Jan. 17, 2006.
Office action from U.S. Appl. No. 10/726,130 dated Mar. 24, 2005.
Office action from U.S. Appl. No. 10/269,479 dated Mar. 29, 2004.
Notice of Allowance from U.S. Appl. No. 10/269,479 dated Mar. 29, 2004.
Notice of Allowance from U.S. Appl. No. 10/622,874 dated Jan. 4, 2005.
Notice of Allowance from U.S. Appl. No. 10/461,557 dated Aug. 8, 2005.
Notice of Allowance from U.S. Appl. No. 10/726,130 dated Sep. 7, 2005.
Office Action from U.S. Appl. No. 10/772,088 dated Apr. 24, 2007.
Interview Summary from U.S. Appl. No. 10/772,088 dated Apr. 5, 2007.
Advisory Action from U.S. Appl. No. 10/772,088 dated Dec. 6, 2006.
Office Action from U.S. Appl. No. 10/772,088 dated Sep. 8, 2006.
Office Action from U.S. Appl. No. 10/772,088 dated Feb. 24, 2006.
Office Action from U.S. Appl. No. 10/772,088 dated Dec. 16, 2005.
Notice of Allowance from U.S. Appl. No. 10/779,259 dated Oct. 10, 2006.
Office action from U.S. Appl. No. 10/779,259 dated Feb. 24, 2006.
Office action from U.S. Appl. No. 10/779,259 dated Oct. 6, 2005.
Notice of Allowance from U.S. Appl. No. 10/816,228 dated Sep. 14, 2007.
Office action from U.S. Appl. No. 10/816,228 dated Jun. 12, 2007.
Office action from U.S. Appl. No. 10/816,228 dated Apr. 5, 2007.
Office action from U.S. Appl. No. 10/816,228 dated Dec. 13, 2006.
Notice of Allowance from U.S. Appl. No. 10/903,925 dated Aug. 5, 2005.
Office action from U.S. Appl. No. 10/903,925 dated Jan. 25, 2005.
Office action from U.S. Appl. No. 10/901,919 dated May 8, 2007.
Notice of Allowance from U.S. Appl. No. 10/880,386 dated Jul. 14, 2006.
Office action from U.S. Appl. No. 10/880,386 dated Feb. 28, 2006.
Notice of Allowance from U.S. Appl. No. 10/880,386 dated Mar. 1, 2005.
Notice of Allowance from U.S. Appl. No. 10/987,182 dated Apr. 25, 2006.
Office action from U.S. Appl. No. 10/987,182 dated Nov. 3, 2005.
Office action from U.S. Appl. No. 10/987,182 dated Jun. 3, 2005.
Notice of Allowance from U.S. Appl. No. 11/040,506 dated Sep. 20, 2007.
Office action from U.S. Appl. No. 11/040,506 dated Apr. 9, 2007.
Interview Summary from U.S. Appl. No. 10/269,479 dated Mar. 18, 2004.
Office Action from U.S. Appl. No. 10/772,088 dated Sep. 27, 2007.
Office Action from U.S. Appl. No. 10/816,228 dated Mar. 31, 2006.
International Search Report and Written Opinion, PCT/US04/24330, mail date Jun. 27, 2006.
Office Action from U.S. Appl. No. 10/901,919 dated Oct. 19, 2007.
International Search Report, PCT/US2004/003054, WO2004070433A3, mail date Aug. 19, 2004.
International Preliminary Report on Patentability, PCTUS0438584, mail date Aug. 21, 2006, 1-4.
International Search Report and Written Opinion, PCT/US2004/38162, mail date Nov. 30, 2005.
International Search Report, PCT/US03/32076, W02004034100, mail date Apr. 20, 2004.
Office Action from U.S. Appl. No. 10/851,471 dated Mar. 27, 2006.
Office Action from U.S. Appl. No. 10/461,557 dated Feb. 10, 2005.
Interview Summary from U.S. Appl. No. 10/461,557 dated Aug. 5, 2005.
Notice of Allowability from U.S. Appl. No. 10/461,557 dated Jan. 10, 2006.
PCT International Search Report and Written Opinion of the International Searching Authority from PCTUS0763522 dated Jan. 30, 2008.
International Search Report and Written Opinion of the International Searching Authority for PCT/US07/073530 mailed Mar. 7, 2008.

International Search Report and Written Opinion of the International Searching Authority for PCT/US07/75780 mailed Mar. 27, 2008.

Notice of Allowance for U.S. Appl. No. 12/119,039 mailed Dec. 19, 2008.

"Hyper ARGUS LED, Hyper-Bright 3mm LED, Non Diffused", *Infineon Technologies* Mar. 1, 2000 , 1-9.

Benitez, P. , "Chapter 6: The SMS Design Method in Three Dimensions", *Conceptos avanzados de optica anidolica: diseno y fabricacion, PhD dissertation, UPM* (1998).

Benitez, P. , "Design in 3D Geometry with the Simultaneous Multiple Surface design method of Nonimaging Optics", *Instituto de Engergia Solar, E.T.S.I. Telecommunicacion Universidad Politecnica*, 28040. Madrid, spin Jul. 26, 2004.

European Search Report, Supplementary European Search Report from EP04752067 mailed May 9, 2008.

Eurpean Patent Office, European Search Report dated May 19, 2008 (replacement of May 9, 2008 Search Report).

Eurpoean Patent Office, , Examination Report for EP Application No. 04750671 mailed Aug. 28, 2008.

Glaeser, Georg , "Reflections on Refraction", *AMS* Sep. 5, 2001 , 1-18.

Int'l Searching Authority, , International Search Report and Written Opinion of the International Searching Authority for PCTUS0629464 mailed Jun. 19, 2008.

Int'l Searching Authority, , International Search Report and Written Opinion of the International Searching Authority for PCTUS0775779 mailed Jul. 24, 2008.

Parkyn, , "The Black Hole: Cuspated waveguide-injectors and illuminators for LEDs", *Part of the SPIE Conference on Nonimaging Optics: Maximum Efficiency Light Transfer V*, Denver, CO Jul. 1999.

Remillard, et al., "Loss Mechanisms Optical Light Pipes", *Applied Optics*, vol. 31 #34 Dec. 1992 , 7232-7241.

Spigulis, , "Compact Dielectric reflective elements, Half Sphere concentrators of radially emitted light", *Applied Optics* vol. 33, Nov. 25, 1994.

Notice of Allowance for U.S. Appl. No. 10/901,919 mailed Jun. 16, 2008.

Examiner Interview for U.S. Appl. No. 10/901,919 mailed Jan. 23, 2008.

Winston, Roland et al., "NonImaging Optics", *Elsevier Academic Press*, Burlington, MA, USA, Copyright 2005.

Non-Final Office Action from U.S. Appl. No. 12/353,939 mailed Jan. 15, 2010.

EPO; Examination Report of European Patent Application No. 068005313; dated Feb. 15, 2011; 6 pages.

Di Feng, "High quality light guide plates that can control the illumination angle based on microprism structures", *Applied Physics Letters*, 85 2004, 6016-6018.

Di Feng, , "Novel light-guide plate for liquid crystal display backlight", *J. Opt. A: Pure Appl. Opt.*, 7 2005, 111-117.

Kalantar, S., "Functional light-guide plate characterized by optical microdeflector and micro-reflectro for LCD backlight", *IEICE Trans. Electron.*, E84-C 2001, 1637-1646.

First Office Action from the Patent Office of the State Intellectual Property Office of the People's Republic of China for Application No. 200680027033.9 dispatched Mar. 13, 2009.

Notice of Allowance from U.S. Appl. No. 12/353,939 mailed Jul. 1, 2010.

Supplemental Notice of Allowability from U.S. Appl. No. 12/353,939 mailed Jul. 21, 2010.

Supplementary European Search Report for App. No. 06800531 completed Apr. 13, 2010.

Benitez, Pablo, U.S. Appl. No. 12/353,939, filed Jan. 14, 2009.

* cited by examiner

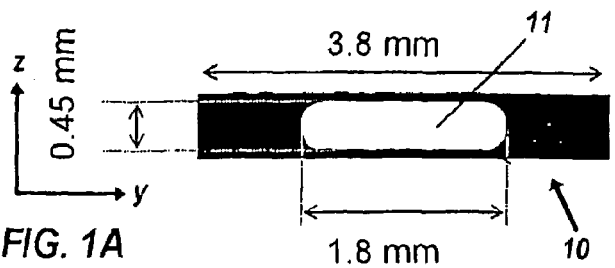
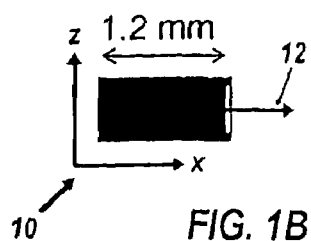
FIG. 1A
FIG. 1B
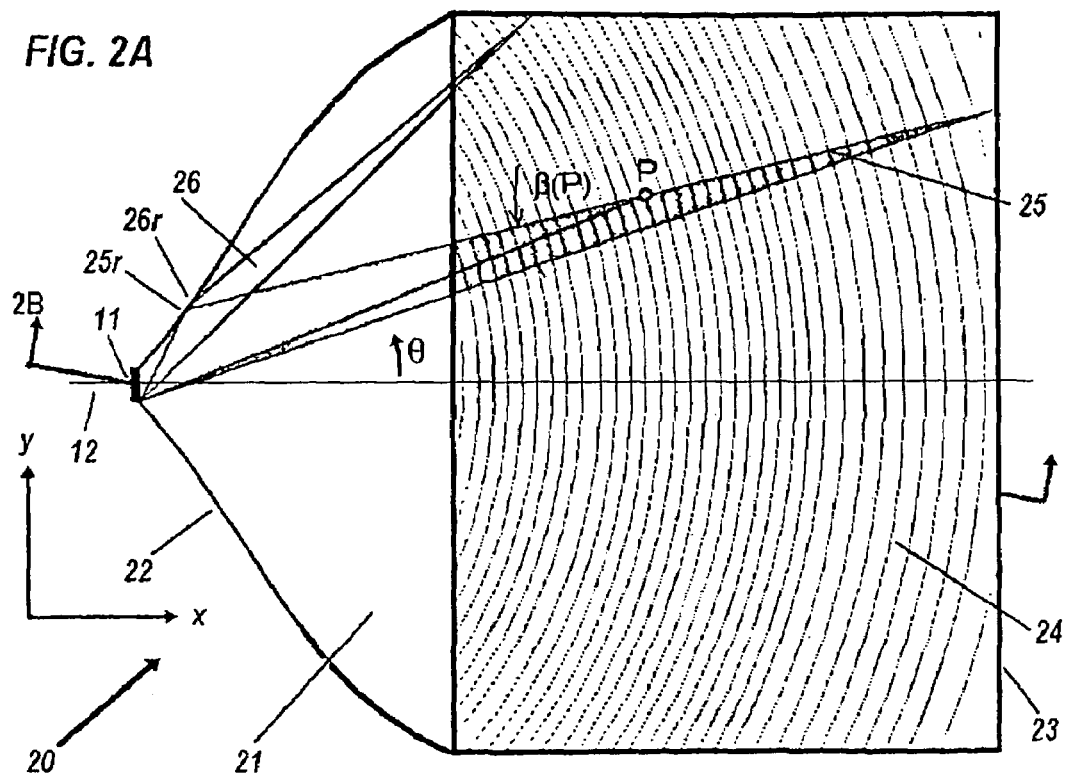
FIG. 2A
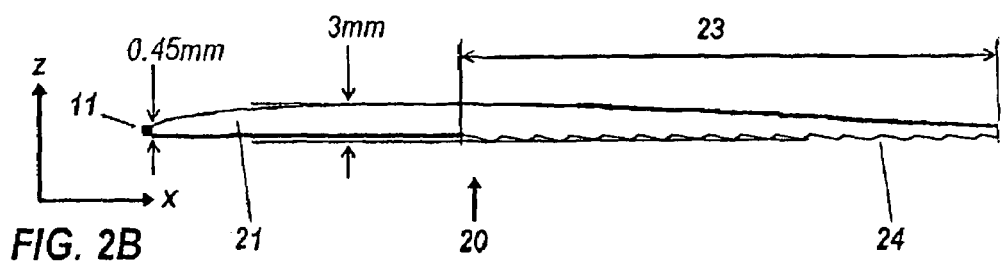
FIG. 2B

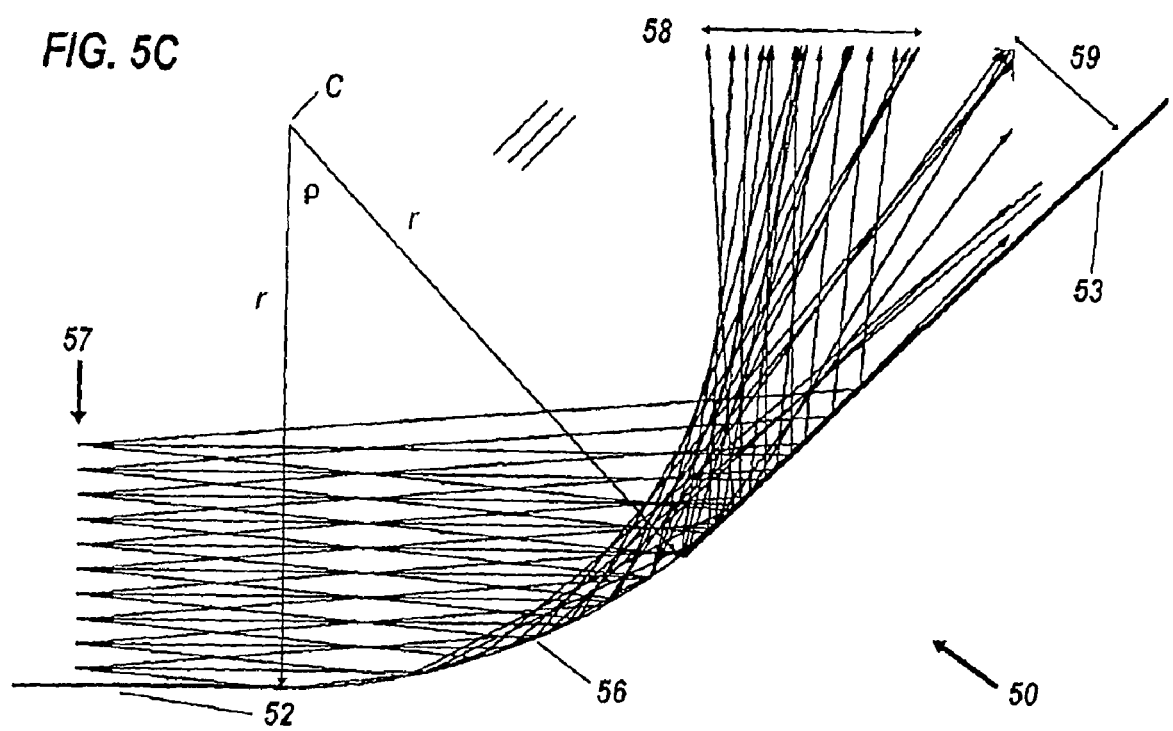

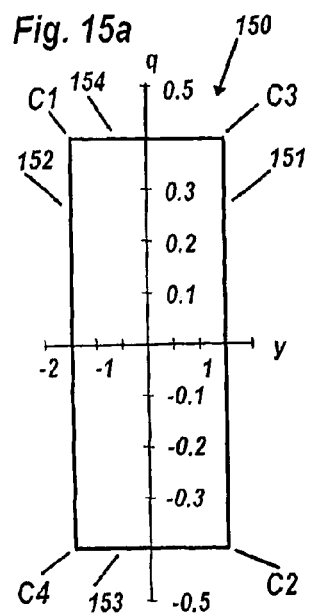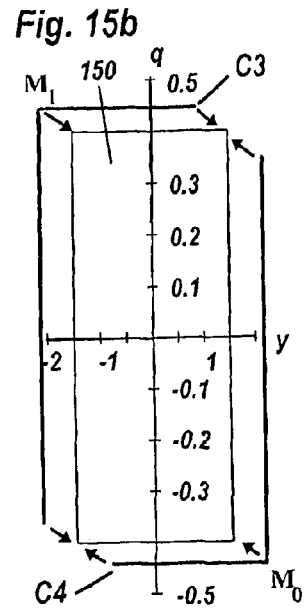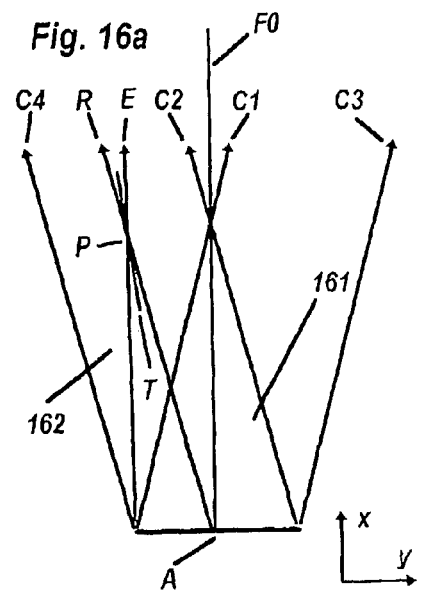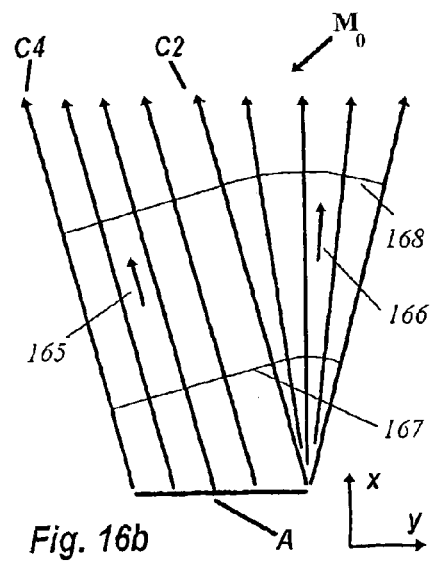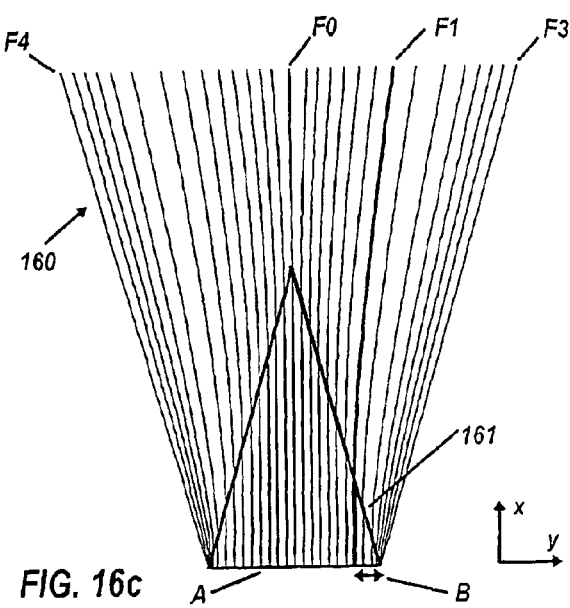

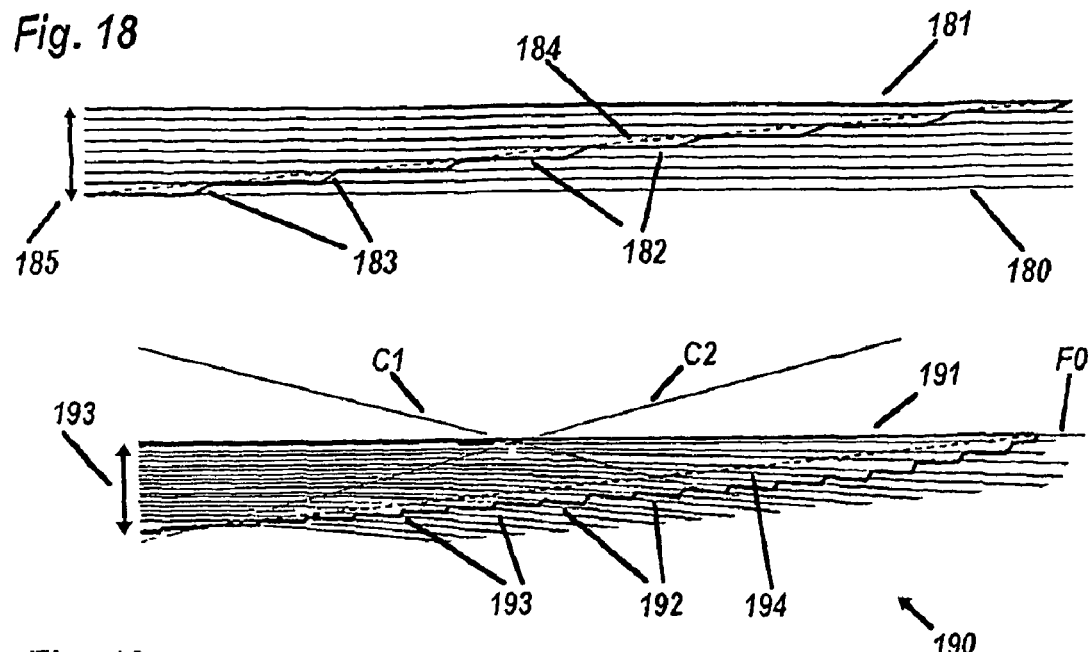
Fig. 18
Fig. 19
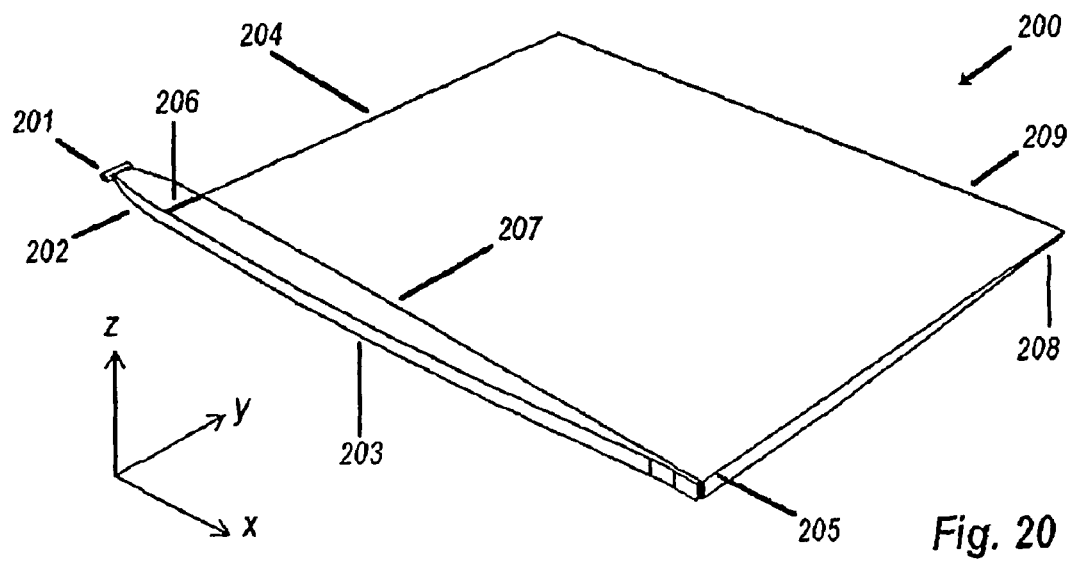
Fig. 20

ETENDUE-CONSERVING ILLUMINATION-OPTICS FOR BACKLIGHTS AND FRONTLIGHTS

PRIORITY CLAIM

This application claims the benefit of U.S. Provisional Application No. 60/729,188, filed Oct. 21, 2005, entitled ETENDUE-CONSERVING ILLUMINATION OPTICS FOR BACKLIGHT AND FRONTLIGHT, which is incorporated herein by reference in its entirety.

This application claims the benefit of U.S. Provisional Application No. 60/703,644, filed Jul. 28, 2005, entitled ETENDUE-CONSERVING ILLUMINATION OPTICS FOR BACKLIGHT AND FRONTLIGHT, which is incorporated herein by reference in its entirety.

FIELD OF THE INVENTION

The present invention relates generally to illumination and more particularly to high-brightness backlights and/or frontlights.

BACKGROUND

Devices that have output luminance that are nearly that of its light source are often termed high-brightness devices. In many instances, it is difficult to achieve high-brightness devices for very small light sources, such as a single high-power LED (e.g., an LED with about 2 square millimeters of area), as compared to thousands of square millimeters for even a small display.

Providing high-brightness devices that employ small light sources can be beneficial in many instances. The cost and/or complexity of providing such devices can be prohibitive.

SUMMARY OF THE INVENTION

Some embodiments provide a backlight/frontlight illumination device utilizing small light sources, such as a single high-power light-emitting diode (LED). Such LEDs have recently attained sufficient luminosity for an entire medium-sized (e.g., 3") display. When multiple LEDs are used to illuminate a backlight, they can be distributed around the perimeter for the sake of uniformity. Using a single LED, however, poses a distribution problem in attaining uniformity across the exit aperture, because alone it can only illuminate a small area.

The edge-ray principle of non-imaging optics sets forth the rules for minimal increase of source etendue, a central quantity of non-imaging optics. When calculating two-dimensional profiles with conventional orthogonal coordinates x and y, etendue can be calculated at a x=constant line and thus it can be defined using the y coordinate and the optical direction cosine q defined relative to it as the direction cosine with respect to the y axis times the refractive index n. If at point y the pair of optical direction cosines $q_0$ and $q_1$ bounds the rays emitted at that point, so that $(q_0(y) \leq q(y) \leq q_1(y))$, and these bounds are defined along the y-range $(y_0 \leq y \leq y_1)$, then the etendue E of the beam is the phase-space area given by $$E = \int_{q_0}^{q_1} \int_{y_0}^{y_1} dy\, dq$$

In three dimensions, etendue is the product of source area $A_s$ and the projected solid angle of the source's output, multiplied by the refractive index n of the optical medium surrounding the source. Assuming that the solid angle is a cone, then the expression of the etendue in three dimensions is:

$$E = nA_s \sin^2\theta$$

where $\theta$ is the off-normal angle of the solid conical angle. If this bounding angle $\theta$ is not constant across the aperture then the expression is more complex. A diffuse Lambertian emission into $2\pi$ n steradians is represented by $\theta=90°$. Such a diffuse output is characteristic of the emission from an LED chip itself.

An ideal optical system conserves etendue, so that the enlarged output area of an ideal collimator leads to its usefully high intensity within a narrow beam angle, because intensity in a direction illuminated by all the points of the exit aperture is the product of luminance times the exit-area. On the other hand, the small size of the focal spot of a solar concentrator leads to the usefully high irradiance from its wide beam angle, since irradiance is the product of luminance times the solid angle. In particular, the well-known compound parabolic concentrator (CPC) is etendue-limited in two dimensions and nearly so in 3D.

Consider, for example, Nichia's white-LED model NSCW020, having a Lambertian emitting area of 0.77 mm². An LCD with 3.5" diagonal has an area of 4000 mm², giving a very narrow etendue-limited output angle of $\theta=0.8°$. In some present embodiments not all the exit aperture is lit but is in fact a set of ribbons closely packed so the human eye can not resolve them. In some implementations, maximum performance (taking into account the effective exit area) is attained by employing etendue-limited optics in all three phases of device operation: injection, beam expansion, and ejection of the LED's light, all the while preserving luminance. Injection involves a first collimation of the LED light. Beam expansion involves spreading the LED's light into a line source and having a second beam expansion that spreads this line source over the output area from which it is to be ejected. The exiting light must appear to have uniform brightness across the exit face, and the entire device must be extremely thin. Some present embodiments fulfill both these criteria.

Some embodiments further provide a luminance-preserving non-imaging backlight composed of a transparent dielectric. The backlight can comprise a luminous source emitting light out of a bounded aperture that defines a y-z coordinate plane and has a surface normal that defines an x-axis; axis;an input port receiving said light; an injector with said input port defining a first y-z boundary and a larger output port defining a second y-z boundary, said injector having an x-y profile that expands away from said input port to said output port, said x-y profile acting via total internal reflection to keep the x-y angular width of the source image inversely proportional to its luminance; said injector being a surface of revolution with axis on said source and a swept profile that is a first portion of an upper half of a compound parabolic concentrator (CPC) tilted in a negative z direction by its acceptance angle, said sweep profile acting to collimate light in a plane of said swept profile while azimuthally distributing said light along said output port; and a beam-expanding ejector comprising a planar waveguide in an x-y plane with its y-z boundary optically coupled to said output port of said injector so as to receive light therefrom, said ejector having a smooth upper surface of revolution with a profile that is a remaining portion of said CPC profile of said injector, said ejector having a reflective lower surface comprising microstructured facets of revolution coaxial with said surface of revolution of said upper surface, said facets comprising a face parallel to the flow-lines of said CPC profile and a connecting diagonal face with a tilt that reflects in a upwards z-direction said received light, said tilt of said diagonal face adjusted so that said upwardly reflected light is refracted into a collimated direction common to said facets.

Further, some embodiments provide a luminance-preserving non-imaging backlight system. These systems can include a luminous source emitting light out of a bounded aperture; a CPC-shaped injector comprising an input port receiving light from said aperture, said CPC-shape injector forming thereof a beam confined to an acceptance angle; a linear beam-expander comprising a series of microstructured reflective facets each with a face tangent to a local flow-line and another angled to flow-lines of said CPC-shaped injector so as to deflect said light and form a transversely emitting line source; and a beam-expanding ejector comprising a planar waveguide receiving said deflected light, said beam-expanding ejector comprising a smooth upper surface tangent to the flow-lines of said CPC-shaped injector and a lower surface with facets deflecting received light through said upper surface to form a beam, said lower surface facets comprising a face generally parallel to said flow-lines of said CPC shaped injector and a connecting diagonal face with a tilt that reflects in an upwards z-direction said received light, said tilt of said diagonal face adjusted so that said upwardly reflected light is refracted into a collimated direction common to said lower surface facets.

Still further embodiments include luminance-preserving non-imaging backlights composed of a transparent dielectric. Some of these backlights and/or systems comprise a luminous source emitting light out of a bounded aperture that defines a y-z coordinate plane and has a surface normal that defines an x-axis; an input port receiving said light; an injector with said input port defining one y-z boundary and a larger output port defining another boundary, said output port being angled between the y-z plane and the x-y plane, said injector having a CPC-shaped x-y profile that expands away from said input port to said output port, said x-y profile acting via total internal reflection to confine said light to a transverse acceptance angle, said injector comprising an x-z profile of a slab with a CPC coupled to said light source; a quarter-cylindrical turning prism bonded to said output port of said injector; and an upper, beam-expanding ejector positioned adjacent said injector and separated therefrom by an air gap, said beam-expanding ejector with an input port optically coupled to said turning prism, said beam-expanding ejector having a lower face that is diffusely reflecting.

Some embodiments include a luminance-preserving non-imaging backlight that comprises an air-filled injector comprising reflective walls surrounding a bounded input aperture and expanding outward therefrom to a larger exit port, where the bounded input aperture defines a y-z coordinate plane and has a surface normal that defines an x-axis; a z-axis cylindrical lens filling said exit port; a y-axis cylinder optically attached to said z-axis cylindrical lens on a lower z-half of a y-z cross-section of said z-axis cylindrical lens; and a planar beam-expanding ejector optically attached to an upper z-half of the y-z cross-section of said z-axis cylindrical lens.

Additionally, some embodiments provide for planar sources of white light. Some of these sources comprise a luminous source emitting photostimulative light out of a bounded aperture; an injector comprising an input port receiving said light, an internally reflective expanding profile that collimates said light, and a line microstructured lateral deflectors forming a line of collimated light; a beam-expanding ejector receiving said line of collimated light, confining it to a planar waveguide, with microstructured faceted ejectors on a bottom x-y surface forming a z-going sheet of collimated light; a dichroic filter positioned to intersect said sheet of collimated light, having spectral admittance of said photostimulative light but spectral reflectance of longer-wavelength photoluminescent light; and a layer of photoluminescent material positioned adjacent said dichronic filter to receive said photostimulative light passing through said dichroic filter and emit longer-wavelength light in response.

Further embodiments provide for luminance-preserving non-imaging backlight systems that comprise a first backlight comprising a first CPC-shaped injector comprising an input port receiving light from a source, said CPC shape forming thereof a beam confined to an acceptance angle; a first linear beam-expander comprising a series of microstructured reflective facets each comprising one face tangent to a local flow-line field and another face angled to flow-lines of said first CPC-shaped injector so as to turn said light and form a transversely emitting line source; and a first beam-expanding ejector comprising a cambered waveguide receiving said light of said transversely emitted line source, said first beam-expanding ejector comprising a smooth upper surface tangent to the flow-lines of said first CPC-shaped injector and a lower surface with facets deflecting light through said upper surface to form a planar collimated beam, said facets comprising a face generally parallel to said flow-lines and a connecting diagonal face with a tilt that reflects said received light in the radially outward direction.

Some embodiments provide frontlights. These frontlights can include an injector comprising an input port receiving said light, an internally reflective expanding profile that collimates said light, and a line microstructured lateral deflectors forming a line of collimated light; a beam-expanding ejector receiving said line of collimated light, confining it to a planar waveguide, with microstructured faceted ejectors on a bottom x-y surface forming a z-going sheet of collimated light; a dichroic filter positioned to intersect said sheet of collimated light, having spectral admittance of said photostimulative light but spectral reflectance of longer-wavelength photoluminescent light; a layer of photoluminescent material positioned adjacent said dichronic filter to receive said photostimulative light passing through said dichroic filter and emit longer-wavelength light in response; an lowermost block of transparent material, with planar lower surface and upper surface conformal to said microstructured faceted ejectors of said beam-expanding ejector, and a layer of lower-index transparent material positioned therebetween; and an uppermost planar reflector returning the upward photostimulative light to be emitted through said lowermost block.

A better understanding of the features and advantages of the present invention will be obtained by reference to the following detailed description of the invention and accompanying drawings which set forth an illustrative embodiment in which the principles of the invention are utilized.

BRIEF DESCRIPTION OF THE DRAWINGS

The above and other aspects, features and advantages of the present invention will be more apparent from the following more particular description thereof, presented in conjunction with the following drawings wherein:

FIG. 1A is a top view of an exemplary LED for which the devices of the following Figures are designed to join so as to utilize nearly all its luminous emission.

FIG. 1B is an end view of the LED of FIG. 1A.

FIG. 2A is a top view of an embodiment of a backlight.

FIG. 2B is a side view of the backlight of FIG. 2A.
FIG. 5C shows the optical effects of filleting, a ray-trace showing how to evaluate manufacturing tolerances.
FIG. 15A is a phase-space diagram of the backlight entry aperture.
FIG. 15B shows the same with the borders labeled.
FIG. 16A shows the aperture edge rays.
FIG. 16B shows half of these edge rays.
FIG. 16C shows the resultant flow lines.

FIG. 18 shows a straight-line ejector profile.
FIG. 19 shows another ejector with a straight-line upper surface.
FIG. 20 is a backlight made with straight-line beam expanders.

Figure 2C:
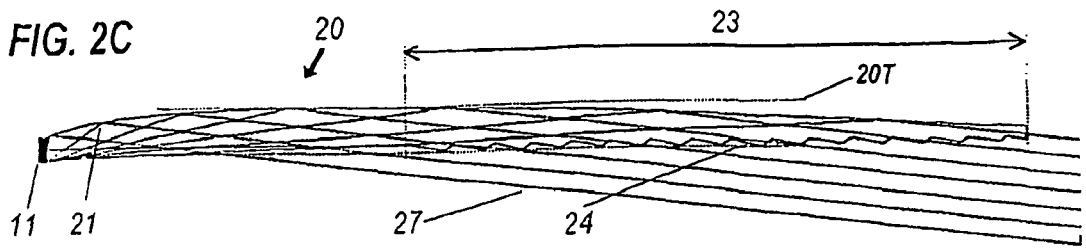
FIG. 2C is the backlight of FIG. 2A with rays.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

A better understanding of the features and advantages of the present invention will be obtained by reference to the following detailed description of the some embodiments and accompanying drawings, which set forth illustrative embodiments in which the principles of the invention are utilized.

As introduced above, devices that produce output luminances that are nearly equal to that of their light source are in some instances identified or referred to as high-brightness devices. It is typically difficult to achieve a high-brightness device that employ relatively very small light sources, such as a single high-power LED, with about 2 square millimeters of area, as compared to thousands of square millimeters for even a small display. This can typically only be done when the output angles are correspondingly small, so that virtually all the light comes out substantially parallel, which often is not practical using currently available LEDs (too small an area) or LEDs combined with traditional collimator optics. While this capability could be called a collimated backlight (or frontlight), this term has in been loosely applied to relatively wide angular outputs (i.e., ±300).

Some present embodiments provide devices with high output brightness over a narrow angular range, and high spatial uniformity. Further, some embodiments provide devices with high output brightness in relatively very thin profiles, while conventional lenses typically require considerable depth to achieve such beam expansion.

FIG. 1A is a top view of an exemplary light-emitting diode package 10 by the Nichia Corporation. Most significant is rounded rectangular emitting region 11, which emits white light in a Lambertian pattern around surface normal 12. FIG. 1B is a side view of same. Both views give package dimensions to convey scale and introduce a Cartesian coordinate system with direction x in the surface normal of package 10, y along its length, and z across its width. The area of emitter 11 can be seen to be $$A_e=(1.8-0.45)*0.45+\pi*0.45^2/4=0.77 \text{ mm}^2.$$

For each lumen emitted by a Lambertian source, the intensity is $1/\pi$ candela. The rated luminosity of 2.7 lumens gives the quite high luminance of $2.7/(\pi*0.77)=1.12$ candela/mm$^2$=1, 120,000 nits. This is over thirty times brighter than a white surface in overhead sunlight, and aptly called 'high brightness'.

FIG. 2A is a top view of backlight 20, in the x-y plane. LED emitting area 11 is positioned to shine its light into injector 21, being in optical contact with no air gap. Injector 21 includes TIR-reflector profile 22 upon its exterior. Rectangular ejector 23 has the 4:3 ratio of standard video, and ejects light via circular grooves 24. This output light is ejected out of the plane of the Figure and towards the viewer. This ejected light is operable to illuminate a liquid-crystal display (not shown) with a minimum brightness of 600 nits over a viewing angle of ±25°. Tris amounts to a minimum luminosity of $$600*(40.7/10,000)*\pi*\sin^2 25°=1.37 \text{ lumens}$$

Thus the aforementioned LED luminosity of 2.7 lumens indicates that optical efficiency is required to be at least 51%, easily attained by at least some present embodiments but much more difficult for other systems to do with both collimation and spatial uniformity.

FIG. 2A shows how profile 22 uses total internal reflection as at point 26r, forming exemplary pencils 25 and 26 to adjust angular width β(P) of emitter 11 as seen from exemplary point P. Reflector profile 22 is a hyperbola that inherently adjusts angular width β as a function of off-axis angle θ, in order to deliver equal flux over the entire ejector 23.

FIG. 2B is a sectional view in the x-z plane, along a groove-radius of backlight 20, showing injector 21 and ejector 23 with its bottom grooves 24 for ejection. Ejector 23 performs both functions of beam expansion (there is a first beam expansion in injector 21) and ejection. Injector 21 expands from the 0.45 mm width of LED emitter 11 to a full thickness of 3 mm.

FIG. 2C shows the same sectional view through backlight 20 with CPC profile 21, ejector section 23, and flow-line grooves 24. Horizontal tangent line 20T shows how CPC profile 21 is itself tilted downwards. Also shown are parallel edge rays 27, seen sloping downwards to the right.

Figure 2D:
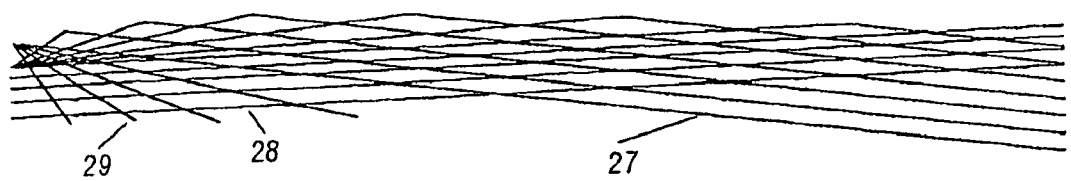
FIG. 2D shows the rays of FIG. 2C by themselves.

FIG. 2D also shows rays 27, but with backlight 20 removed for clarity. Also shown is set 28 of parallel edge rays running upwards to the right, but with less slope than lines 27, because of the abovementioned tilt below horizontal of CPC profile 21. Ray-fan 29 proceed from the upper edge of the source (not shown, but labeled 11 in FIG. 2C).

Figure 3:
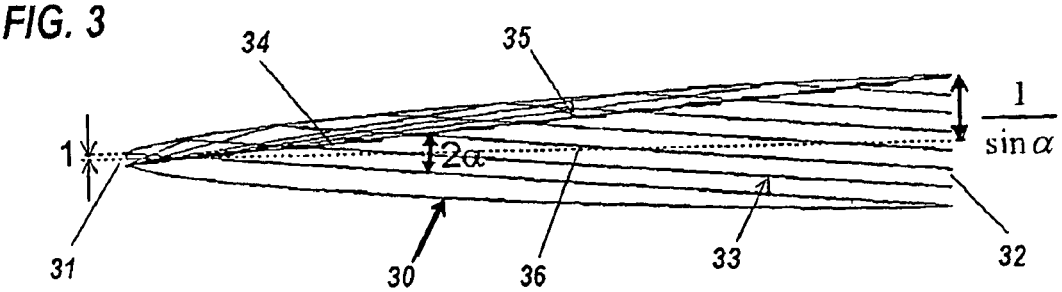
FIG. 3 shows a CPC profile with edge rays.

FIG. 3 shows bilaterally symmetrical CPC profile 30 of acceptance angle α, with entrance aperture 31 of unit, semi-width and exit aperture 32 of semi-width 1/sin α. Acceptance angle α is drawn as 5°, so that the CPC length from entry to exit aperture of profile 30 is $[(1/\sin \alpha)+1]/\tan \alpha=143$. Angle 2α is shown to highlight the fact that at every point within CPC 31, rays of light entirely fill this angular range. Parallel lower edge rays 33 all lay at angle −α. Upper edge ray 34 proceeds at angle α from the lower edge of entrance 31 to the upper edge of exit 32. Located on ray 34 are the left ends of multiple segments 35, oriented parallel to symmetry axis 36. These segments are called flow lines because two-sided mirrors located thereupon will not alter the light output of CPC 31, and thus they are to said not to disturb the optical flow because they are tangent thereto. Flow-lines will be discussed in more detail below, at FIG. 16.

Figure 4A:
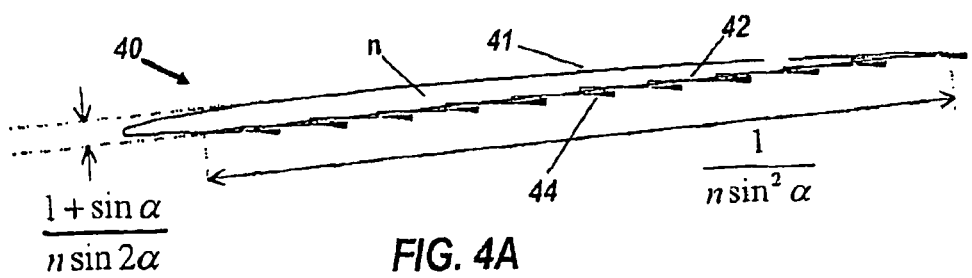
FIG. 4A shows a CPC sliced along flow lines.

FIG. 4A shows profile 40, filled with transparent material of refractive index n. Top surface 41 is identical with the upper edge of CPC 30 of FIG. 3, and horizontal bottom edges 42 are identical to segments 35 of FIG. 3. Beamlets 44 denote the light radiating between flow-line segments 42.

Figure 4B:
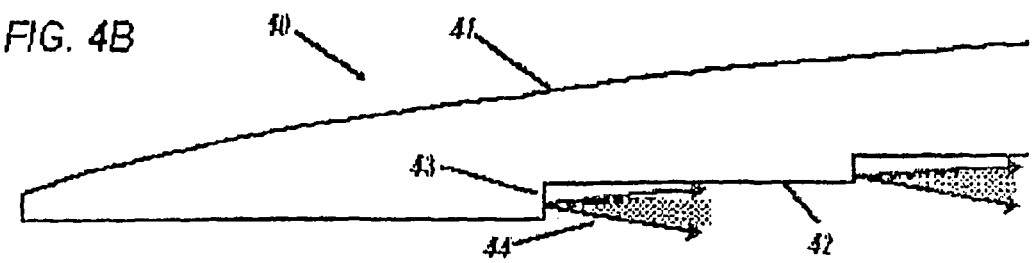
FIG. 4B is a close up view of the CPC profile of FIG. 4A.

FIG. 4B is a close-up view of the left side of profile 40, showing upper CPC surface 41 and flow-line segments 42, which are connected by orthogonal segments 43. Also shown are beamlets 44, which represent the original 2α light that is undisturbed by flow-lines. If they were actually exiting into air they would be 2 nα in width, for small α. The device shown in FIG. 4A and FIG. 4B is bounded by flow lines of the CPC 42, top line 41, which is also a flow line, and exit segments 42. Because the rays from the emitter 11 of FIG. 2C only reflect on the flow lines before reaching to the exit segments 43, the bundle is not disturbed with respect that of a CPC. Thus it can be concluded that the angular spread of the rays at the segments 43 is 2α, as it is the same at points inside of the complete CPC.

Figure 5A:
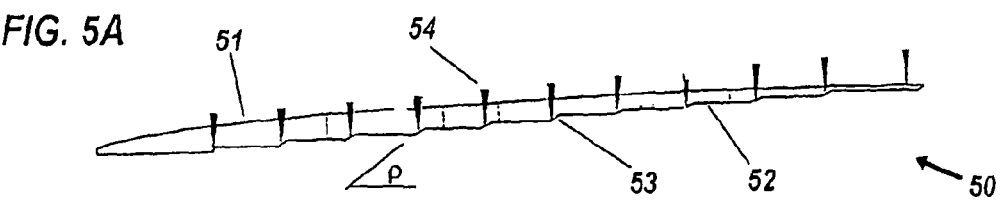
FIG. 5A shows light ejection by slanting the previously perpendicular exit-faces.

FIG. 5A shows profile 50 comprising CPC-shaped top surface 51, bottom horizontal segments 52, and diagonal connecting segments 53, so slanted as to reflect light upwards to form vertical beamlets 54. Diagonal connecting segments 53 will also be referred to as ejector faces. In an actual device, segments 52 & 53 would be so small as to be invisible to the naked eye, and thus far more numerous than the ten shown here. Such a high-resolution implementation would cause perceived brightness to be reduced proportionally because blurring by the human eye would cause the entire surface to appear uniformly bright, rather than just the slanted grooves. This would be done without altering the angular width 2 nα of beamlets 54, after they exit top surface 51. The individual values of tilt-angle ρ of ejector faces 53 are adjusted to compensate for the varying slope of top surface 51, in order for all output beamlets 54 to be parallel.

To do this blurring, the ejector faces 53 must be close enough that beamlets 54 overlap just outside top surface 51. To achieve invisibility, the maximum spacing is about 160μ in some embodiments. Otherwise a diffuser can be placed over the device so the groove structure cannot be discerned by the viewer.

Figure 5B:
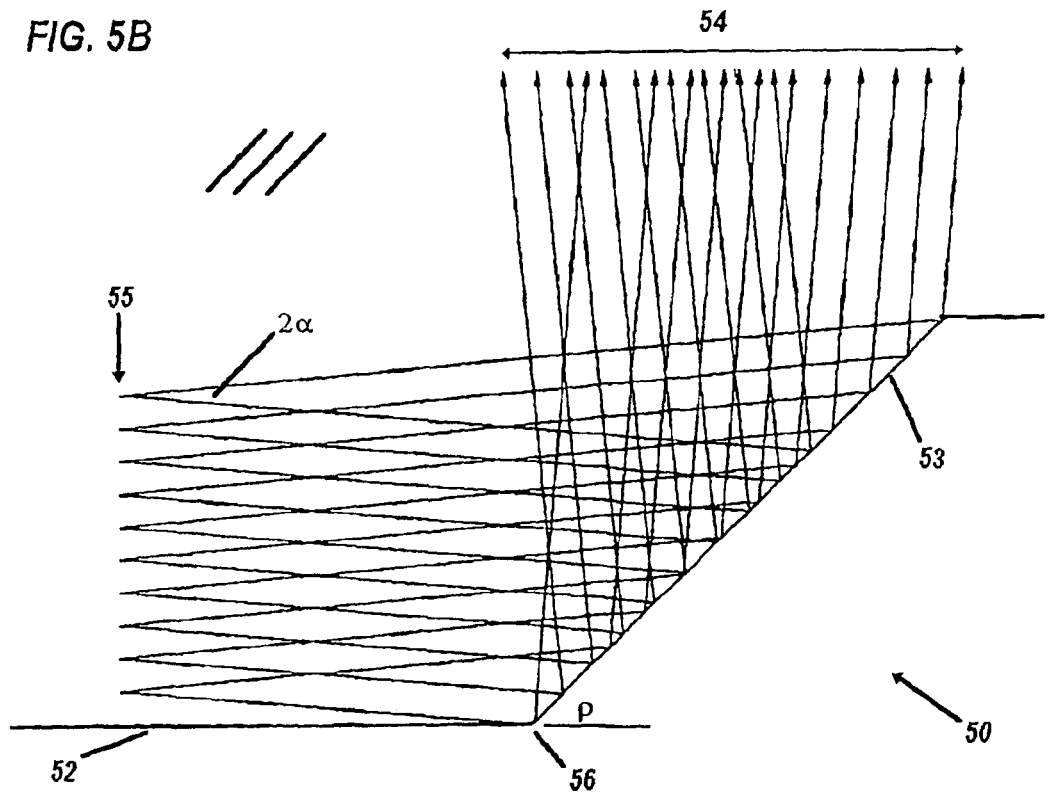
FIG. 5B is a close up view of one such slanted exit-face.

FIG. 5B is a close-up view of one face of ejector faces 53 on profile 50. Array 55 of edge rays, subtending the angle 2α, illuminates one slanted edge of ejector faces 53, which totally internally reflects the rays upwards so they become vertical beamlet 54. On injection-molded parts, exterior corner 56 is subject to rounding, generally with radius many times the wavelength of light.

This rounding is exhibited in FIG. 5C, a close-up view showing rounded exterior corner 56 joining horizontal edge 52 with shown face of ejector faces 53. Rounded corner 56 has radius r from center of curvature C, forming an arc of included angle ρ. Array 57 of edge rays and chief rays are dispersed into ray fans 58 and 59. Upward ray fan 58 is within the critical angle of the material and thus will escape the backlight, while diagonal ray fan 59 consists of rays that will not escape the backlight and thus do not contribute to its output. The broad angle of ray fan 58 leads to stray light as well as an increase in etendue.

Figure 6:
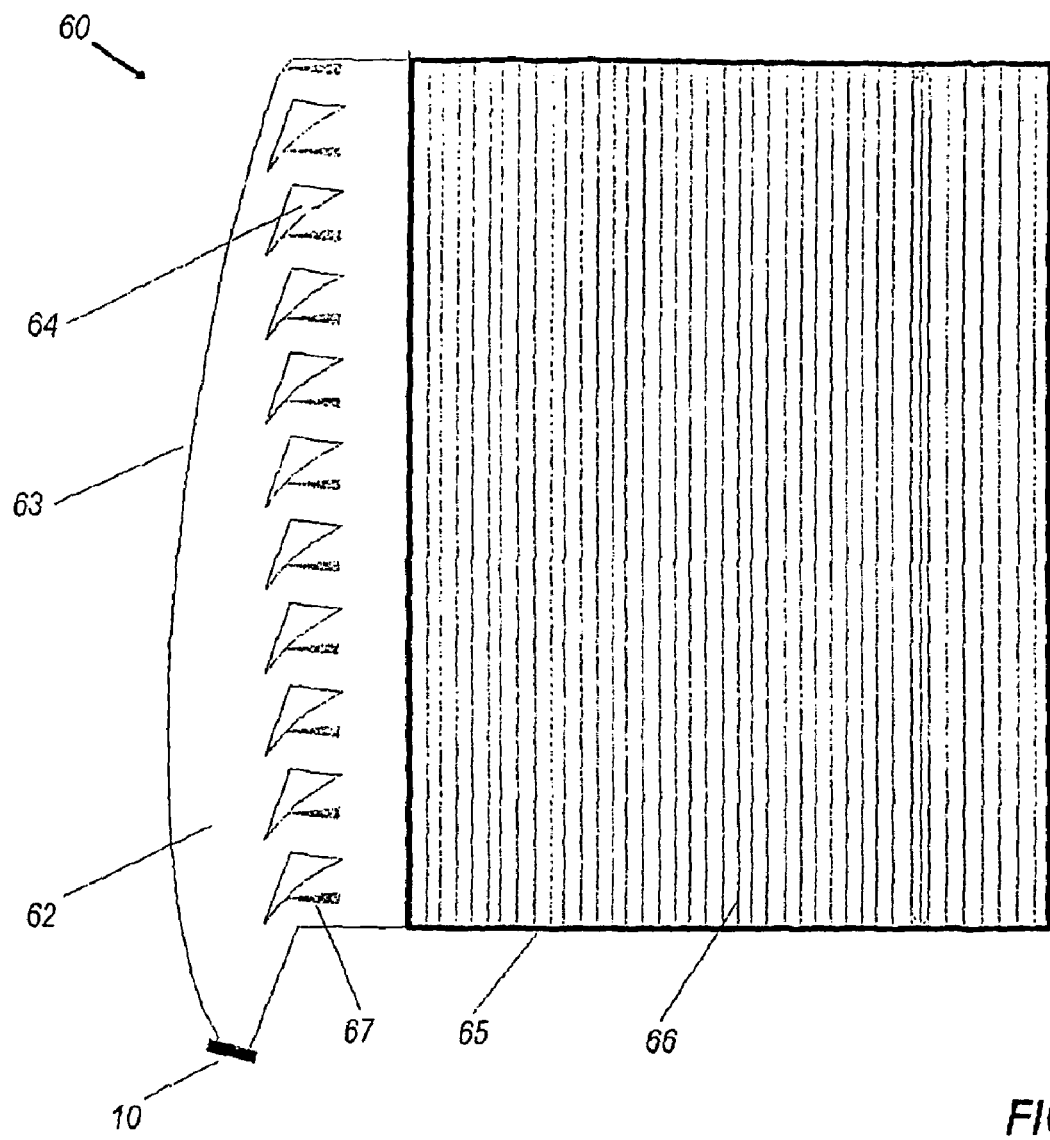
FIG. 6 shows a linearly organized backlight with internally reflecting air spaces.

Returning briefly to FIG. 2A, it can be seen that injector 21, running from source 11 to ejector 23, has nearly the width of ejector 23 itself. For a narrower injector width, the preferred embodiment of FIG. 6 is disclosed, albeit more complicated to mold. Backlight 60 comprises LED package 10, injector 62 with CPC profile on left boundary 63, totally internally reflecting deflector voids 64, and rectangular ejector 65, with linear reflector grooves 66 on its bottom. CPC profile 63 is scaled up from profile 30 of FIG. 3, and similarly narrows the angular range of light from source 10. Voids 64 can be molded by retractable inserts. As long they are air-filled there will be internally reflected beamlets 67. They are shaped to deliver constant illuminance to the entire rectangular face of rectangular ejector 65 (which performs both functions of beam expansion and ejection). The cross-section of ejector 23, shown in FIG. 2B, applies equally to rectangular ejector 65 of FIG. 6.

Figure 7A:
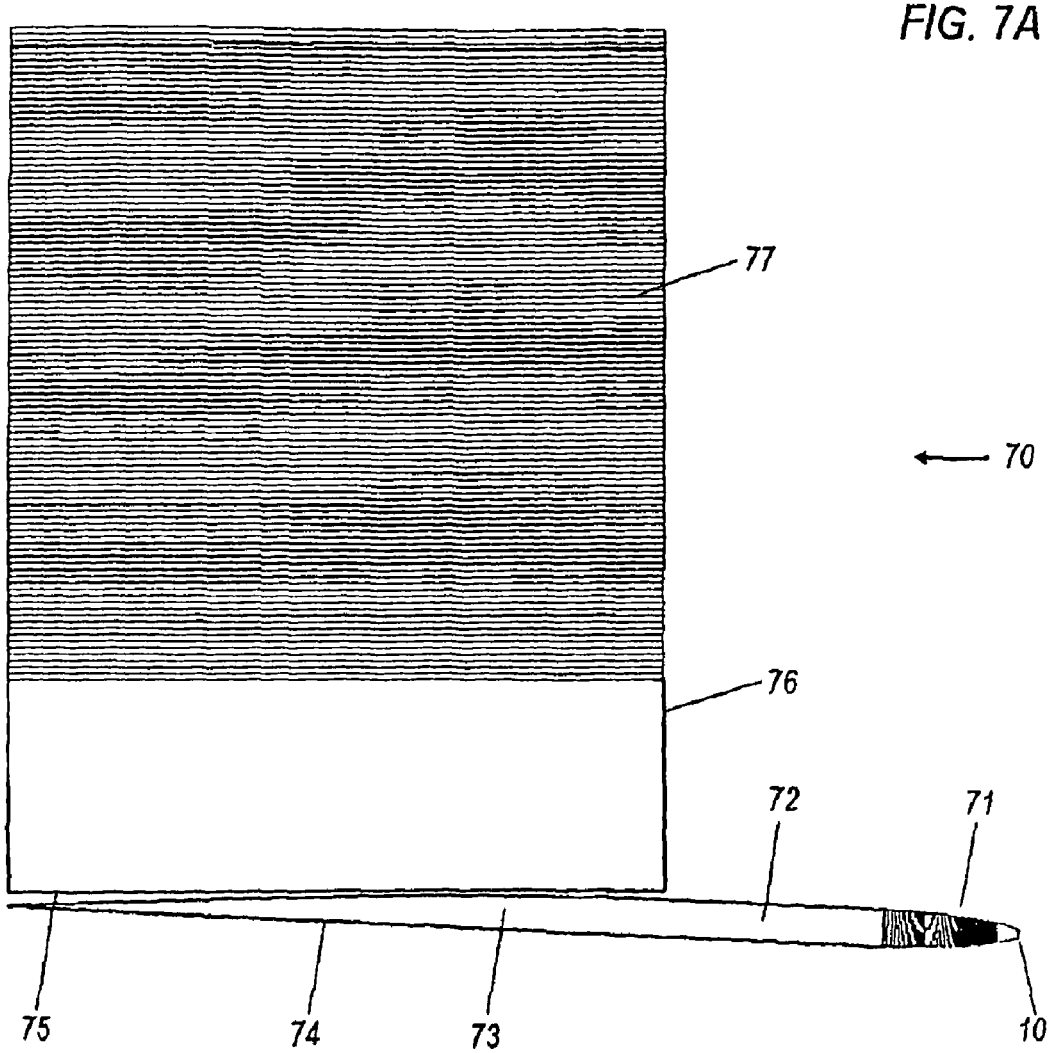
FIG. 7A is a top view of a CPC-fed linear-groove backlight.

FIG. 7A is a top view of backlight 70, comprising LED package 10, CPC collector 71, mixing rod 72, injector 73 (which creates a first beam expansion) with flow-line and having ejector faces 74, air gap 75, and ejector 76 (which creates a second beam expansion) with linear flow-line grooves having ejector faces 77 on its bottom. Between LED package 10 and CPC 71 is a tiny air gap, too small to be drawn, rather than an index-matching glue. This is because typical refractive indices in the 1.5-1.6 range are inadequate to handle the full ±90° of an LED's emission, unless the output angle is very small. An air gap reduces the range within the CPC to ±sin(1/n), or about 40°. Unless otherwise noted, every CPC herein that couples to LEDs will have such an air gap between it and the LED.

Figure 7B:
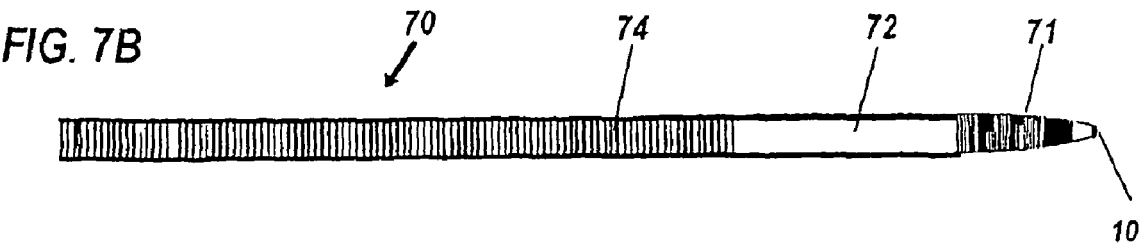
FIG. 7B is a front view of the backlight of FIG. 7A.

FIG. 7B is an end view of backlight 70, showing LED package 10, CPC collector 71, mixing rod 72, and flow-line and ejector faces 74.

Figure 7C:
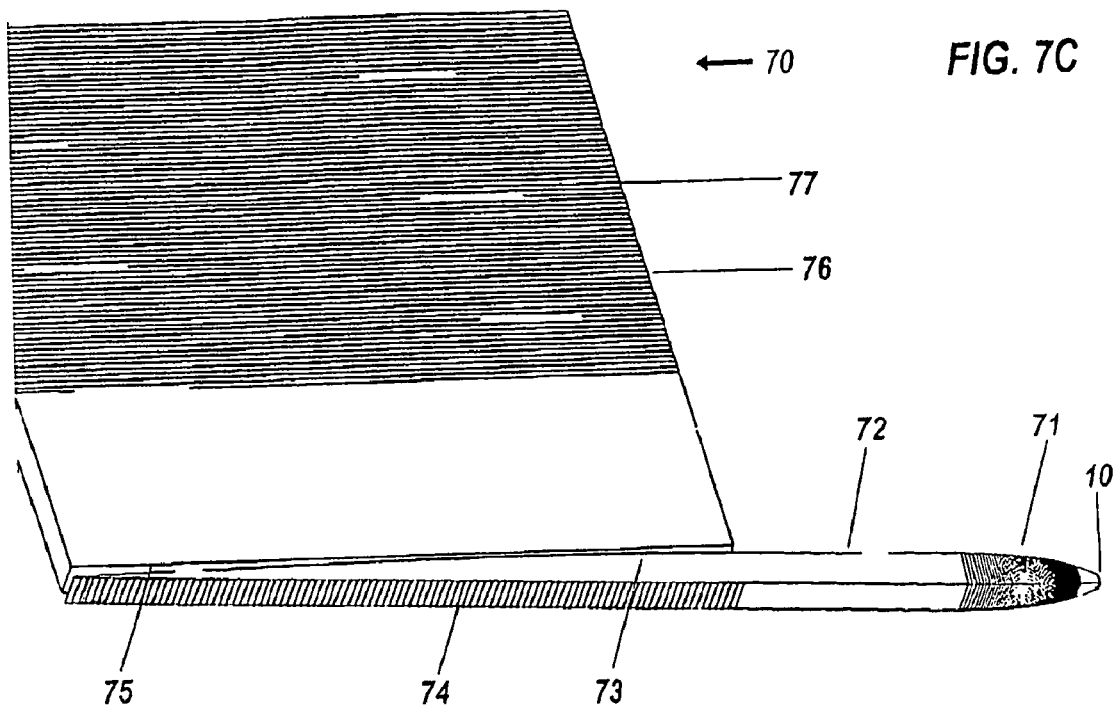
FIG. 7C is a perspective exploded-view of the backlight of FIG. 7A.

FIG. 7C is a perspective view of the bottom part of backlight 70, showing LED package 10, CPC collector 71, mixing rod 72, injector 73 (creating a first beam expansion) with flow-line grooves having ejector faces 74, air gap 75, ejector 76 (creating a second beam expansion), and having flow-line grooves with ejector faces 77.

Figure 7D:
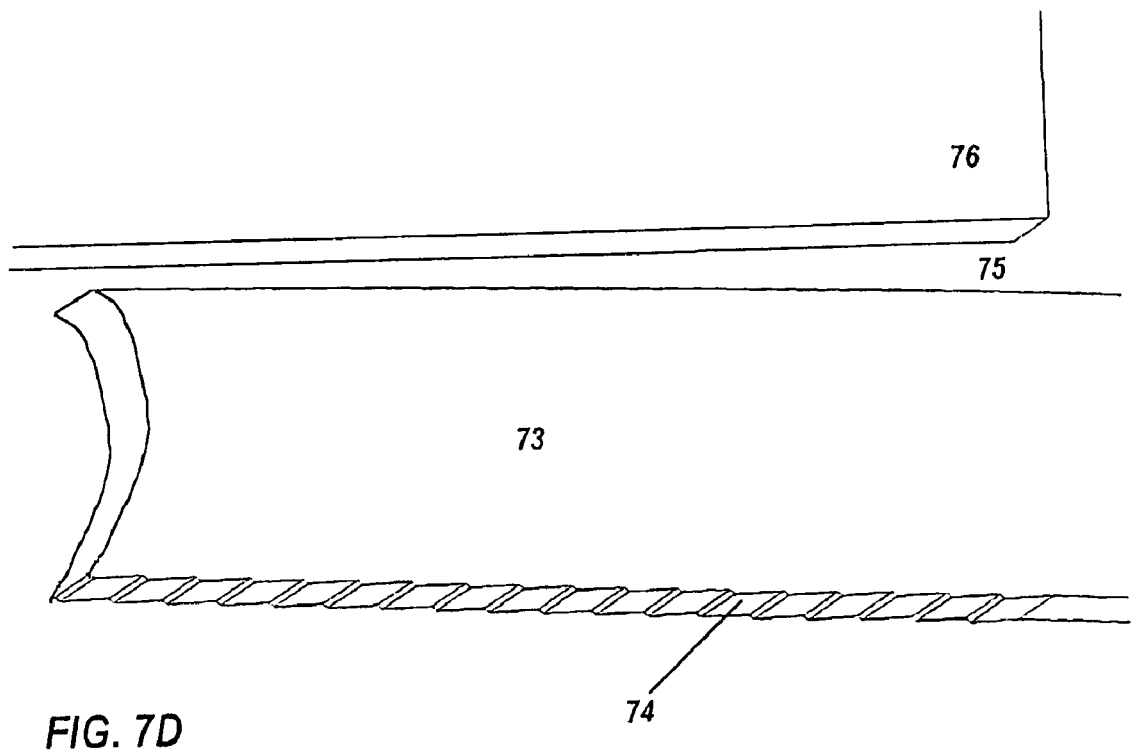
FIG. 7D is a close-up view of the joint between injector and ejector of the backlight of FIG. 7A.

FIG. 7D is a close-up from FIG. 7C showing the junction between injector 73, ejector 76, flow-line steps 74, air gap 75, and the corner of ejector 76.

Figure 7E:
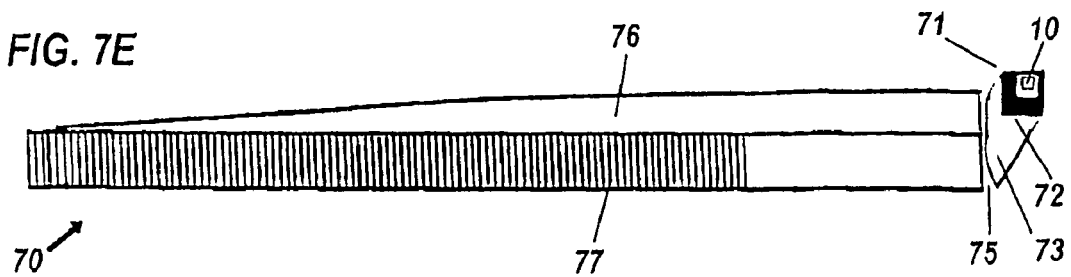
FIG. 7E is a perspective view of the injector of the backlight of FIG. 7A.

FIG. 7E is a highly slanted perspective side-view of backlight 70, showing LED source 10, CPC 71, mixing rod 72, injector 73, air gap 75, ejector 76, and flow-line grooves and ejector faces 77.

Figure 7F:
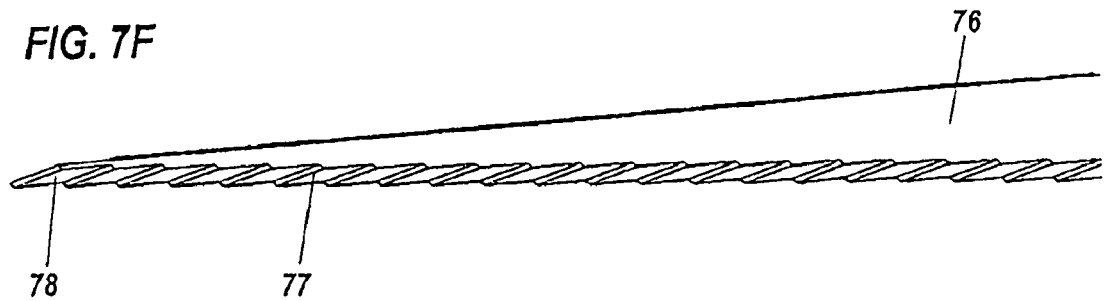
FIG. 7F is a close-up side view of the ejector tip showing flow-line grooves and ejector faces of the backlight of FIG. 7A.

FIG. 7F is another highly slanted perspective side view of the very end of ejector 76, showing flow-line grooves and ejector faces 77 and thin tip 78. The small size of the grooves causes tip 78 to be too thin for practical injection molding. Accordingly, a modified preferred embodiment is shown next.

Figure 8A:
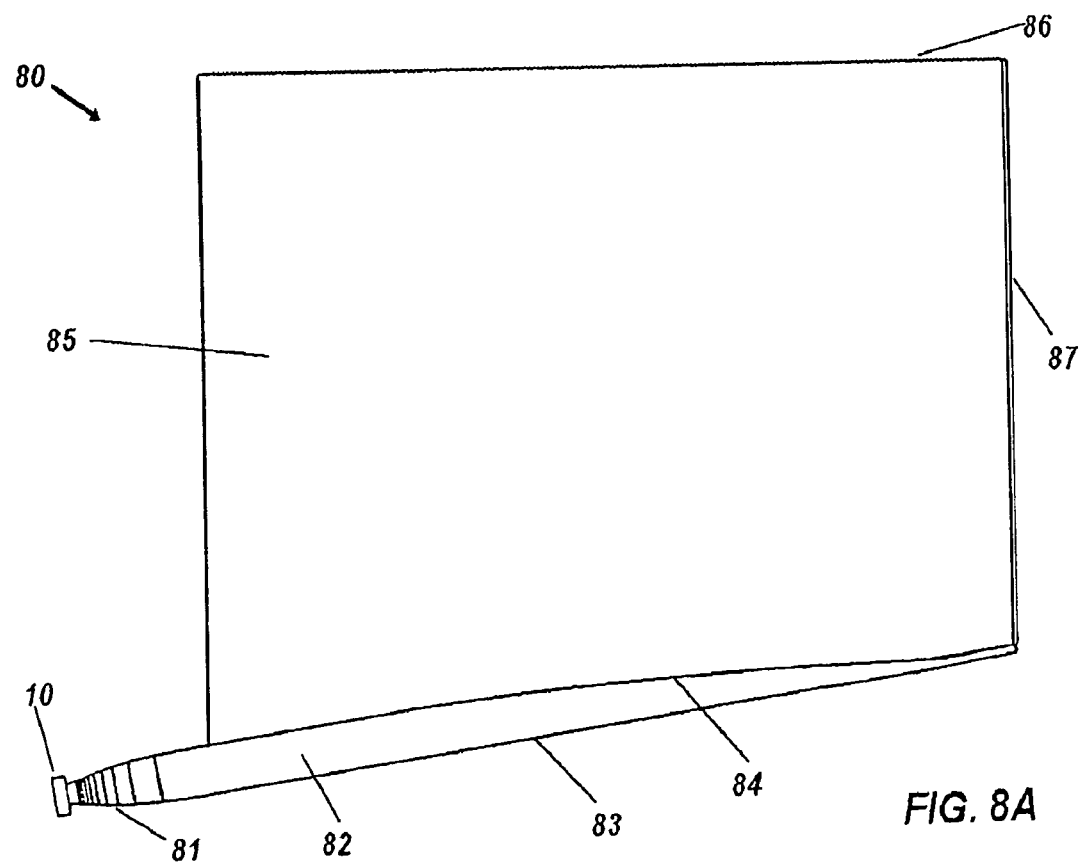
FIG. 8A is a top view of another collimating backlight.

FIG. 8A is a top view of backlight 80, comprising LED package 10, CPC collector 81, injector 82 (which produces a first beam expansion) having flow-line grooves with ejector faces 83, narrow conformal low-refractive index gap 84, and ejector 85 (which produces a second beam expansion and ejects the light) with its far end having retroreflector corners 86. Barely visible on the opposite side of ejector 85 from the viewer is holographic diffuser sheet 87, better seen in subsequent figures.

Figure 8B:
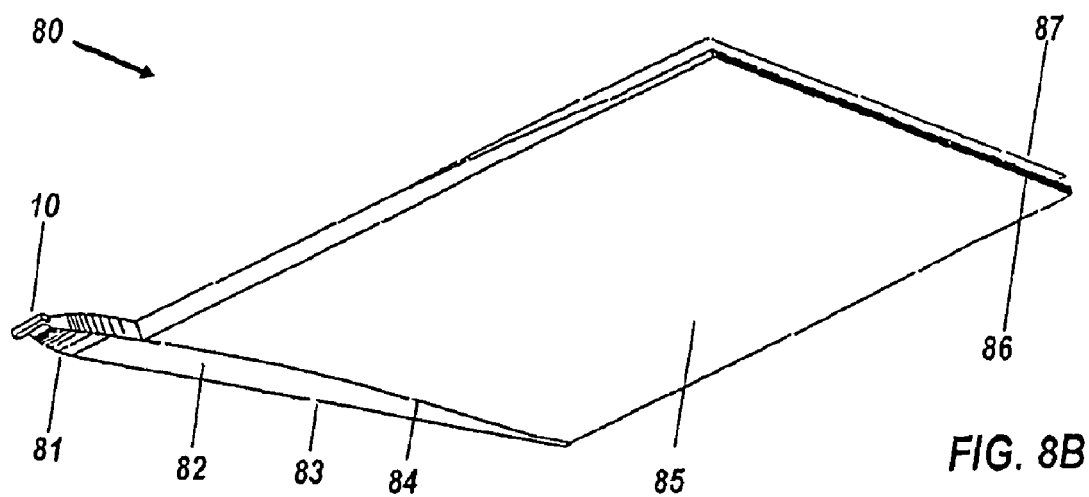
FIG. 8B is an oblique bottom view of the backlight of FIG. 8A.

FIG. 8B is a perspective view of backlight 80, showing LED package 10, CPC collector 81, injector 82 with flow-line grooves with ejector faces 83, narrow low-refractive index gap 84, ejector 85 with retroreflector end corners 86, and holographic diffuser sheet 87.

Figure 8C:
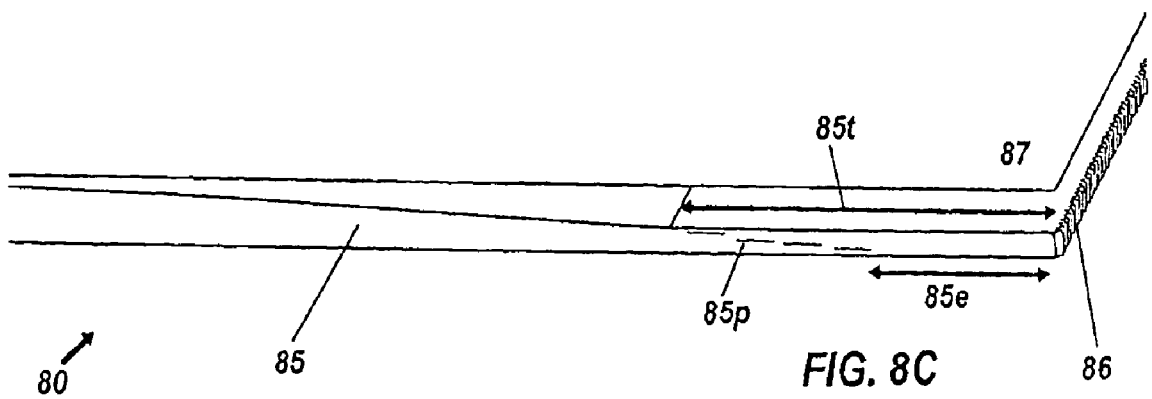
FIG. 8C is a close-up view around a corner of the backlight of FIG. 8A.

FIG. 8C is a close-up view of backlight 80, showing the tip of ejector 85, with overlying diffuser sheet 87. Dotted line 85p shows the hypothetical continuation of the profile of ejector 85, past a minimum moldable thickness. Instead, section 85t has constant thickness, extending to retroreflector 86, which illuminates end section 85e, which is the distal half of section 85t.

Figure 8D:
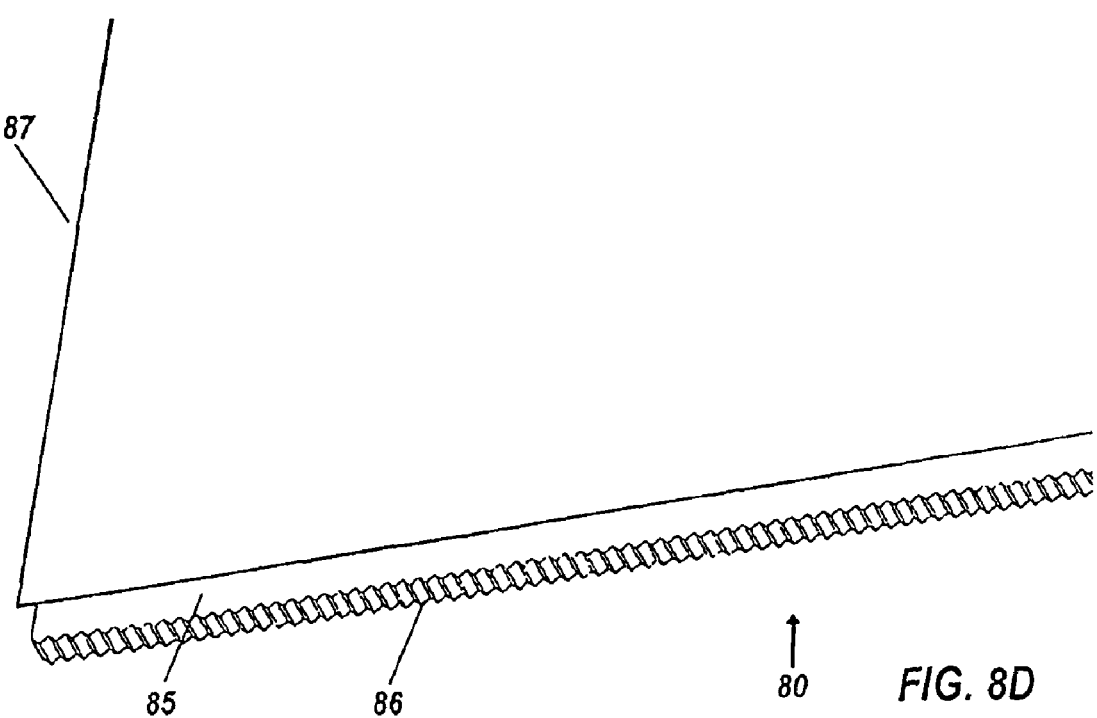
FIG. 8D is a detail view of a corner of the backlight of FIG. 8A.

FIG. 8D is a perspective close-up of the end of ejector 85, showing back-edge grooved retroreflector 86 and holographic diffuser sheet 87.

Figure 9A:
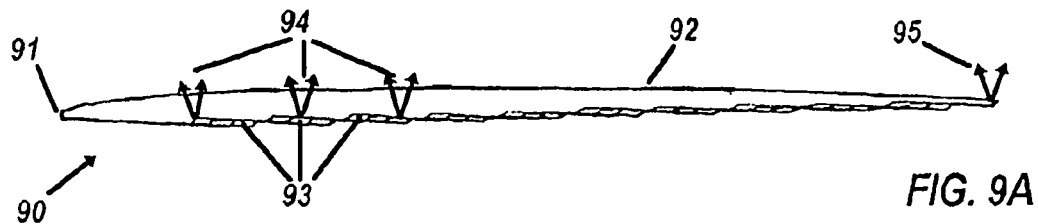
FIG. 9A is a side view of another collimating backlight with small extraction zones.

FIG. 9A is a cross-section of backlight 90, comprising LED 91, CPC top profile 92, and ejector faces 93. These ejector faces are at the end of short segments of flow-line grooves, offset to break up the resultant output lines. That is, the groove formed by the flow line and the ejector face does not extend from side to side of the ejector but it has a limited width. In this way the ejector faces of the ejector are rectangles rather than lines. Thus output beamlets 94 are separate spots that are harder for the viewer to discern. Edge beamlets 95 will have the same intensity as interior output beamlets 94.

Figure 9B:
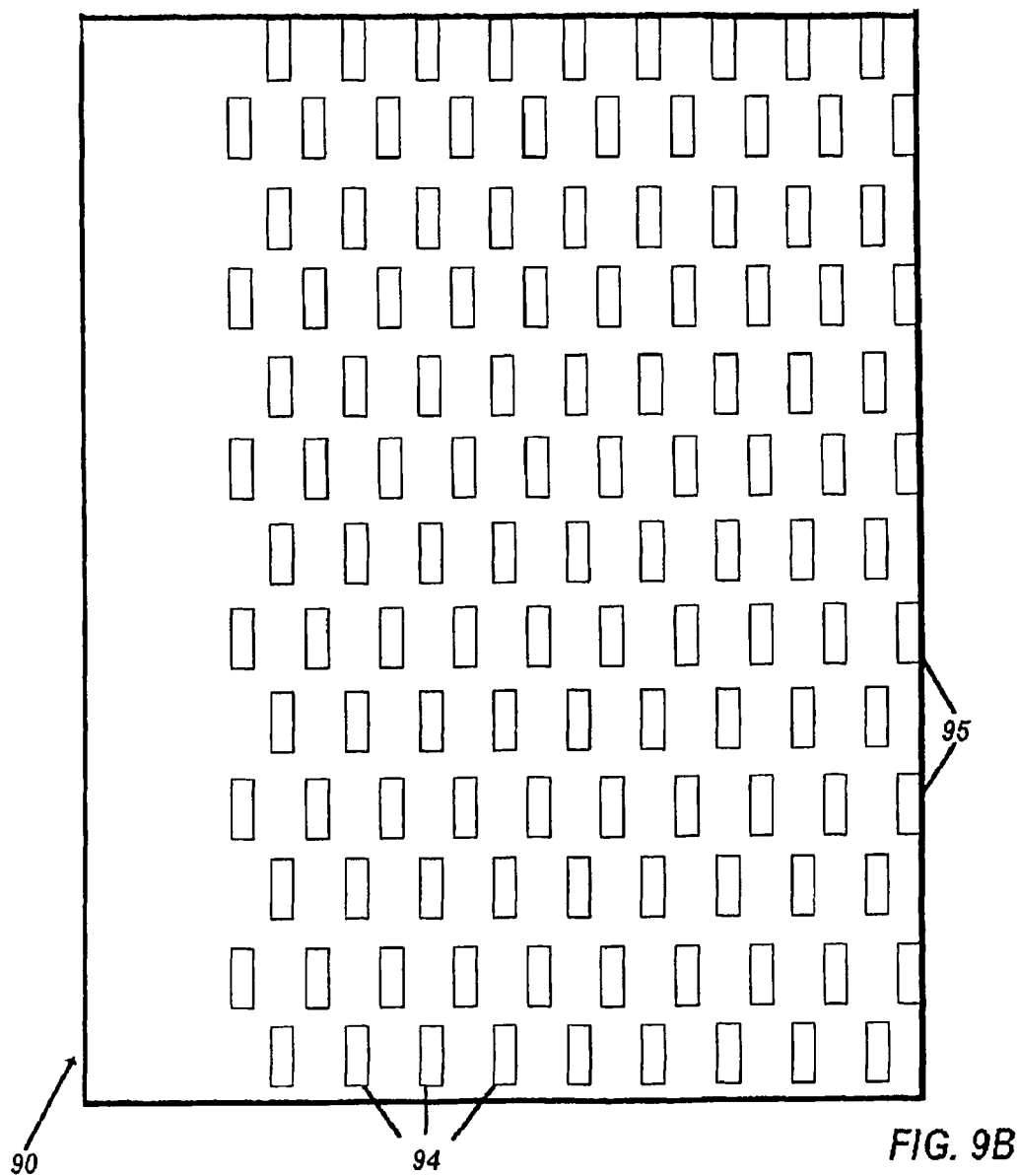
FIG. 9B is a top view of the backlight of FIG. 9A.

FIG. 9B is a top view of backlight 90, showing the intricate pattern of the numerous beamlet spots 94. They are exaggerated in size and spacing because in actual fact they are too numerous and dense for the eye to discern.

Figure 10:
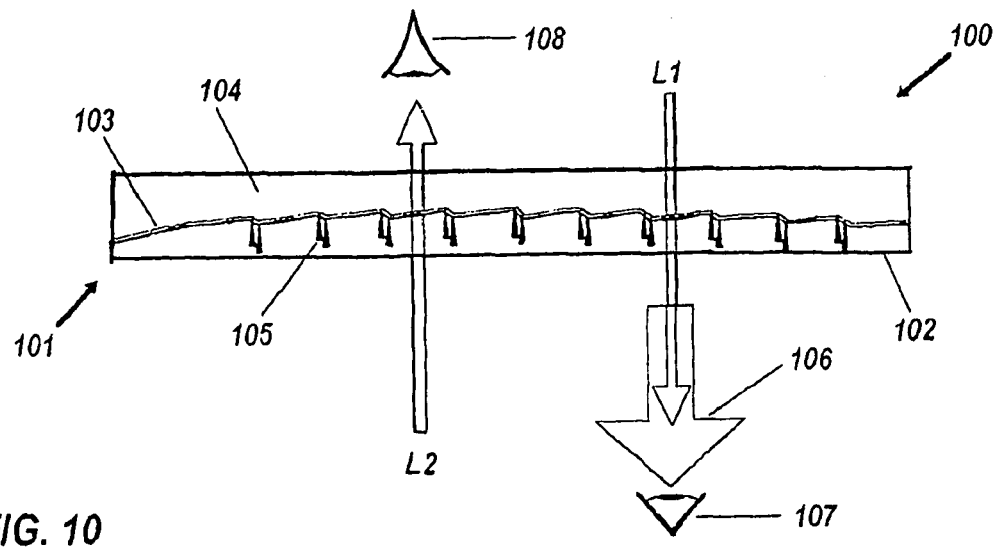
FIG. 10 shows a see-through backlight.

FIG. 10 is a side view of see-through backlight 100, comprising LED source 101, ejector 102 with its flow-line grooves forming air gap 103, and matching back piece 104. Beamlets 105 combine to produce visually strong output 106 for viewer 107, such that ambient light L1 is overwhelmed. Simultaneously, viewer 108 sees ambient light L2, relatively undisturbed by the flow-line surface of extractor 102.

Figure 11:
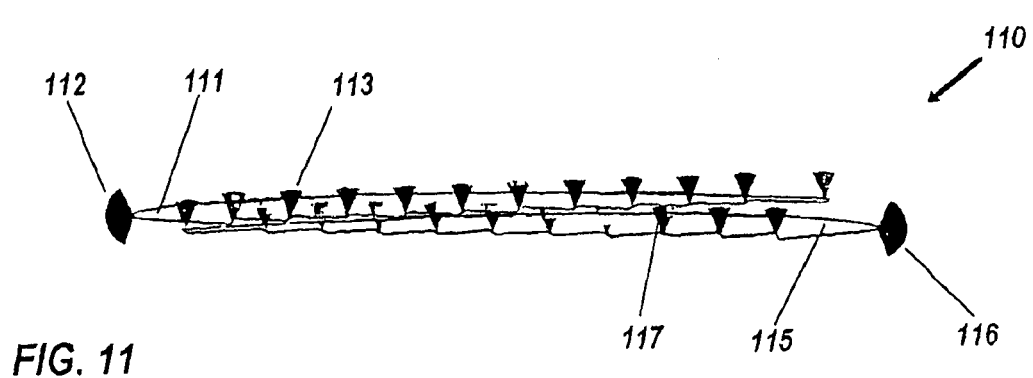
FIG. 11 shows a dual-color backlight.

FIG. 11 shows dual-color backlight 110 comprising upper backlight 111 and lower backlight 115, each with a different color of light. Wide-angle input ray-fan 112, of a first color, is transformed by backlight 111 into narrow-angle beamlets 113. Wide-angle input ray-fan 116, of a second color, is transformed by lower backlight 115 into narrow-angle beamlets 117. The two backlights are laterally positioned so that beamlets 117 shine between beamlets 113. For clarity, a third backlight is not shown stacked atop these two, whereby an RGB system is constructed.

Figure 12:
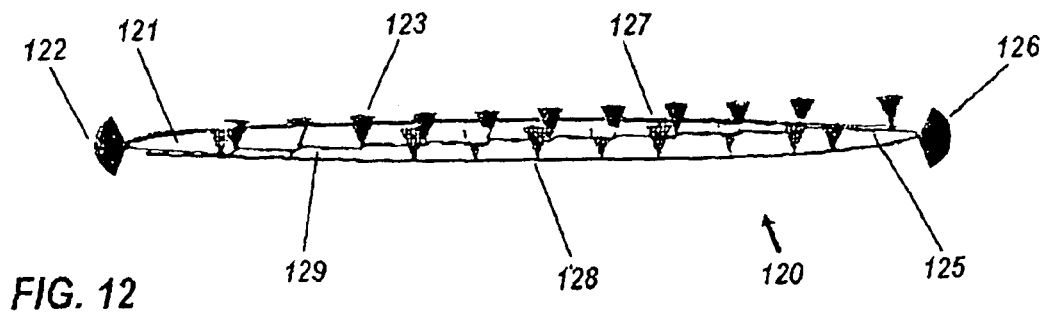
FIG. 12 shows a more integrated dual-color backlight.

If a third color is not necessary, a more compact configuration is possible. FIG. 12 shows dual backlight 120 comprising upper backlight 121 of a first color and inverted lower backlight 125 of a second color, with air gap 129 therebetween. Backlight 121 transforms wide-angle input 122 into beamlets 123. Lower backlight 125 transforms wide-angle input 126 into output beamlets 127 that are initially downgoing but are reflected upwards by mirror-coated surface 128 to join the beamlets of the first color.

For greater compactness, it is also possible to put the injection optics beneath the backlight. Several preferred embodiments are possible under this bottom-injection category, firing light either up or down.

Figure 13A:
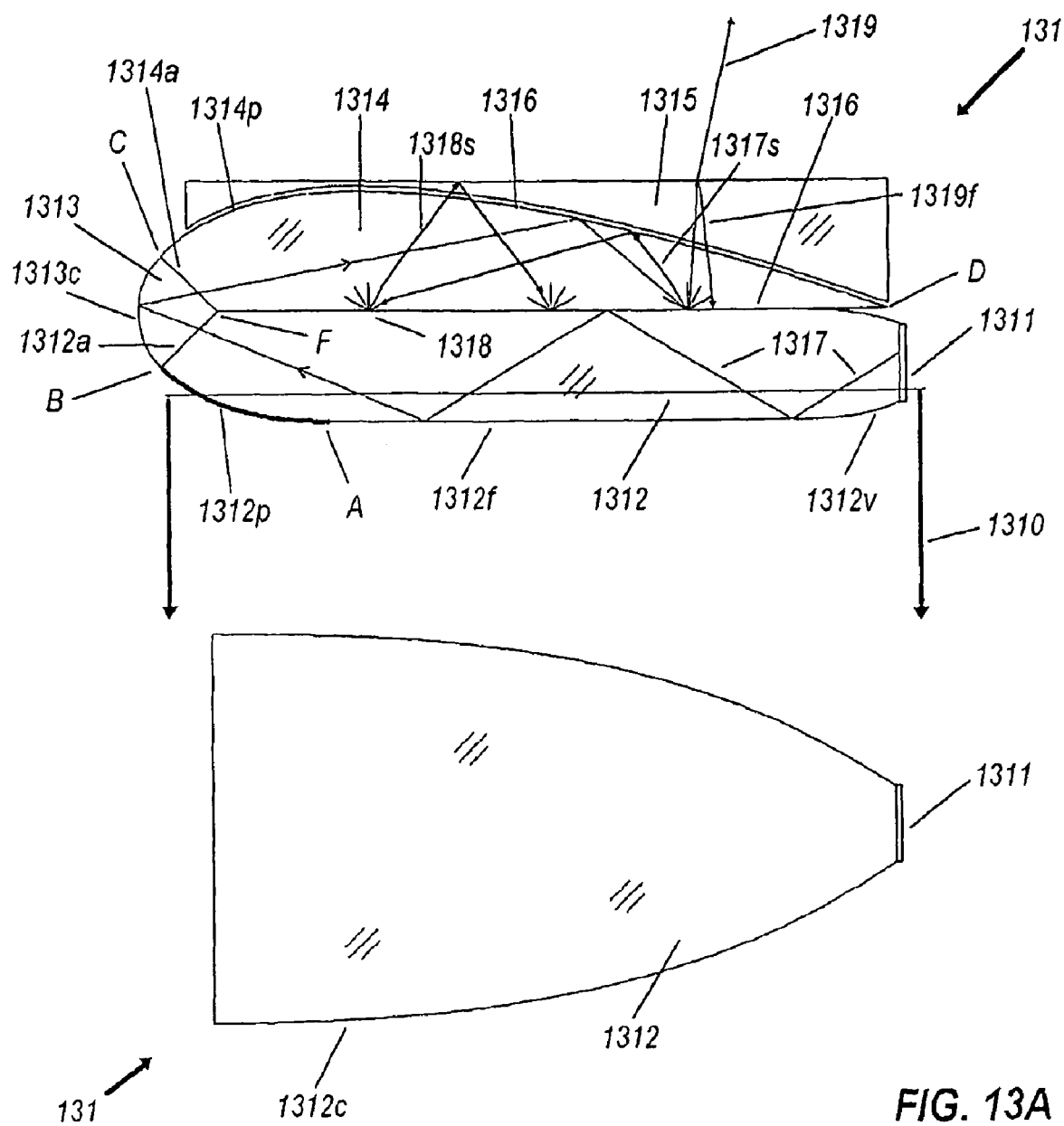
FIGS. 13A-E show side and cross-sectional views of folded-path backlights, with bottom injection.

FIG. 13A shows a side cross-section (above) and a plan cross-section (below, defined by lines 1310) of backlight 131, comprised of LED 1311, CPC lower section 1312, quarter-rod 1313, parabolic upper section 1314, and upper ejector wedge 1315, separated from 1314 by conformal air gap 1316. All but wedge 1315 are cemented, or otherwise optically coupled with no air gap, to the rest of the components of backlight 131. As seen in both cross-sectional views of FIG. 13A, LED 1311 is optically coupled to lower section 1312, the profile of which begins with the expanding vertical profile 1312V, leading to the slab-like body of 1312. The lower cross-sectional view of FIG. 13a shows horizontal CPC profile 1312C. The linear portion of the bottom profile of CPC lower section 1312 extends from the end of profile 1312V to point A. From point A to point B is reflective parabolic arc 1312p with focus at point F and axis 1312a. The upper profile of 1312 runs from point B to point F, then horizontally therefrom to the upper part of profile 1312V.

In the upper cross-sectional view of FIG. 13a, reflective circular arc 1313C defines the outer profile of quarter-rod 1313. From point C to point D runs parabolic arc 1314P with focus at F and axis 1314a, defining the upper surface of upper section 1314, as well as the lower surface of wedge 1315. Glued to the bottom of upper section 1314, but not touching the planar upper surface of lower section 1312, is white thin-film diffuse reflector 1316. Exemplary ray 1317 can be seen proceeding reflectively through the apparatus to terminate by being diffusely scattered upwards by white reflector 1316. Exemplary scattered ray 1317S is internally reflected back down to scattering at 1318, some of which escapes, such as exemplary ray 1319. One scattered ray, 1318S, is similarly internally reflected back down, by the flat top surface of wedge 1315. This illustrates that most of the trapped light scattered from reflector 1316 will be recycled back for another go at escaping through upper ejector wedge 1315 as backlight output. Also, the Fresnel reflections of such escaping light will similarly be recycled, as shown with ray 1319f. This recycling of internally reflected light advantageously increases backlight luminance and the uniformity thereof.

Figure 13B:
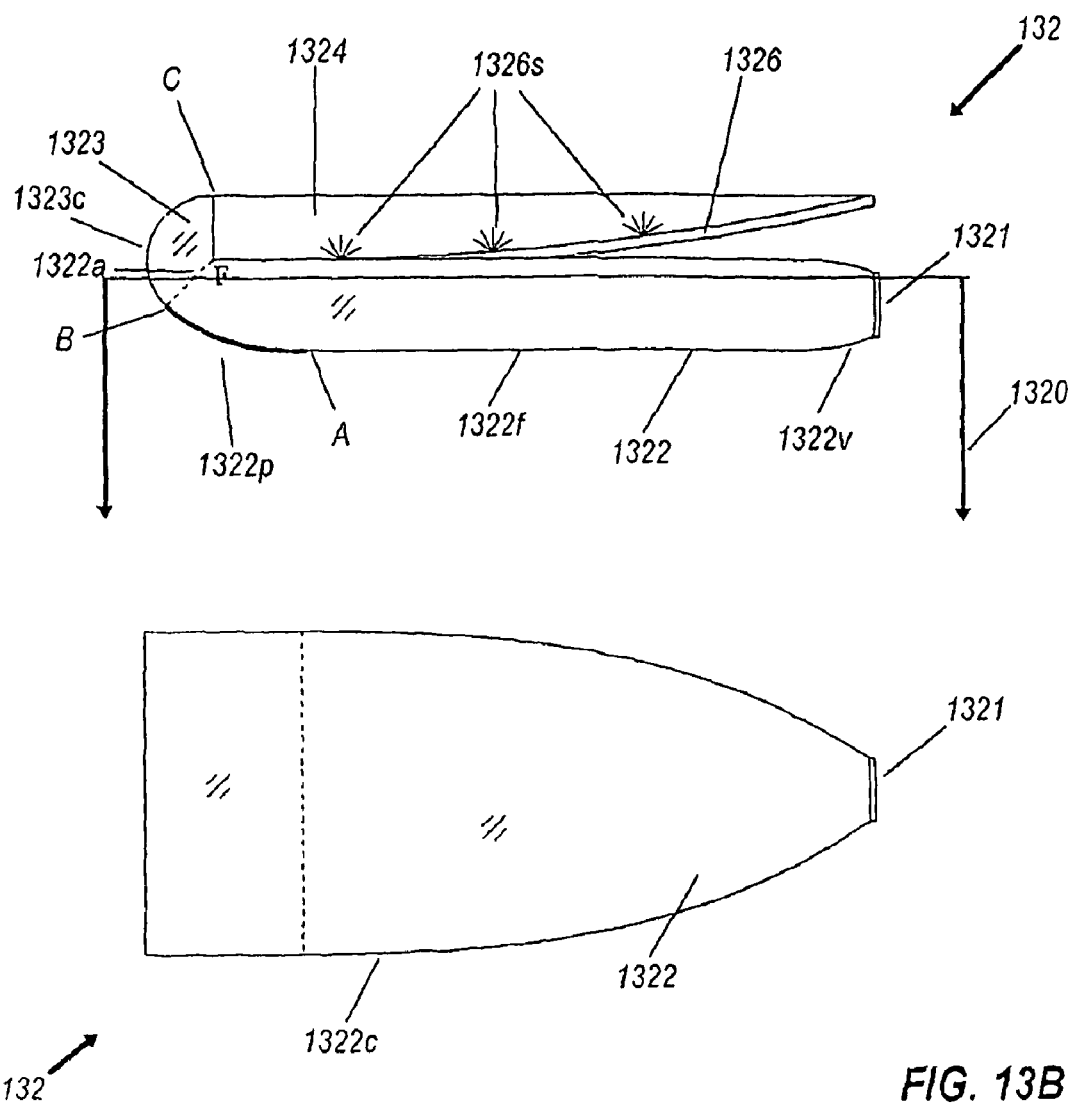

FIG. 13B shows a side cross-section (above) and a plan cross-section (below) of backlight 132, similarly comprised of LED 1321, lower section 1322, ⅜$^{th}$ cylindrical rod 1323, and parabolic-wedge upper section 1324, having diffuse reflector layer 1326 attached to its parabolic bottom, shown with exemplary light scattering points 1326s. For clarity, rays and their labels are not shown but they would be, similar to those of FIG. 13a. Lower section 1322 has expander profile 1322V next to where LED 1321 is coupled to 1322. The lower surface of 1322 also comprises flat lower surface 1322f, reflective parabolic arc 1322p, running from point A to point B with focus F and axis 1322a. Reflective circular 135° arc 1323c bounds rod 1323, is optically attached to sections 1322 and 1324.

Figure 13C:
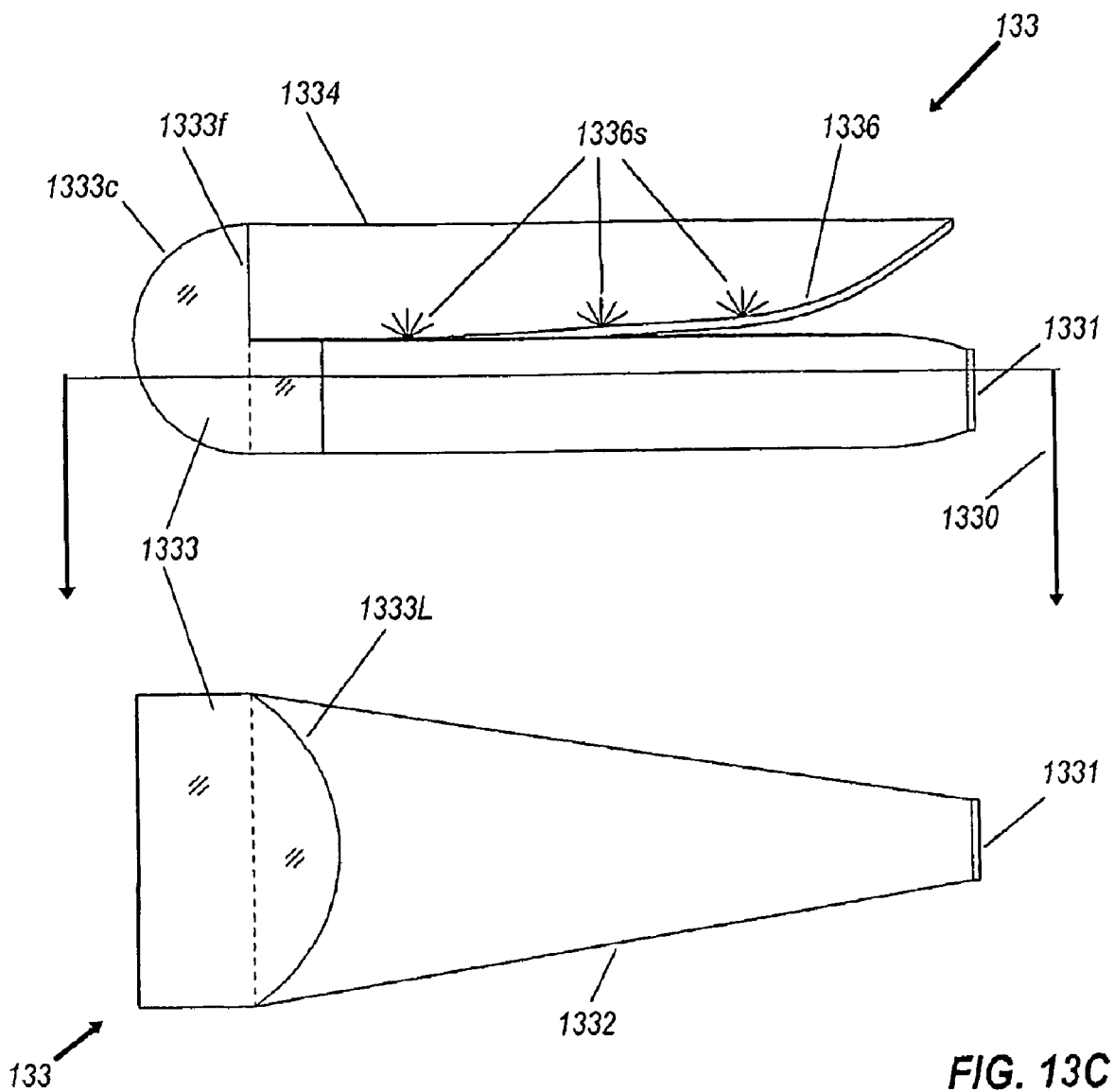

It would be advantageous if the reflective means on the previous two embodiments were not necessary, as would be the use of less dielectric material. FIG. 13C shows a side cross-section (above) and a plan cross-section (below) of backlight 133, which comprises LED 1331, lower hollow reflector section 1332 with cross-sectional viewpoint-lines 1330, lensed semi-rod 1333, and upper diffuse-reflector tray 1336, covered by diffuser 1334. Optical recycling is through backscattering by diffuser film 1334, back down to reflector 1336. Semicircle 1333c defines the outer profile of 1333, and acts by total internal reflection to send light, received from lens 1333L, up and back around through flat exit face 1333f onto tray 1336, for diffuse emission exemplified by scatterings 1336s. Lens profile 1333L acts in concert with hollow reflector 1332 to gather the light from LED 1331 and keep it guided within the body of 1333.

The next two preferred embodiments use an upper reflector to emit their output downward through the lower injector section, but are in all other respects geometrically identical to the shapes of FIG. 13A.

Figure 13D:
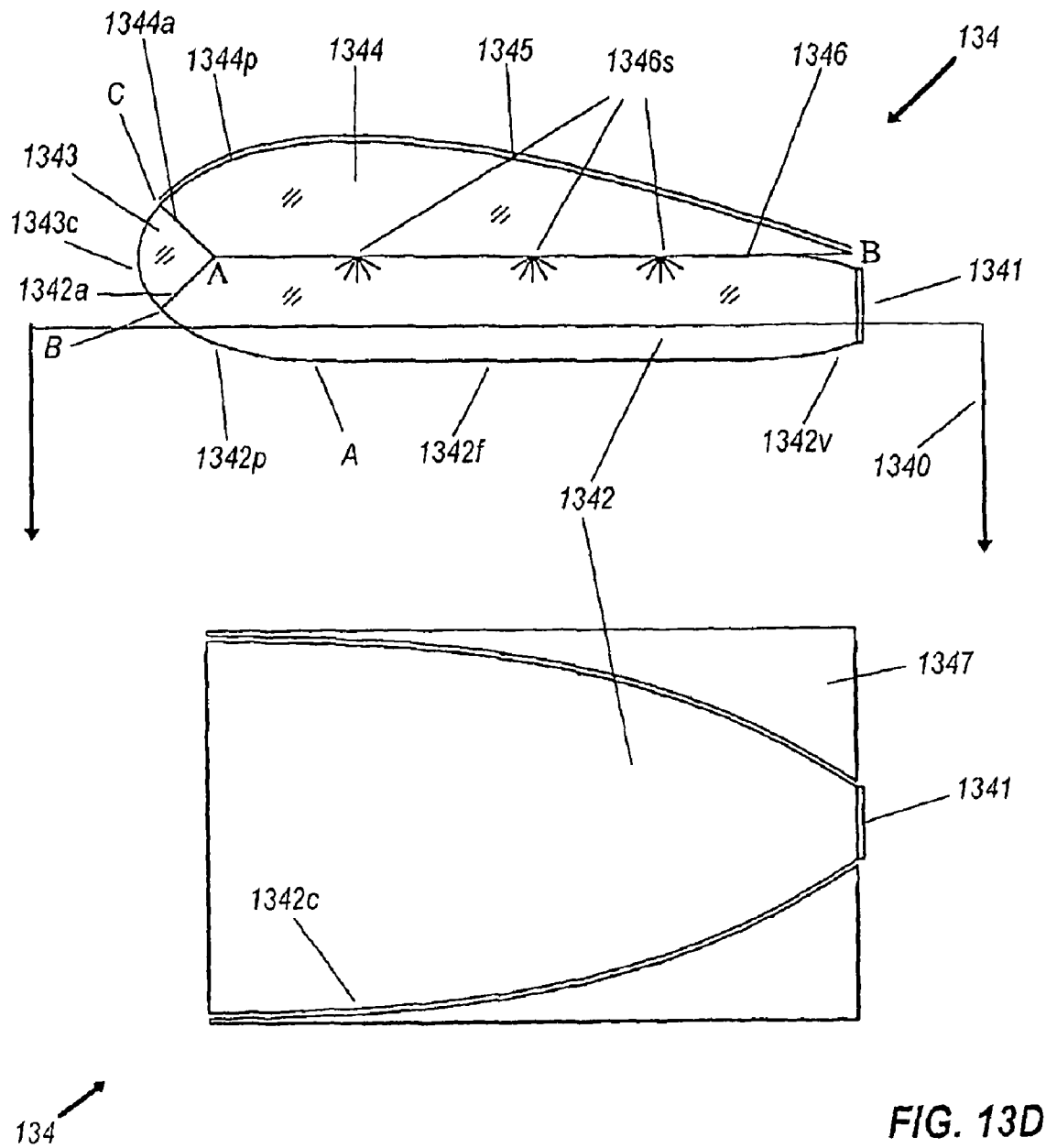

FIG. 13D shows a side cross-section (above) and a plan cross-section (below, defined by lines 1340) of backlight 134, comprised of LED 1341, CPC lower section 1342, quarter-rod 1343, parabolic upper section 1344 with, reflective coating 1345, diffusely transmitting window 1346 attached to the flat bottom of 1344, with a tiny air gap (not shown) between 1345 and the flat upper surface of lower section 1342. On both sides of CPC profile 1342c, across tiny conformal air gaps, are two lateral slabs 1347, which complete the backlight's lower output surface.

Figure 13E:
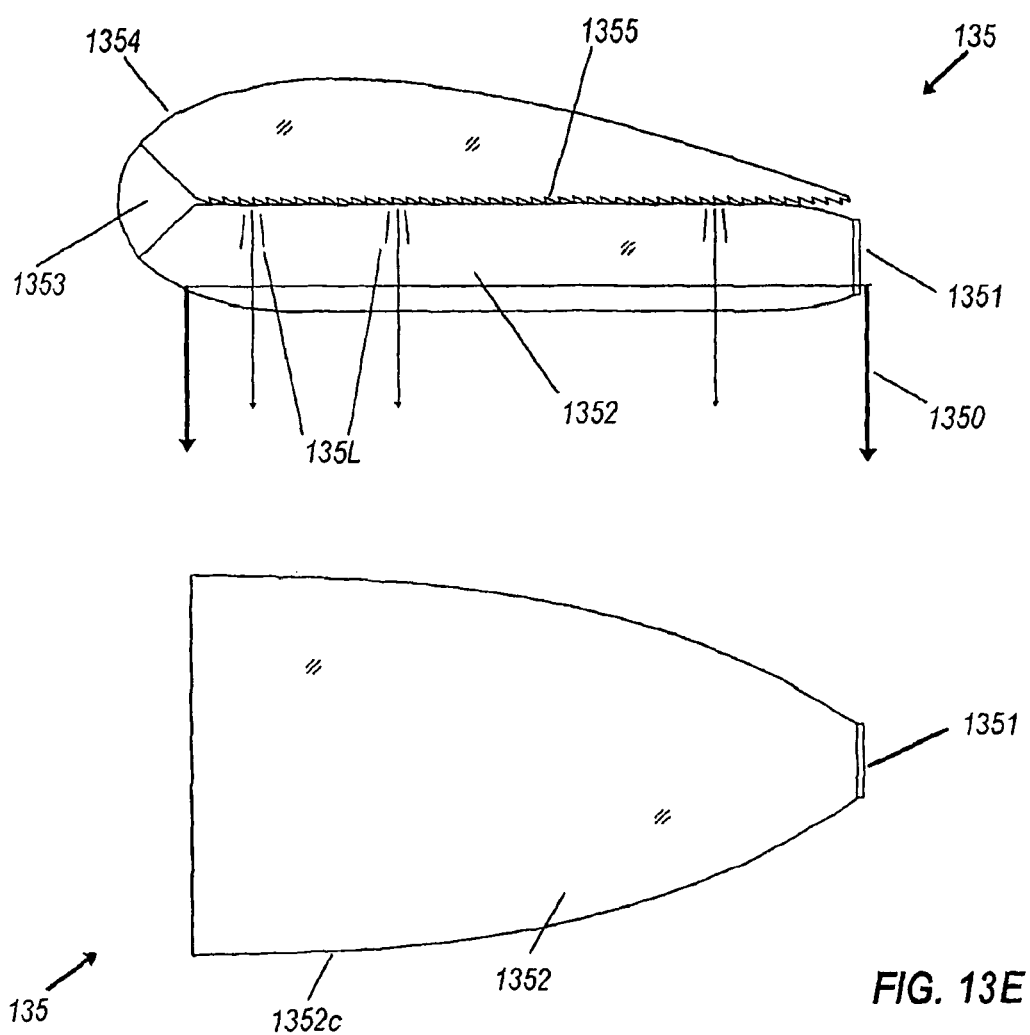

FIG. 13E shows a side cross-section (above) and a plan cross-section (below) of backlight 135, which comprises LED 1351, lower CPC section 1352 with cross-sectional viewpoint-lines 1350, rectangular upper ejector 1354 with flow-line grooves 1355, and quarter-rod 1353 optically joining the upper and lower sections. The lower view is a cross-section of lower section 1352 with horizontal CPC profile 1352c, illuminated by emitter 1351. Missing from the plan view are the optional lateral slabs as described in FIG. 13D as component 1347. This backlight operates entirely in a specular mode, with no diffusers, so that from each groove comes a small image of the light source, as signified by the narrow angles of rays 135L.

Figure 14A:
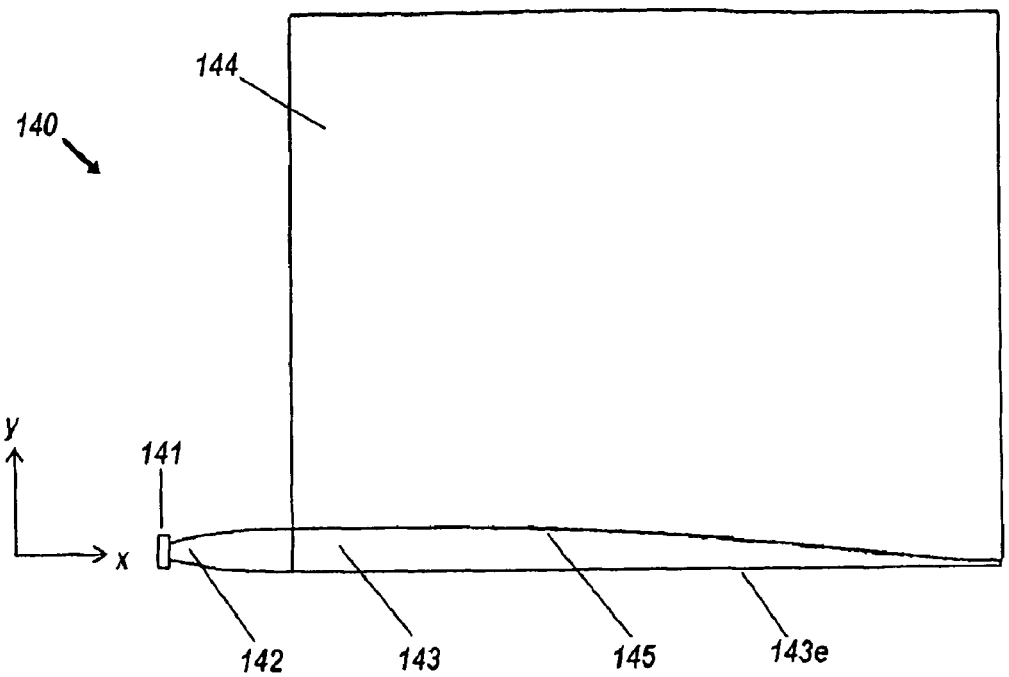
FIG. 14A is a bottom view of a square backlight system.

FIG. 14A is a bottom view of rectangular backlight 140, showing light source 141, an injector comprising a collimator 142, and a first beam-expander 143, an ejector comprising a second beam-expander 144 and having ejector faces (not shown). Lower-index transition layer 145 joins expanders 143 & 144. Straight bottom edge 143e has grooves similar to grooves 74 of FIG. 7D, and they are deliberately made too small to be resolved by the human eye so they cannot be shown in FIG. 14A either.

Figure 14B:
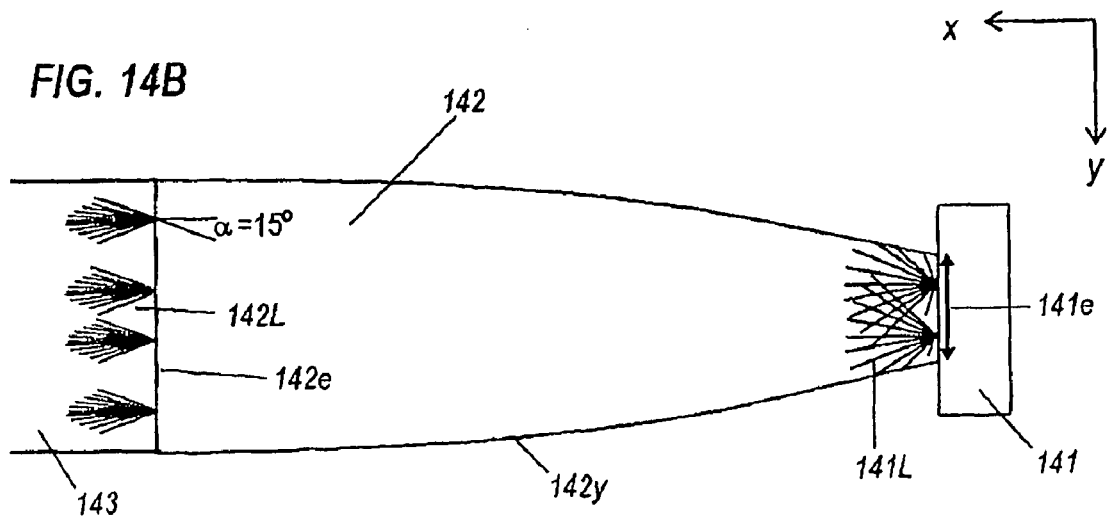
FIG. 14B is a close-up view of one part of the backlight system of FIG. 14A.

FIG. 14B is a close-up top view of LED package 141 and CPC 142, with x-y CPC profile 142y. Ray bundles of light 141L can be seen shining out of exit aperture 141e, where they have a large angular spread (±41°) but a small spatial extent. Exiting ray-bundles 142L at collimator exit aperture 142e have smaller angular spread ($\alpha$=15°) than that of the rays of 141L, but compensatingly larger (2.5:1) spatial spread.

Collimator 142 reduces the angular spread of light source 141 and consequently expands the light spatially.

Figure 14C:
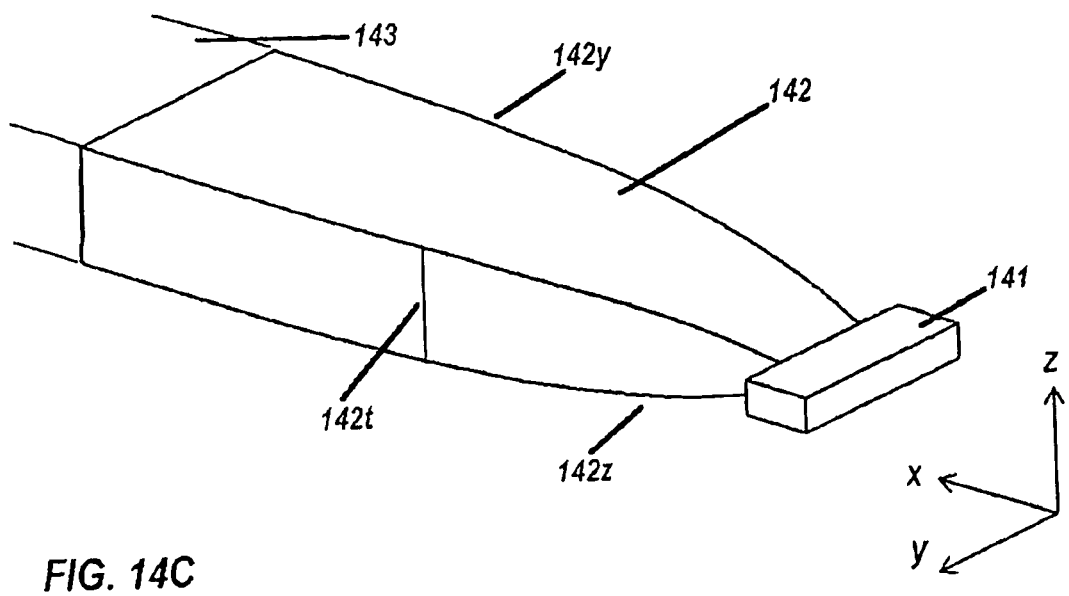
FIG. 14C is a perspective view of the part of FIG. 14B.

FIG. 14C is a close-up perspective view of collimator 142, showing how it has the shape of a rectangular crossed CPC, formed by linearly swept CPC x-y profile 142y and narrower CPC x-z profile 142z, linearly swept orthogonally. Profile 142z is fully expanded at line 142t, and thickness is constant thereafter. Profile 142z is made narrower than profile 142y in order to minimize overall device thickness.

This CPC configuration is a good option for this collimating function, because it can be simply made of a piece of injected plastic without any additional metallization, since it operates entirely by total internal reflection, requiring only that the mold surfaces have very little roughness. Although such a CPC can be disadvantageously long when compared to other possible collimators, the small size of the LED sources used with some present embodiments makes the length of the CPCs acceptable, since they offer the twin advantages of nearly total collection of Lambertian output and of little increase in etendue. A modification of the CPC known as the flow-line concentrator [Reference 1] is a candidate collimator as well.

Figure 14D:
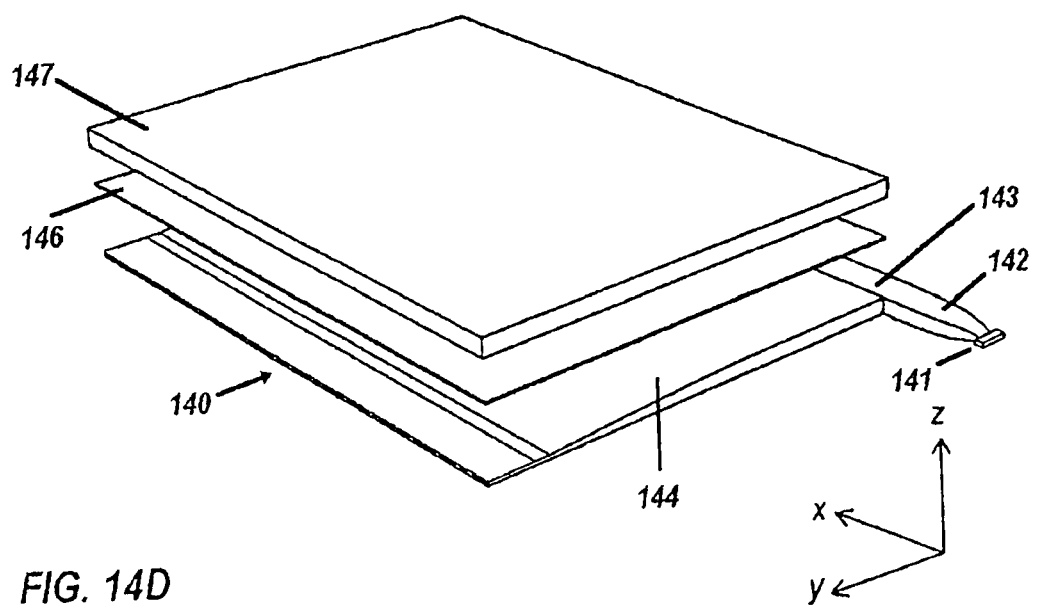
FIG. 14D is an exploded perspective view of the backlight system of FIG. 14A.

FIG. 14D shows a perspective view of backlight 140, also showing, in exploded-view positions, LCD 147 placed over its luminous output and diffuser 146 in between it and backlight 140.

Figure 14E:
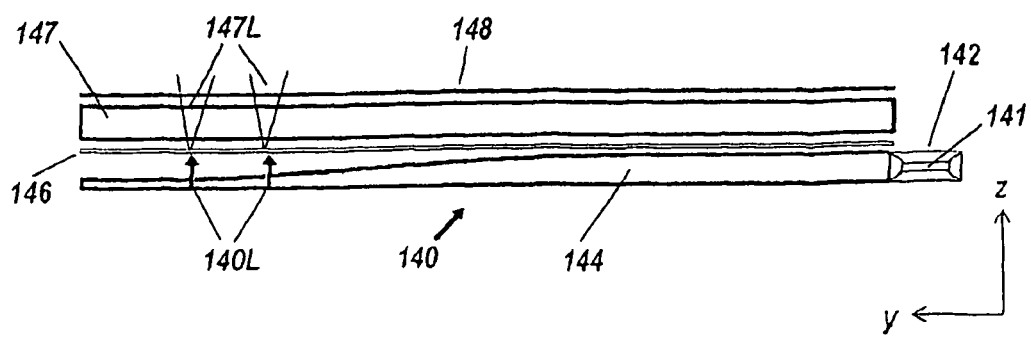
FIG. 14E is a side view of the backlight system of FIG. 14A.

FIG. 14E is a side view of the backlight, also showing diffuser sheet 146 between backlight 140 and LCD 147. Backlight 140 sends collimated output light 140L into diffuser 146, resulting in a wider angle subtended by output light 147L coming from LCD 147.

Figure 14F:
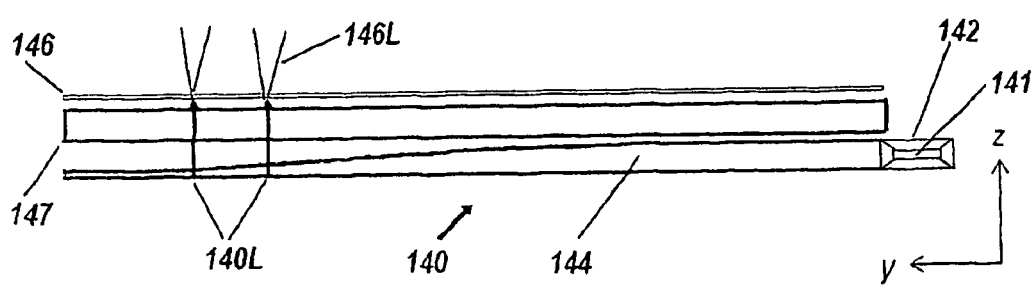
FIG. 14F is a side view of the backlight of FIG. 14A showing an alternative diffuser placement.

FIG. 14F shows the same backlight 140, but with diffuser 146 above LCD 147. In this alternative preferred embodiment, collimated light 140L goes through LCD 147 with a small angular spread, advantageously enabling the LDC to achieve a higher contrast between its pixels. The disadvantage of this solution is that diffuser 146 becomes as a screen, in that the viewer sees not the pixels of the LCD, but a somewhat blurred version of their image, because light 140L spreads out a little across the distance from the LCD pixels to the diffuser. This disadvantage can be reduced enough to be negligible, with the smaller angular spreads provided by this embodiment.

Figure 14G:
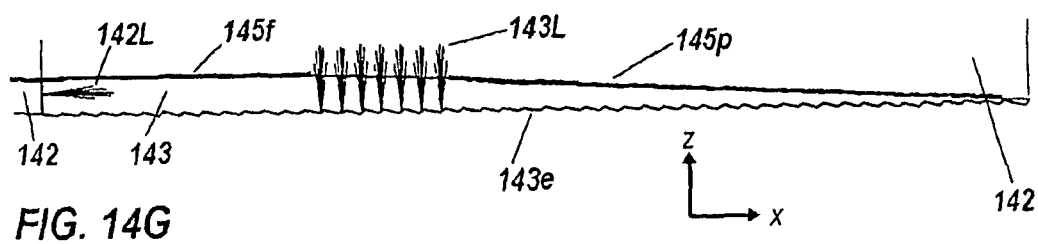
FIG. 14G shows a cross-section view of the injector for the system of FIG. 14A and its beam expander with its ejection features.

FIG. 14G is a close-up bottom view of first beam expander 143, partially showing collimator 142. Light rays 142L come in from collimator 142. The upper surfaces of first beam expander 143 are seen to comprise a flat portion 145f and a parabolic-arc portion 145p. As long as rays 142L have uniform divergence, this profile will produce uniform irradiance along the bottom surface of first beam expander 143, which is shown with the size of its structure exaggerated for clarity. Bottom surface 143e reflects upward this uniformly reflected light, whence it becomes upward going rays 143L, which pass through upper surfaces of first beam expander 145 and into the second beam expander 144 of the ejector.

Figure 14H:
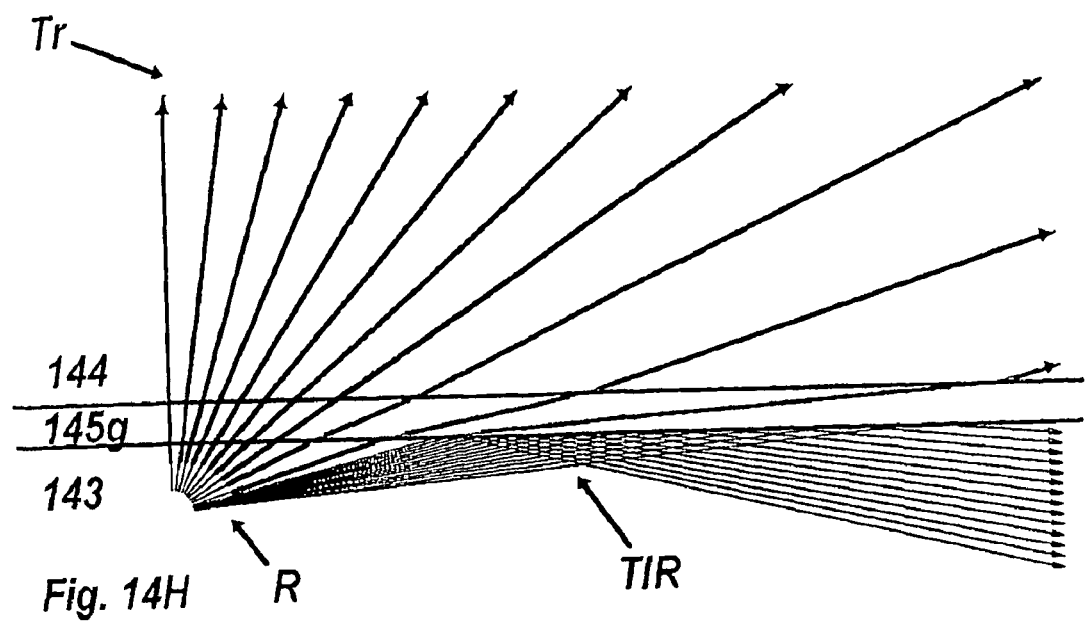
FIG. 14H is a close-up view of the upper surface of a first beam expander where it is joined to a second beam expander of the system of FIG. 14A.

FIG. 14H is a close-up view of the upper surface of first beam expander 143, where it is joined to second beam expander 144 by thin glue layer 145g, comprised of material with slightly lower refractive index (1.45) than that of adjacent electors 143 & 144 (1.495). Theoretical ray fan R is shown to illustrate the effect of incidence angle upon ray transmittance. Between n=1.495 and n=1.45, the critical angle is 76°, causing the 'TIR' rays to be deflected downwards while remaining rays are transmitted. This small index difference suffices for the deflector function of 145g in the present example. Transmitted rays 'Tr' proceed in their original directions with only a minor lateral shift.

Figure 14I:
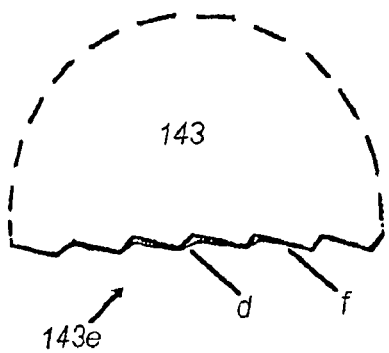
FIG. 14I is a close-up view of the tiny grooves of bottom surface of the same first beam expander.

FIG. 14i is a close-up view of the tiny grooves of bottom surface 143e of first beam expander 143, comprising deflector facets d connected by flow-line facets f. As discussed in connection with FIG. 3, flow lines are reflective surfaces that leave the overall light-field untouched. In this case such reflection does not need a mirrored surface, since incidence angles are high enough for total internal reflection to operate. The term 'microstructure' is used to describe optical structures such as these that are too small for the human eye to discern.

Figure 14J:
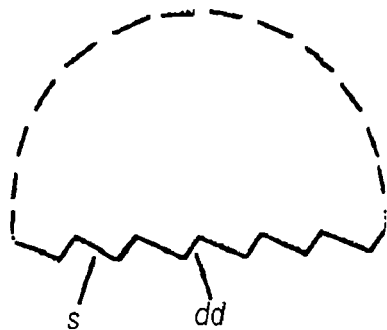
FIG. 14J shows an alternate configuration of same.

FIG. 14J is a close-up view of an alternative configuration for such microstructured grooves. Deflector facets dd are connected by shadowed surfaces s, which receive no illumination and thus are optically inactive.

Backlight 140 of FIGS. 14A thru 14G performs two orthogonal beam expansions upon the light proceeding within it. The overall 700:1 (by area) beam expansion is drastic by any measure, yet it is accomplished within the very thin depth of backlight 140. The first beam expansion, along the x axis, is by linear beam expander 143. The second, along the y-axis, is by planar expander 144. Both of these have the same two-dimensional profile-shape, one that is derived herein by a flow-line method which follows.

The mathematical object called phase space is utilized, a concept that originated in analytical mechanics. In optics, phase space is the product of the space coordinates (x,y,z) and the space of the three corresponding optical momentum coordinates (p,q,r). The optical momentum corresponding to the x axis is the product of the refractive index n and the cosine of the angle α the ray makes with the x-axis. The other optical momenta have equivalent definitions. In a 2D problem, in which all the rays are contained in the x-y plane, the optical momentum q with respect to the y axis can also be written as $$q = n \sin(\alpha)$$

remembering that α is the ray's angle with the x-axis, so that its angle with the y-axis is 90-α, the cosine of which is sin(α). The utility of the optical momentum concept lies in the fact that the flow of light through phase space becomes that of an incompressible six-dimensional fluid, with etendue being equivalent to its volume and luminance its density. Particularly valuable for optics are the phase-space conservation theorems also known as the integral invariants of Poincare (Reference 1, p. 99). One of these integral invariants can be expressed as the zero divergence of a vector field J, called the geometrical vector flux. Everywhere in space it points in the direction of maximum illumination, with its magnitude being that maximum amount. Any vector field has integral curves, defined as paths generated by integrating the vector as a velocity of motion at each point. The integral lines of the geometrical vector flux are called flow lines. These flow lines are used to design the profiles of the beam expanders.

In the beam-expander profiles utilized herein, a two-dimensional phase space suffices for understanding. The canonical edge rays at the beam expander entry aperture are $q_0(y)=-n\sin(\alpha)$ and $q_1(y)=n\sin(\alpha)$ at the two bounding positional coordinates $y_0=-L/2$ and $y_1=L/2$. They form the corners of a rectangular phase-space zone in the y-q plane. The area of this rectangle is the etendue of the bundle of rays, each of which is represented in the y-q plane as a point inside the rectangle. This etendue is $E=2nL\sin(\alpha)$. This principle is illustrated by FIG. 15 for L=3 mm and α=15.5°, showing phase-space coordinates y and q. Phase space zone 150 is a rectangle bounded by the lines 151 (y=1.5 mm), 152 (y=-1.5 mm), 153 ($q=q_0=-1.5*\sin 15.5°=-0.4$), and 154 ($q=q_1=0.4$). The rectangle's edges represent the edge rays, four of which are the corners C1 through C4.

In FIG. 15a the phase-space boundaries 153 together with 151 and 154 together with 152 are respectively the sets of edge rays hereinafter designated $M_0$ and $M_1$. They are shown explicitly in FIG. 15b, but pulled back from their actual locations for clarity. Each edge-ray set is continuous in the phase space. These two sets comprise all of the edge rays, i.e., those at ±α emanating from points of the aperture as well as the rays between $+\alpha$ and $-\alpha$ emanating from either end of the aperture. The corresponding rays are shown in FIG. 16b.

FIG. 16a is a diagram in the x-y plane showing aperture A (3 mm wide) with edge rays C1 and C2, corresponding to the rays represented by the corners in FIG. 15. The open trapezoidal region 162 is bounded by the aperture A and the ray trajectories C3 and C4. Also shown are edge rays C1 and C2, intersecting on centerline $F_0$ to define triangular region 161. Exemplary point P is illuminated by rays between limiting rays E and R, and line T is their angular bisector, marking the direction of the geometrical vector flux J at P.

FIG. 16b shows how ray set $M_0$ comprises all rays parallel to edge ray C4, plus all rays (except C3) emanating form the right edge of aperture A. The other ray set, $M_1$, would have a diagram that is the mirror image of FIG. 16b, with rays C3 and C1 instead of C2 and C4, respectively. Thus all points within region 162 of FIG. 16A are crossed by one and only one ray of $M_0$, and one and only one ray of $M_1$.

Within region 162 of FIG. 16A we can define ray vector fields $v_0(x,y)$ and $v_1(x,y)$ such that each vector field is everywhere tangent to the ray trajectories of the corresponding set $M_0$ or $M_1$, and with scalar magnitudes such that $|v_0|=|v_1|=n$, where n is the refractive index of the medium in region 162. FIG. 16b shows two examples of $v_0(x,y)$, at vectors 165 and 166. Because $v_0(x,y)$ and $v_1(x,y)$ are optical vector fields, then there must be two functions $O_0(x,y)$ and $O_1(x,y)$ such that their gradients fulfil: $\nabla O_0(x,y)=v_0(x,y)$, and $\nabla O_1(x,y)=v_1(x,y)$. Therefore, these functions are solutions of the eikonal equation. The curves $O_0$=constant and the curves $O_1$=constant are the wavefronts of the corresponding bundle. Two examples of the former are shown in FIG. 16b as wavefronts 167 and 168.

Let us define the path-length difference functions $i(x,y)=(O_0(x,y)-O_1(x,y))/2$ and $j(x,y)=(O_0(x,y)+O_1(x,y))/2$. These two functions are orthogonal since $\nabla i \cdot \nabla j=0$. Note also that $\nabla j=(\nabla O_0(x,y)+\nabla O_1(x,y))/2$ everywhere bisects the angle formed between the edge rays of $M_0$ and those of $M_1$. From this we conclude that the lines inconstant, which are everywhere tangent to $\nabla j$ are the flow lines of the bundle.

FIG. 16c shows ensemble 160 of flow lines from aperture A, including central line F0 and bounding lines F3 and F4. For line F0, $i(x,y)=0$, and i<0 to its left and i>0 to its right, with each flow line having its unique value of $i(x,y)$. Within triangular region 161, the flow lines are vertical straight lines. Outside triangular region 161 but inside the region in between the straight lines C1 and C2 of FIG. 16a, flow lines are confocal hyperbolas with foci at the ends of aperture A. The remaining flow lines portions are parabolas with focus at one end of the aperture A and tilted an angle $\pm\alpha$. Except for straight lines F0, F3, and F4, the curved flow lines of FIG. 16c have the type of shape seen in the top side of expander 144 of FIG. 14F and profile 145p in FIG. 14G.

Figure 17A:
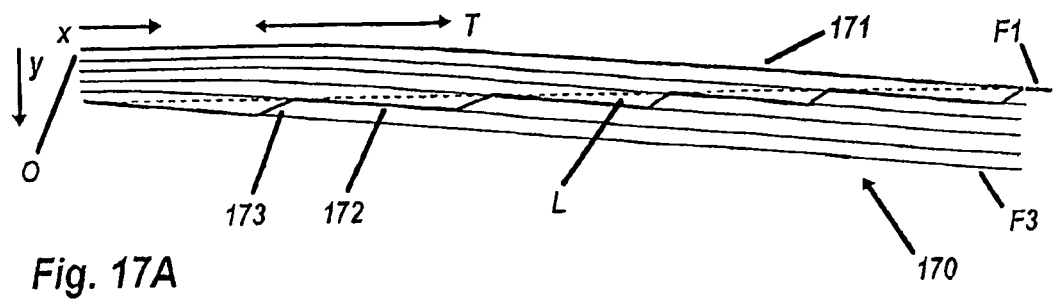
FIG. 17A shows how these flow lines result in the profile of an ejector.

An important aspect of the flow-lines of FIG. 16C that mirror-surfaces aligned with those flow-lines will not disturb the other flow-lines. Thus if only a portion of aperture A of FIG. 16C is actually utilized, then ensemble 160 can be divided up along any flow line, such as darkened line F1. This flow-line would be operable as a beam-expander profile for the sub-aperture B, even for an aperture was somewhat tilted off the y-axis. This is because the ejector plane will be in a new y-axis FIG. 17A shows the construction of beam-expander 170, with the flow lines of FIG. 16c repeated from F1 to F3. Top surface 171 follows flow line F1 out to its interception with dotted level-line L. Steps 172 are seen as segments of flow lines below F1. Their size is greatly exaggerated for clarity, whereas actual steps are generally smaller across than a human hair. Depending on the design parameters, these ejectors are operable for total internal reflection and thus, in these cases, they don't need to have a mirror coating.

Let T be the desired length of the projection of the microstructured line on the display and let N be the number of microstructures to design, e.g., N=500, for which N flow lines would be established. The coordinate origin is point O. The first of steps 172 extends along flow line F3 until x=T. Then the first of ejector faces 173 is situated. This will be a reflector that will eject the light out of the beam expander. We must know in advance the direction in which we want to eject the beam. For instance assume that we want to eject the beam so it leaves the beam expander perpendicularly to the display line L. Each ejector face is calculated as the line that reflects the beam so the central ray of the beam leaves the beam expander in the desired direction. Note that, if the design is successful, the central ray is refracted at the deflector curve 171, so that such refraction must be considered when designing the ejector. In general the ejectors are so small that it is enough to consider that they are portions of straight lines for which we have only to calculate the slope. The ejector face ends when we find the next flow line. The remaining calculations are repetitions of this first one.

Figure 17B:
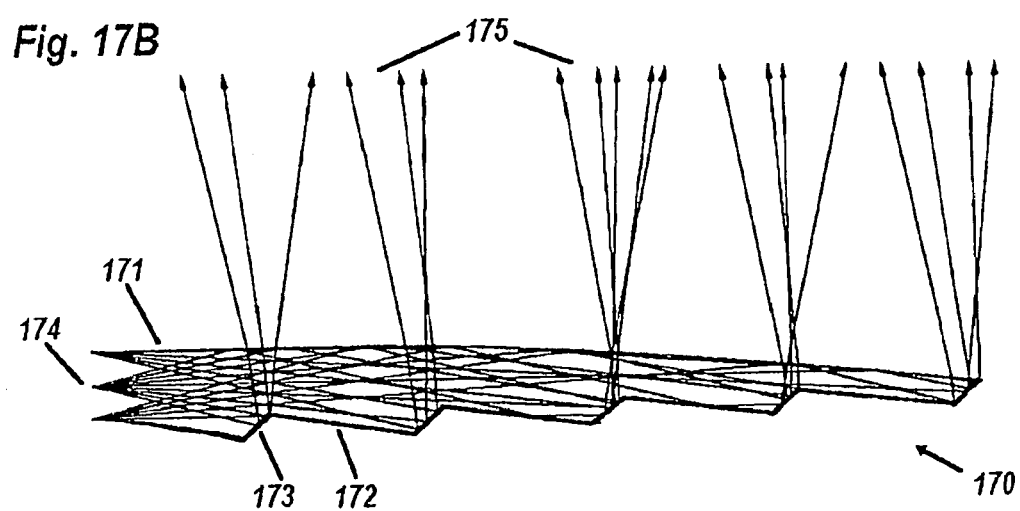
FIG. 17B shows the profile of an ejector with three ray fans and the ejector faces.

FIG. 17B shows beam expander 170, comprising upper deflector surface 171 and a faceted lower surface representing the hundreds of features of the actual microstructure. Steps 172 and ejector faces 173 are as in FIG. 17A. Three ray-fans 174 are shown to illustrate the action of ejectors 173. Each of the ejector faces 173 are seen as properly angled for their output rays 175 to go predominantly upward.

Figure 17C:
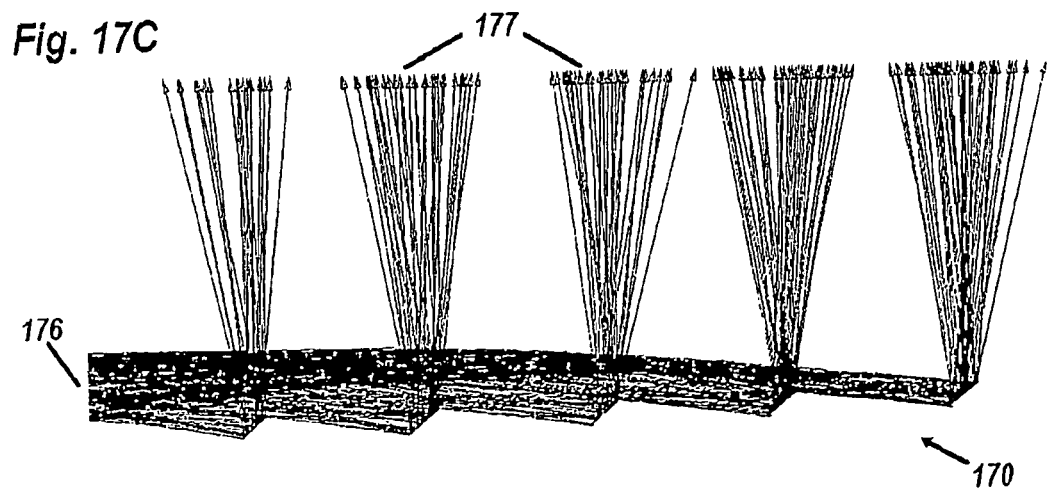
FIG. 17C shows the profile of an ejector with a random emitter.

A denser set of input rays would produce a more even set of output rays, but clarity would suffer, as seen in FIG. 17C, which also shows random emitter 176 restricted to $\pm\alpha=15.5°$. The output ray bundles 177 show substantially equal strength across the width of ejector 170. With a large number of ejectors uniformity would be high.

Assuming that the radiance of the light beam is constant for each of its rays, then the irradiance falling on a given surface is proportional to the etendue per unit of area intercepted by this surface. In a 2D problem "surface" is replaced by "line". The above design procedure ensures that the etendue per unit of length along the display is approximately constant (mathematically this is $\partial E/\partial x$=constant for the points of the microstructured line) i.e., the irradiance is constant along the display if the rays of the beam have the same radiance. The approximation is better as the number N of microstructures increases.

If $\phi(x)$ is the largest angle formed by the edge rays passing through the point of the microstructured line with coordinate x and $\varphi(x)$ is the smallest, then $$\left.\frac{\partial E(x)}{\partial x}\right|_{microstructured\ line} = \cos\phi(x) - \cos\varphi(x) \qquad (2)$$

For the example of FIG. 17's flow lines, $\partial E/\partial x$ is constant because both $\phi$ and $\varphi$, are constant.

The beam expander design method explained above is for 2D geometry, i.e., for a beam of rays contained in the plane of the beam expander profile. Moreover, the method assumes a constant radiance of the input rays, as well as zero absorption of the dielectric material and 100% specular reflectivity at every reflection, with no scattering. As these assumptions are unfulfilled in actual reality, more design steps are required to fine-tune the design. For simplicity, we will assume that the design goal is to achieve constant irradiance on the display surface, since a prescribed irradiance variation can easily be accommodated. For generality, the source is a single LED with a rectangular aperture of dimensions S times s (S≧s, assume for example that S is the dimension in the y axis and s in the z axis of FIG. 14C). The display is also rectangular with dimensions D and d (D≧d), assume for example that D is the dimension in the x axis and d in the y axis of FIG. 14C). We are going to consider two linear designs which will be mixed in the back light design. As in FIG. 14C, the collimator 142 will be formed by the crossing of two linear concentrators, each one of the linear-sweep type of design.

Consider the rays emitted by the source and contained in the symmetry plane of an LED with aperture side S. The first beam expander collimates and expands these rays and the second beam expander is devoted to the source rays contained in the x-z plane 1. Set the size of the collimator aperture (C times c). This size should be such D≧C≧S and d≧c≧s. The ratios C/S and c/s define the collimation of the 2 crossed linear devices forming the collimator. These two linear devices are designed as flow line concentrators [1] for a constant angular emission. The emission angles for the linear devices will be called respectively ±A and ±α. Consequently the etendues of the 2D bundles at the collimators exit aperture are $E=2n_cC \sin(A)$ and $e=2n_cc \sin(\alpha)$, where $n_c$ is the refractive index at the collimator aperture. Of course, these etendues should equate respectively the etendues of the incoming bundles at the LED aperture. Thus, the angles ±A and ±α can be calculated from these equations.
2. Design the first and the second beam expanders according to the procedure explained above, i.e., assuming among other things that the radiance of any ray is constant (for instance equal to 1).
3. Calculate by ray tracing the irradiance at the first beam expander output plane or at a plane close to it $I_{1rr}(x,z)$ taking into account the phenomena not considered in the previous design (absorption, scattering, etc). To calculate this function by Monte-Carlo ray tracing, the output plane is divided in small cells and the rays hitting each cell are counted. Since the variance of the hit-counts is the square root of the count, at least 1,000 rays must be received per cell, setting the minimum ray-count for the simulation. The irradiance is assumed to be approximately constant for the points of each cell. Choose the size of the cell so it contains several microstructures, for instance more than four. Normalize this irradiance for unit total flux: $\int I_{1rr}(x,z)dxdz=1$.
4. Calculate $R_1(x)=(\int dx)\int I_{1rr}(x,z)dz$. Note that the average value of $R_1(x)$ is $1=(\int R_1(x) dx)/(\int dx)$
5. Recalculate the profile of the first beam expander assuming that the radiance of the rays $R_1(x)$ depends on the point x where they meet the microstructured line. This modifies the ejector slope and placement. The flow line now extends until the coordinate x increases $(\Delta x)_n=(1-k(1-R_1(x)))(\Delta x)_o$, where $(\Delta x)_o$ is the uniform coordinate increase $(\Delta x)_o=T/N$ of the original design and k is a factor 0≦k≦1. The larger the radiance, the larger the portion of flow line covered by the step, consequently reducing the density of ejectors, which causes a decrease of the output radiance for the next iteration. The largest k gives a faster convergence but with more instabilities. The ejector tilt will change very little at its new position. The second beam expander is designed in a similar way.
6. Calculate by Monte-Carlo ray tracing the irradiance at the second beam expander output plane (this plane could be the display) $I_{2rr}(x,y)$). Normalize it so that $\int I_{2rr}(x,y) dxdy=1$.
7. Calculate $R_2(y)=(\int dy) \int I_{2rr}(x,y)dx$.
8. Recalculate the second beam expander profile considering that the radiance of a ray is $R_2(y)$, where y is the y-coordinate of the ray when it intercepts the microstructured line. The flow-line step under consideration now extends until the coordinate y increases $(\Delta y)_n=(1-k(1-R_2(y)))(\Delta y)_o$ where $(\Delta y)_o$ is the coordinate increase done in the initial iteration and k is a factor 0<k≦1. Go to step 6 until $R_2(y)\approx 1$.
9. Although $R_2(y)\approx 1$, $I_{2rr}(x,y)$ may still be uneven in x direction due to the edge-effects at the borders. In this case redesign of the first beam expander (step 4) using $R_1(x)=(\int dx)\int I_{2rr}(x,y)dy$ instead of $R_1(x)=(\int dx) \int I_{1rr}(x,z) dz$.

When a uniform emitter restricted to ±α shines between two parallel perfect mirrors normal to the flow lines, the rays will propagate indefinitely and every point will 'see' the full ±α of light, so that the flow lines are just parallel straight lines. On this basis a straight deflector is envisioned, having many advantages.

FIG. 18 shows such a straight deflector, formed from parallel flow lines 180, with top flat surface 180 as its upper deflector. Horizontal steps 182 are joined by tilted ejectors 183. Dotted line 184, joining the upper vertices of the ejectors, is also a straight line, establishing it as the profile of a truly microstructured lower surface. Enclosing a material of refractive index n, the entire profile comprising upper deflector 181 and lower steps 182 and ejectors 183 will guide rays coming through input aperture 185. When ejectors 183 are tilted at 45° for vertical output, total internal reflection is operable for:

$$\alpha<45°-\sin^{-1}(1/n)=5.7° \text{ for } n=1.58$$

A wider input beam than this will require coated ejectors.

It is possible to increase this admittance angle α, and a brief return to FIG. 16c shows how. The right half of aperture A, and all its flow lines, from central flow line F0 to edge line F3, are the basis for the ejector of FIG. 19, with beam expander 190 having a straight-top deflector, 191, and downward running steps 192 and ejectors 193. Limit rays C1 and C2, is the same as in FIG. 16b, as is straight central flow line F0. Advantageously, the average number of reflection for the rays of the light beam is smaller and the thickness of the beam expander is more constant along its width, compared with FIG. 18. This is particularly pertinent to injection moulding. The dotted line 194 is the same as 184 joining the ejectors in FIG. 18 is re-drawn herein to show the more favourable consistency of thickness of this beam expander profile.

FIG. 20 shows a backlight unit containing an LED source 201, an injector consisting of a collimator 202, and a first, linear beam expander 203 and an ejector consisting of a second, planar beam expander 204, both of which have an flat deflector upper profile and a curved faceted lower profile, the latter with a microstructure comprising flow-line-following steps and slanted ejector faces. Flat end 205 is operable to internally reflect glancing light, preventing losses. The corresponding flat end on the opposite side, not visible in FIG. 20, needs to come all the way to the ejector for first expander 203. Otherwise, illumination in that near corner of expander 204 may be excessively reduced by leakage. Similar to the situation of FIG. 14H, line 206 would be a separation between CPC 202 and beam expander 203, with a clear optical cement of specified refractive index just a little under that of CPC 202 and expander 203. The same type of layer would be at line 207, between the two beam expanders, so that the first can function.

Figure 21:
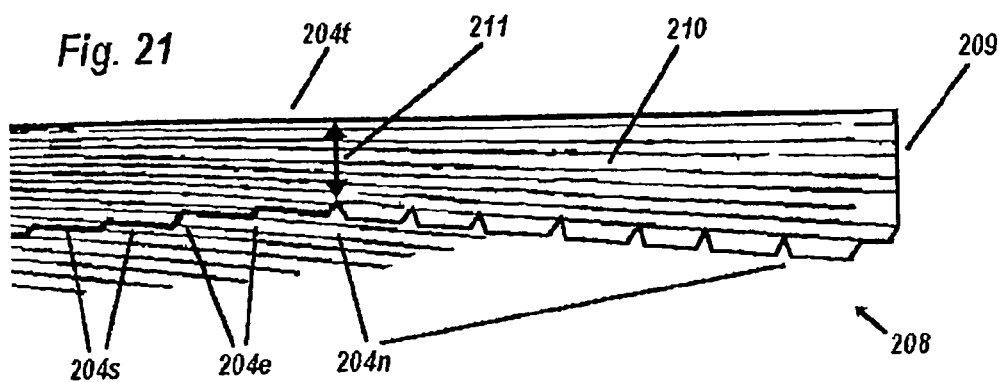
FIG. 21 is a close up of the end tip of a straight-line beam-expander.
Figure 22A:
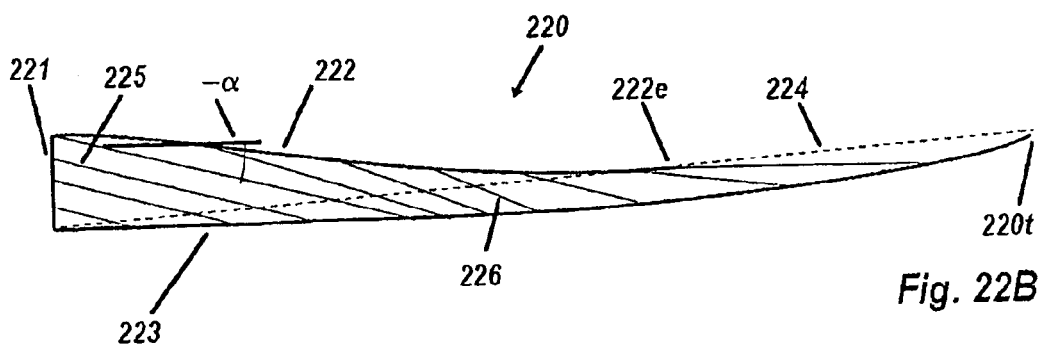
FIGS. 22A, 22B, and 22C show another way to thicken the tip of a beam-expander.
Figure 22B:
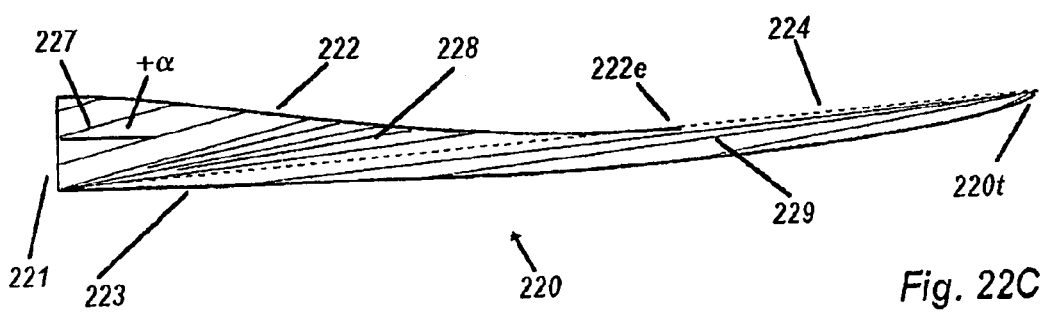

The beam expander thickness tends to zero as the light is extracted. Theoretically, the thickness at the end is that of an ejector, which is nearly zero. This is in general a drawback for plastic injection-moulding technology. Several solutions are available:

a) The last portion of the beam expander is kept at a minimum acceptable value, as with tip 208 of FIG. 20, shown in an expanded side view in FIG. 21. The end 209 of the profile of planar beam expander is finished with an end-reflector, either a coated reflector or a linear retroreflector as surface 86 of FIG. 8D. FIG. 21 shows flow lines 210 as the basis for the design of steps 204s and ejectors 204e of the profile of planar beam expander 204 having straight-line deflector 204t. Minimum thickness 211 is shown, at which point reflectively coated notches 204n begin their line up proceeding to edge reflector 209. The right sides of these notches eject light reflected from end reflector 209. The flowlines 210 will be reflected back to these notches, causing them to eject the same amount of light as ejectors 204e.

b) Another way to avoid the edge thinness in a beam expander is to select two edge ray bundles such that they share a common caustic. When this happens, the caustic becomes a flow line of the beam as well. This flow line is a particular case in which both edge rays are the same and thus a reflecting flow line is not necessary to channel the light beam. FIG. 22a shows a first view of the expander and half of the edge rays establishing the design of beam expander 220, and FIG. 22b shows the other edge rays. Beam expander 220 comprises entrance aperture 221, upper deflector surface 222, and microstructured lower ejector surface 223. Dotted straight line 224 links the bottom edge of the entry aperture with tip 220t of beam expander 220. Deflector surface 222 presently terminates at point 222e, but its profile would be expected to continue along the remainder of dotted line 224, resulting in vanishing thickness at tip 220t. Instead, the profile can be brought higher to preserve thickness, while keeping edge illumination the same. FIG. 22a shows parallel edge rays of bundle 225 entering aperture 221 at limiting angle −α. Another bundle 226 of edge rays is shown, comprising edge rays reflected downward from deflector 222. FIG. 22b shows bundle 227 of edge rays entering aperture 221 at angle +α. Bundle 228 comprises rays issuing from the lower edge of aperture 221, angled above dotted line 224 and below the lowest ray of bundle 227. Bundle 229, below dotted line 224, comprises the rays reaching tip 220t by reflection from the steps (too small to be shown) of microstructured ejector 223. Dotted line 224 is tangent to deflector 222 at point 222e, but it is an edge ray itself, so that past point 222e there are no rays requiring deflection back downward.

Figure 22C:
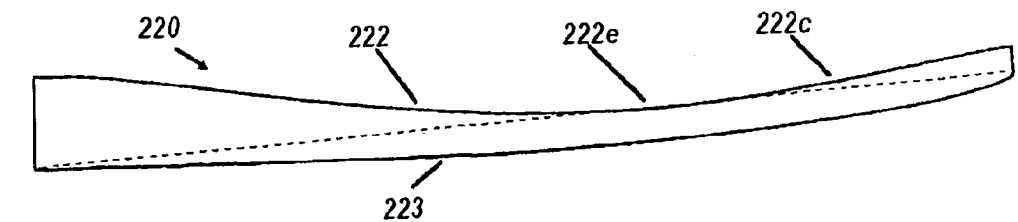
Figure 23:
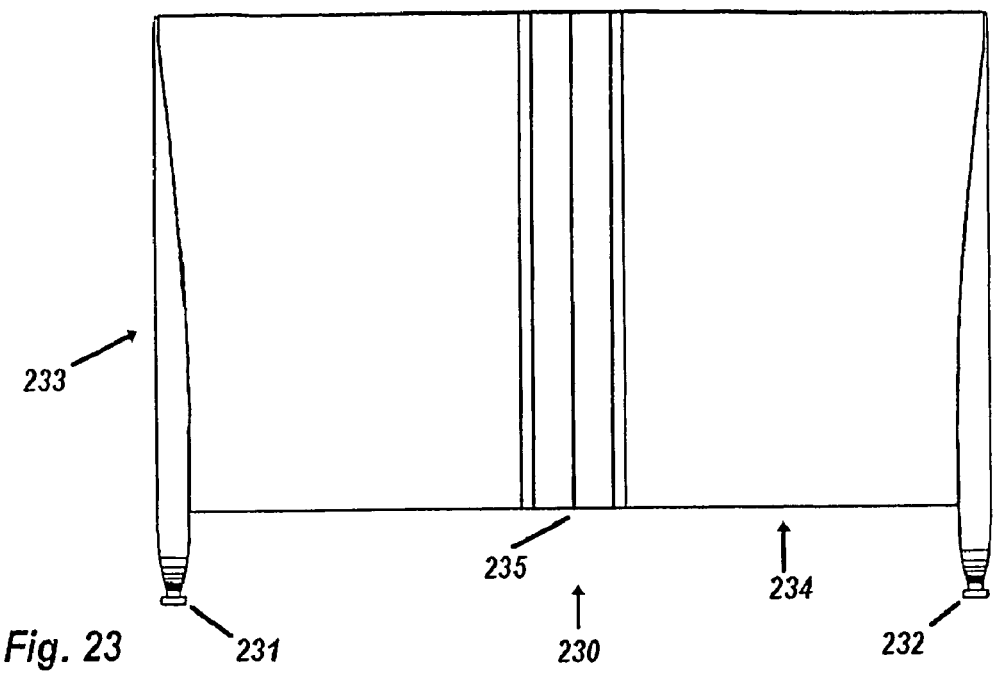
FIG. 23 is a duplex backlight comprising two backlights joined end to end.

Thus the profile of deflector 222 can be completed with any arbitrary curve above dotted line 224, given that it links point 222e and tip 220t. FIG. 22c shows beam expander 220 with upper deflector surface 222 extended by curve 222c, which basically follows the profile of bottom surface 223, in order to preserve thickness.

c) FIG. 23 shows how another beam expander is placed symmetrically with respect to end-reflector 209 of FIG. 21, which is eliminated thereby. Duplex backlight 230 comprises left backlight 233 and right backlight 234, respectively illuminated by LEDs 231 and 232. Their join line 235 corresponds to end-reflector 209 of FIG. 21.

Figure 24:
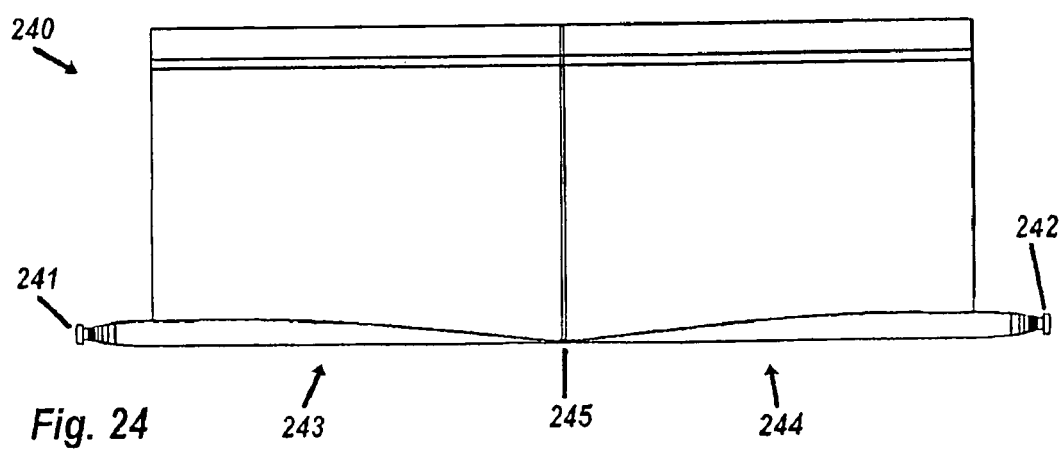
FIG. 24 is a duplex backlight comprising two backlights joined side to side.

Backlights can also be joined side-to-side along the plane of sidewall 205 of FIG. 20. FIG. 24 shows duplex backlight 240, illuminated by LEDs 241 and 242. Left backlight 243 and right backlight 244 join along line 245, through which light can freely pass.

Figure 25:
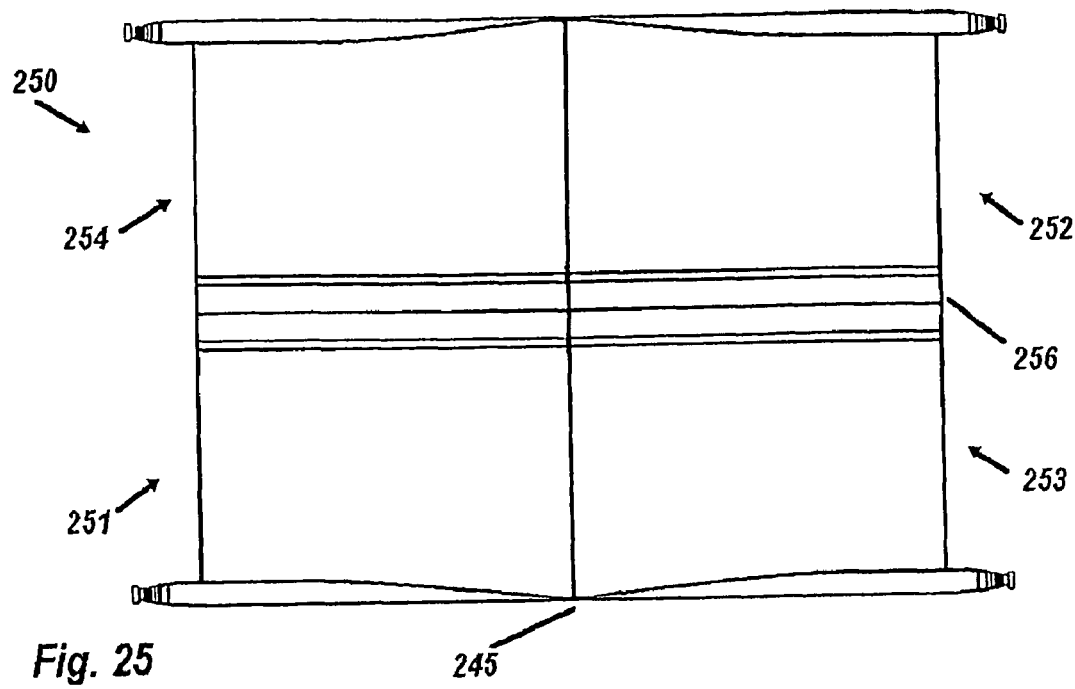
FIG. 25 is a quadruplex backlight.

Finally, these two joinings can be combined to form a quadruplex backlight. FIG. 25 shows quad backlight 240 comprising left-hand backlights 251 and 252 and right-hand backlights 253 and 254. On centerline 255 lie the sides of the backlights, and along centerline 256 lie their ends.

Figure 26:
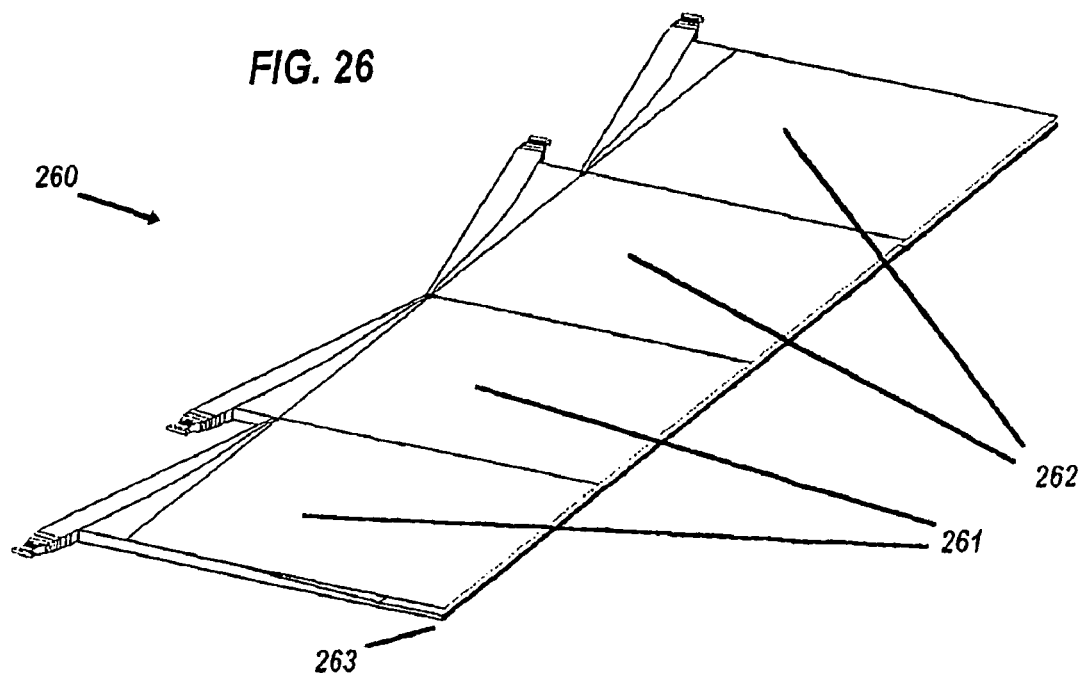
FIG. 26 is another quadruplex backlight.

A different quadruplex backlight can be formed with further side-to-side joinings. FIG. 26 is a perspective view of backlight 260, comprising two identical right-hand backlight modules 261 and two left-hand modules 262. Reflective end line 263 could serve to join two such quadruplex backlights into an 8-fold backlight (not shown). Such a large-scale mosaic capability is unprecedented and useful for produce large-screen LCDs with very high pixel counts. Yield factors make it difficult to keep increasing the pixel count, whereas putting LCDs side to side is less difficult if their addressing lines are properly configured beforehand so as not to preclude uninterrupted pixellation with dark mullions.

The configuration of FIG. 26, however, shows that the individual backlights can only join on three of their edges, since the fourth is taken up by the injectors. It is desirable to have individual backlights that can be joined on any of its four sides, for larger-scale seamless mosaics of uniform planar light sources.

Figure 27:
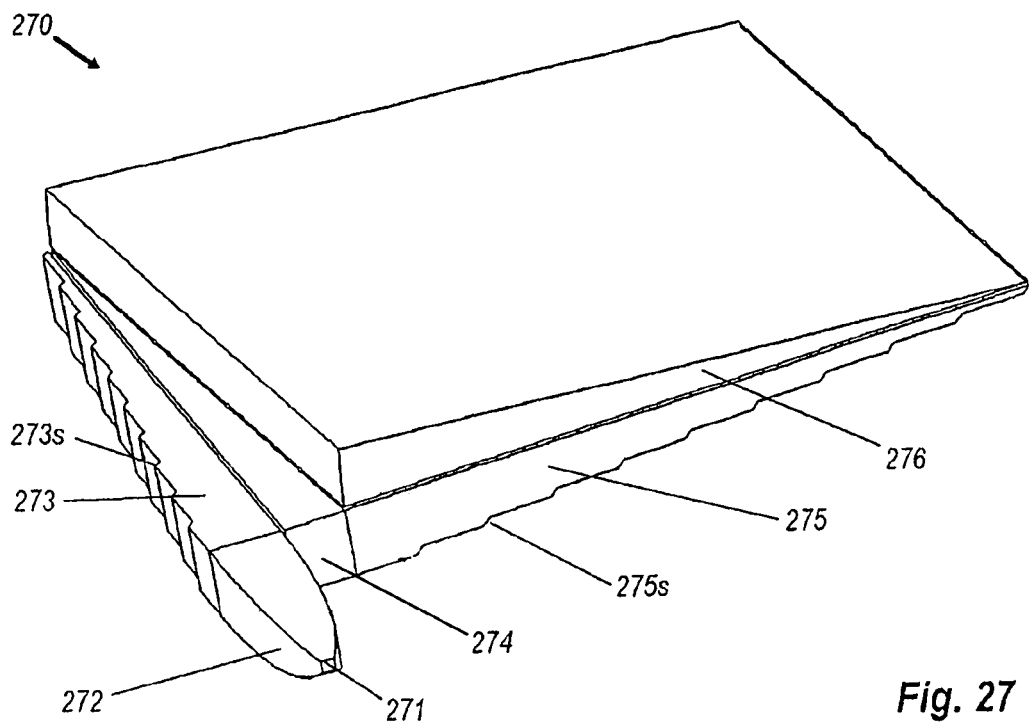
FIG. 27 shows a backlight suitable for seamless mosaics by being open on all four sides.

FIG. 27 shows backlight 270, comprised of optical input port 271 on collimating optic 272, injector 273 (which includes a first beam expander), injector wedge 274, ejector 275 (which includes a second beam expander), and ejector wedge 275. An airgap between injector 273 and injector wedge 274 causes total internal reflection within the body of injector 273 of rays coming from collimator 272. Similarly, an airgap above 275 and below 276 causes total internal reflection within 275, of rays ejected from outer steps 273s of 273. Both of these steps are shown greatly exaggerated in size over, and far fewer in number than, the micro-steps actually used in the backlight.

Figure 28:
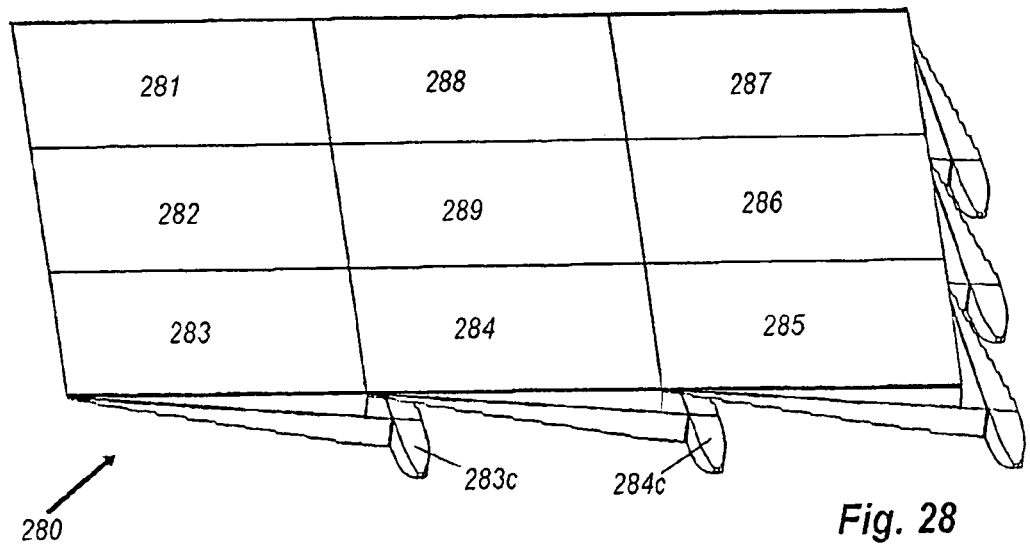
FIG. 28 shows same as so arrayed.

FIG. 28 shows mosaic backlight 280, comprised of individual backlights 281 through 289, each identical to backlight 270 of FIG. 27. These backlights abut each other on all four sides, forming a seamless mosaic thereby. The individual collimators, such as 283c and 284c shown, are disadvantageously not in a common plane, as required for LED sources to share the same circuit board, an important cost consideration.

Figure 29:
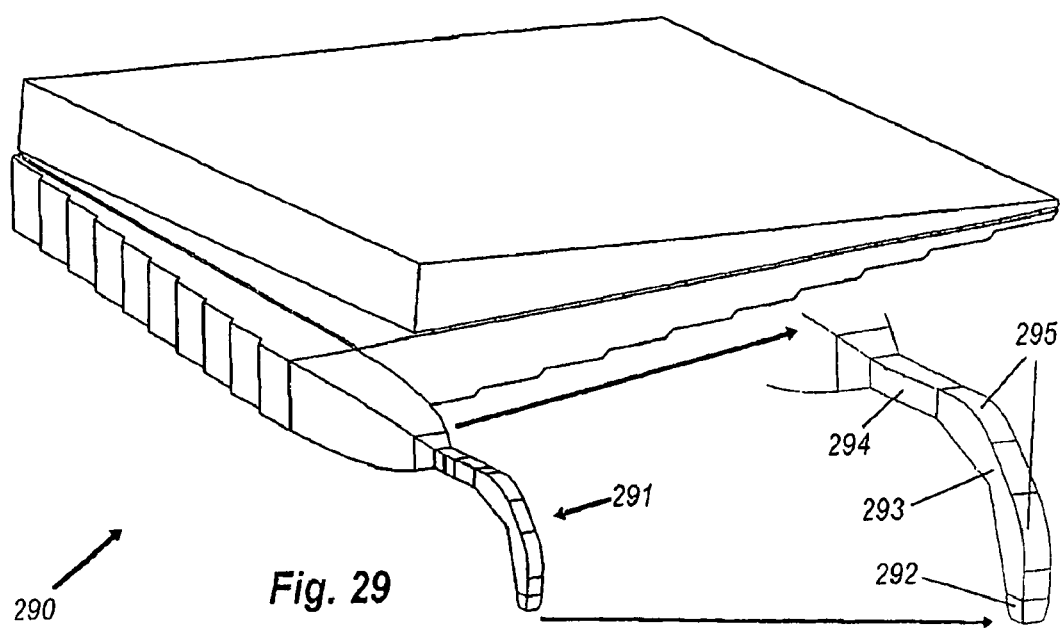
FIG. 29 shows a backlight with an alternative, angle-turning input means.

FIG. 29 shows backlight 290, identical in all respects to backlight 270 of FIG. 27, except for angle-turning device 291, shown magnified at the lower right. It comprises entry CPC 292, turning duct 293, and mixing rod 294. Turning duct 293 is planar on all sides except for parabolic cylinders 295. This technology is disclosed in U.S. Provisional Patent Applications No. 60/658,713 filed Mar. 3, 2005, No. 60/614,565 filed Sep. 29, 2004, No. 60/612,558 filed Sep. 22, 2004, No. 60/564,847 filed Apr. 23, 2004 and U.S. Utility patent application Ser. No. 11/115,055 filed Apr. 25, 2005, which claims priority to these provisional applications, all with the title "Optical Manifold for Light-Emitting Diodes", by the present inventors and is incorporated herewith by reference.

Figure 30:
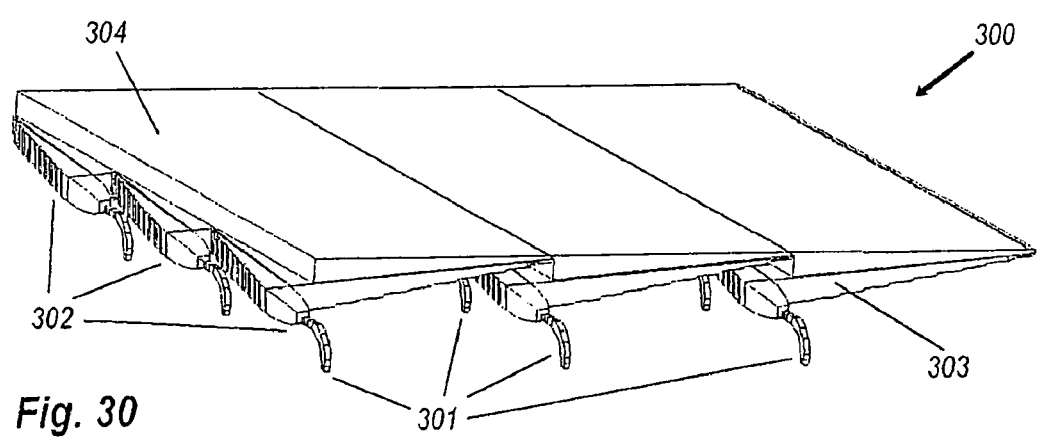
FIG. 30 shows same as arrayed for coplanar inputs.

FIG. 30 shows seamless mosaic backlight 300, comprised of nine modules as shown in FIG. 29. Input ports 301, are advantageously coplanar, enabling the use of a single circuit board (not shown) for the LEDs. Injectors 302, with angle-turning devices as shown in FIG. 29, can be made by injection molding, then be machine-joined to long compression-molded ejectors 303, each serving multiple backlights as a single piece. Similarly, upper ejector wedges 304 extend over multiple backlights.

Figure 31:
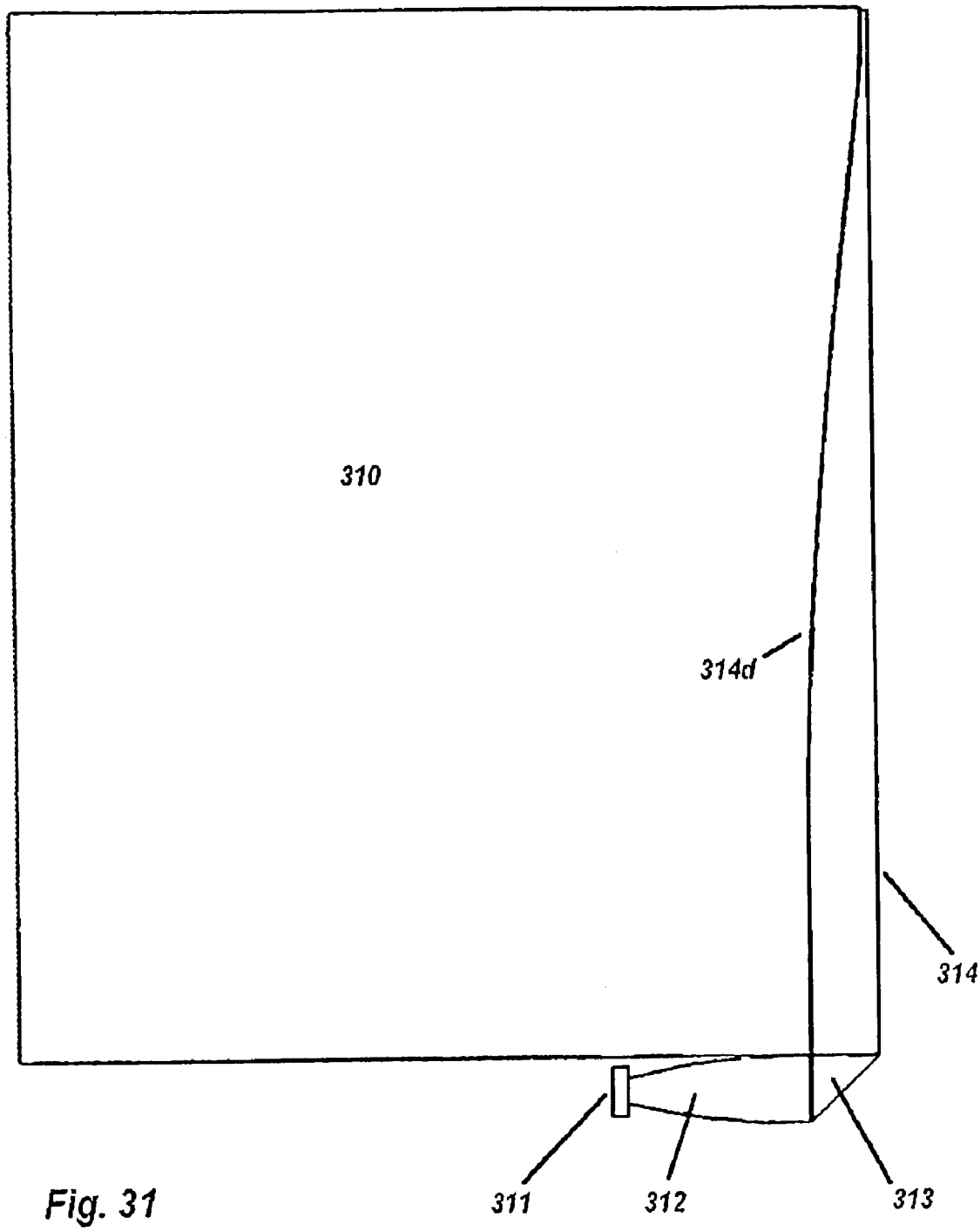
FIG. 31 shows a folding prism in a backlight.

Optical folding can reduce the space occupied by a backlight. FIG. 31 shows collimating backlight 310, in which a prism 313 is used to fold the collimator's output before entering first beam-expander 314. As previously discussed, an index-dropping glue is used along deflector surface 314*d*, as well as at the boundary of prism 313 and first beam-expander 314.

Figure 32:
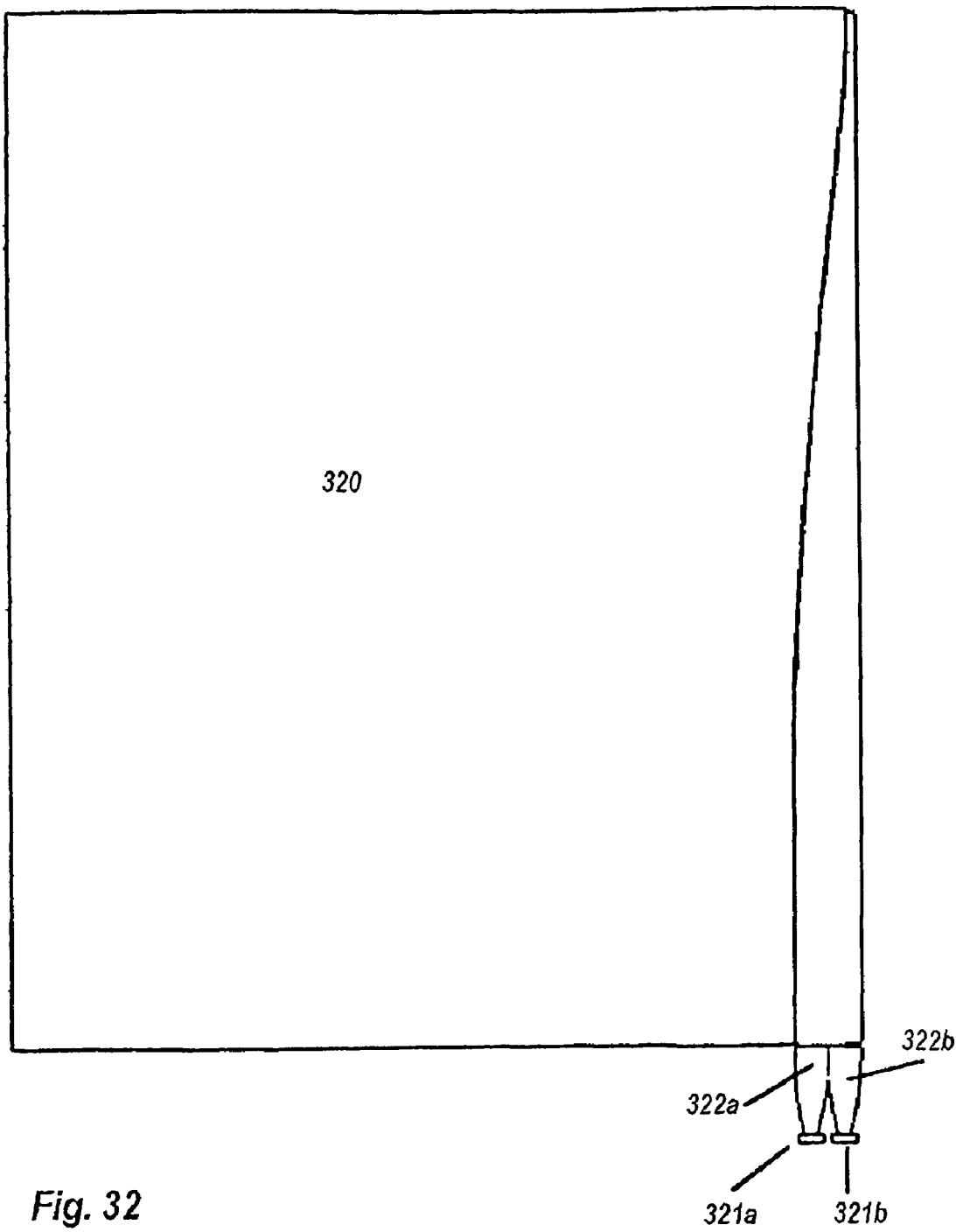
FIG. 32 shows a multiple-LED backlight.

FIG. 32 shows another way of size reduction, while increasing output luminosity (and etendue) as well. Backlight 320 has dual LED sources 321*a* and 321*b*, with respective collimators 322*a* and 322*b*. Not visible would be a possible second pair of LEDs and collimators, just below those shown. This would enable a backlight to be doubled in size (and quadrupled in area) at the same output brightness.

Figure 33:
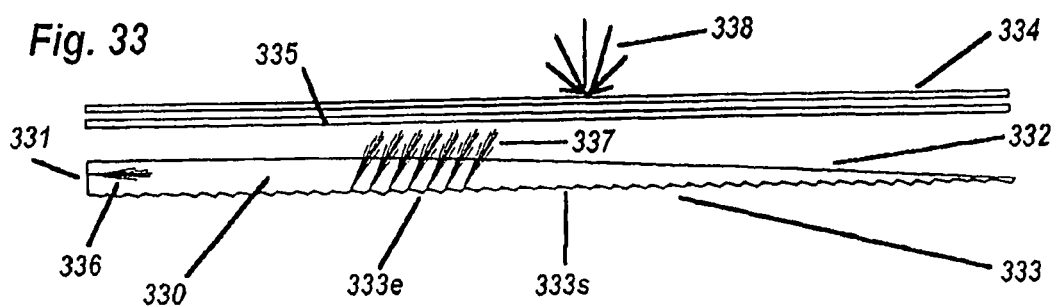
FIG. 33 is a side view of a backlight with a photoluminescent layer.

Regarding diffuser 246 of FIGS. 14D and 14E, there is an alternative to such a diffuser. FIG. 33 is a side view of an ejector beam expander 330, comprising entry aperture 331, upper deflector surface 332, and lower microstructured surface 333 shown with the sizes exaggerated of flow line steps 333*s* and ejectors 333*e*. Light entering aperture 331 is represented by ray fan 336, but unlike previous embodiments with white light propagating within, these are only blue wavelengths, from a blue LED at 453 nm. Blue light exiting backlight 330 is represented by ray fans 337, seen in a pronounced slant from vertical. This enables ejectors 333*e* to operate solely by total internal reflection even for large values of the angular spread, eliminating the abovementioned need to coat mirrors on the ejectors. While such a slanted output is unsuitable for illuminating LCDs, here it illuminates upper photoluminescent layer 334.

Blue-sensitive layer 334 may for example be a large-scale phosphor layer that absorbs some of the blue light 337 and advantageously scatters the rest. Such scattering obtains as long as the high-index phosphor micro-particles composing layer 334 are wavelength size, or micron-scale. So-called nanophosphors, with twenty times smaller phosphor particles, are essentially transparent and thus would not scatter that part of the blue light which they do not absorb. Ray fan 338 represents the white Lambertian emission of a microscale phosphor layer 334. Since such emission occurs equally as much downwards, dichroic filter 335 is positioned below phosphor layer 334 in order to return this white emission to the layer for recycling, which increases luminance over one-sided emission. Dichroic filter 335 would transmit blue wavelengths at the angle of ray-bundle 337, but none of the longer wavelengths produced by phosphor layer 334. Furthermore, filter 335 will reflect all blue light scattered by phosphor 334 into large incidence angles, so that only a small portion of the blue light will not be recycled.

Figure 34:
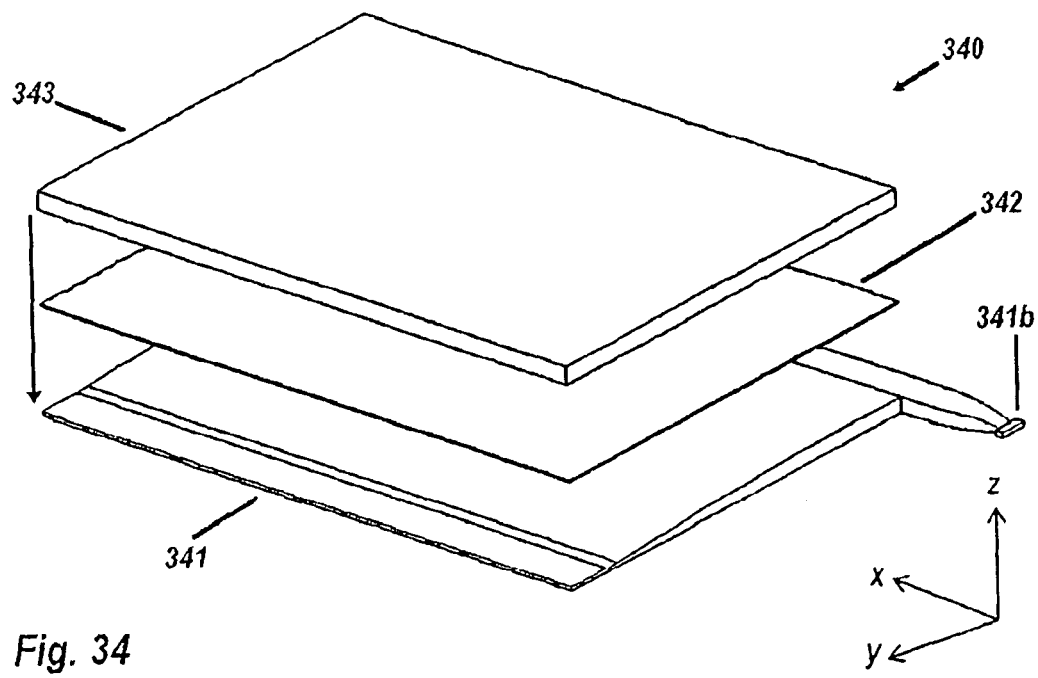
FIG. 34 is a perspective exploded view of a phosphor-equipped backlight.

FIG. 34 is a perspective exploded view of backlight system 340, comprising collimating backlight 341 with blue LED 341*b*, dichroic filter 342, and photoluminescent layer 343. Such a layer would be superior in efficiency, brightness, and uniformity to currently employed fluorescent LCD backlights. The phosphor layer would have to scatter the blue light sufficiently for the unabsorbed blue light to leave the front of the phosphor in all directions, i.e., with Lambertian intensity. Dichroic filter 342 acts to send the backward emission of photoluminescent layer 343 into a forward direction for 'recycling'. Previous Figures showing mosaic backlights would apply equally well to a large phosphor layer, which would be advantageous for large-screen LCD television.

Figure 35:
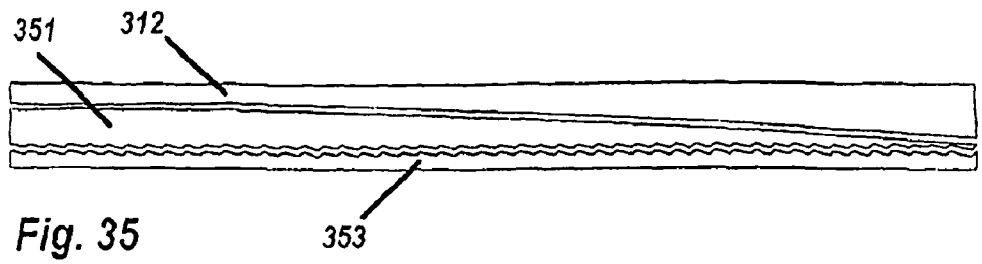
FIG. 35 shows a beam expander with clearers.

In the profile of the lower microstructured surface of these beam expanders, the ejectors occupy only a small part of each facet. This means that the light impinging on the deflector surface or the microstructure surface will in general cross the second beam expander after two refractions. To compensate for them, new elements called clearers can be added on both sides of the second, planar beam expander. The purpose of these elements is to make the second beam expander appear as a completely transparent body. One of the surfaces of the clearer is flat and the other is a copy of the surface whose refraction needs to be cancelled out. FIG. 35 shows a side view of planar beam expander 351, showing the deflector surface-clearer 352 above and microstructured surface-clearer 353 below. As shown, a refractive index gap must be kept between each clearer and the beam expander. The maximum refractive index for the material therebetween is determined by the conditions for TIR for the light inside beam expander 351, but it isn't much below that of the pieces they join.

Figure 36:
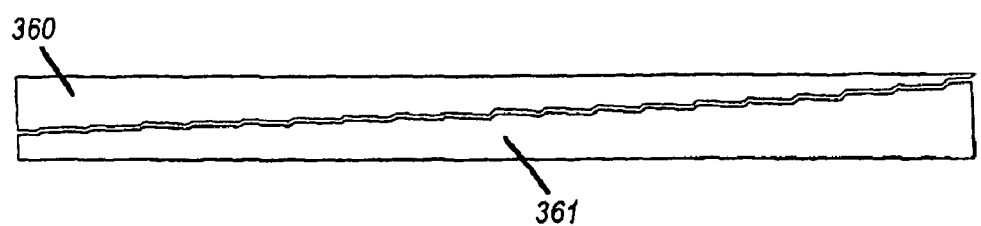
FIG. 36 shows a two-way beam expander.

FIG. 36 shows flat-top beam expander 360 and clearer 361. Flat top 360*u* needs no clearer.

Figure 37:
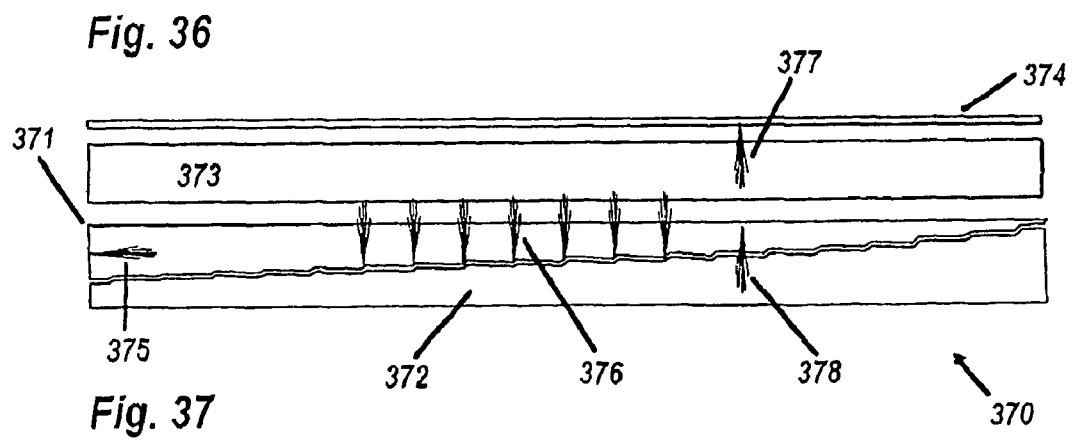
FIG. 37 shows a front light.

FIG. 37 shows how the use of the clearers paves the way for front-lighting. System 370 comprises planar beam expander 371, clearer 372, LCD 373 and back reflector 374 shown at a little remove for clarity. Since the second beam expander plus clearer(s) is transparent to an external viewer, so that the LCD can be seen through the beam expander 371.

Entering ray fan 375 is seen generating output light as shown by bundles 376. Reflected light 377 returns through LCD 373 and thereafter as bundle 378 crosses the portions of the microstructured surface through the gap between the ejectors, where it will suffer a refraction that will be cancelled out by clearer 372.

Without back mirror 374, this front lighting system allows a single LCD to be seen from both sides.

The applications of this front lighting system are not limited to LCDs, since it is also operable for decorative lighting of pictures, paintings, etc.

Figure 38:
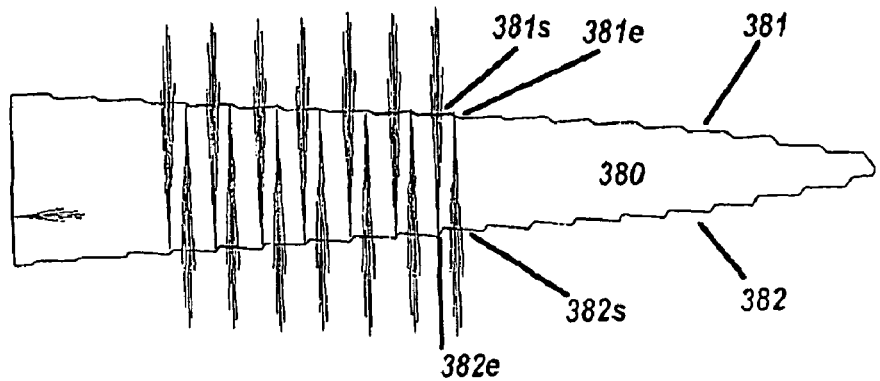
FIG. 38 shows a two-sided beam expander with identical outputs.

FIG. 38 shows how two-sided lighting can be achieved, by beam expander 380 having first and second microstructured surfaces 381 and 382, but no deflector surface. Expander 380 is not totally symmetrical, since the ejectors of both microstructured surfaces must alternate. Thus ejectors 382*e* illuminate opposing steps 381*s*, just as ejectors 382*e* illuminate opposing steps 382*s*.

Figure 39:
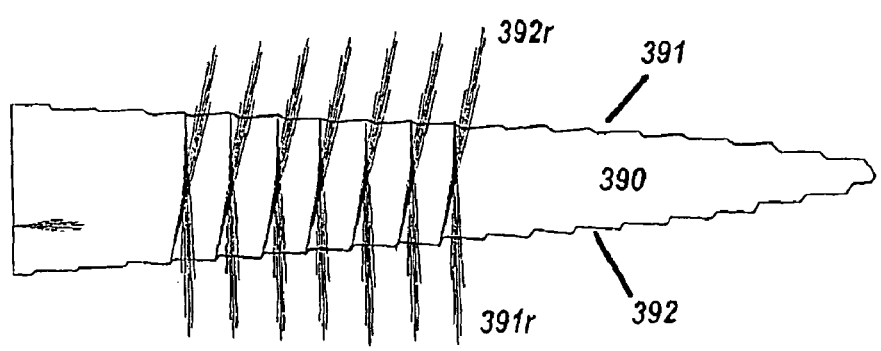
FIG. 39 shows a two-sided beam expander with different outputs.

The ejected beams need not to be in the same direction on both sides of the ejector. FIG. 39 shows beam expander 390 with upper microstructure 391 generating vertical output 391*r* and lower microstructure 392 generating slanted output 392*r*.

Figure 40:
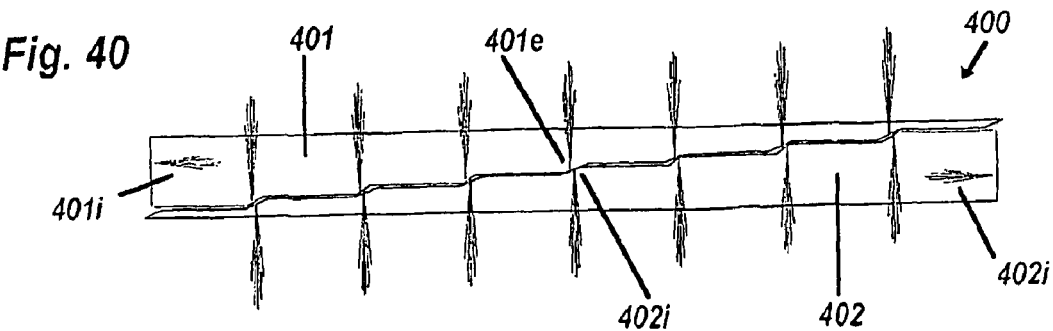
FIG. 40 shows a dual two-sided beam expander.

FIG. 40 is an alternative configuration of a dual beam expander system comprising upper beam expander 401 fed from the left by input rays 401*i* and lower beam expander 402 fed from the right by input rays 402*i*. Ejectors 401*e* are adjacent to ejectors 402*e*, giving complete symmetry between the two expanders.

Figure 41:
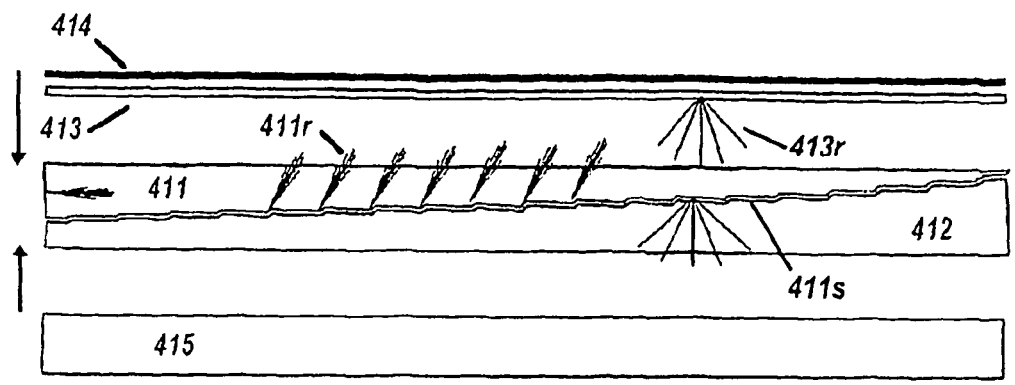
FIG. 41 shows a phosphor-equipped front light.

Front lighting scheme enables a phosphor layer such as 334 in FIG. 33 to be without a dichroic filter (i.e., 335) and still have good efficiency. FIG. 41 is an exploded side view showing such an arrangement, with planar beam expander 411 and clearer 412 below it. Beam expander 411 has its ray output 411*r* directed towards phosphor conversion layer 413, with back-reflector 414 recycling upward-going light so that there are no backscattering losses. Light reflected at the Phosphor 413r crosses the beam expander through the flow line steps 411s to reach LCD 415.

Figure 42:
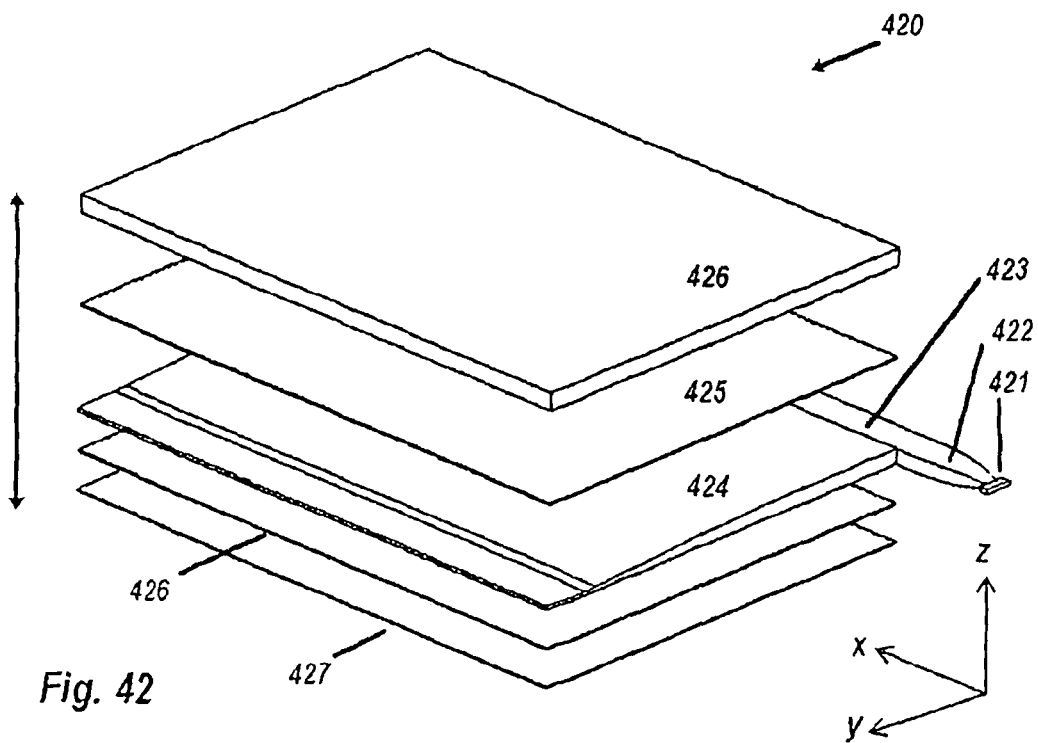
FIG. 42 shows a polarization-recycling backlight.

A see-through system can also be used to recycle polarized light. FIG. 42 is an exploded perspective view of polarization-recycling backlight system 420, comprising LED light source 421, with an injector consisting of a collimator 422, and a first beam expander 423, and an ejector with second beam expander 424, a polarization filter 425 and LCD 426. Filter 425 allows passage of the polarization used by LCD 426 while reflecting the orthogonal polarization back downward through backlight 424 to quarter wave retarder 426 and back reflector 427. This light then returns again through the retarder 426, two passages through which has given this recycled light the proper polarization, significantly enhancing device output and efficiency.

This polarization recycling scheme can also be applied to first beam expander 423 of FIG. 42. Using it thusly requires less area for the reflective polarizer, quarter wave retarder and reflector films, which has obvious advantages, and also allows for either front-lighting or backlighting. FIG. 42 shows only the case in which the polarization-recycling scheme is used in planar beam expander 424, meaning that only backlighting is possible.

The preferred embodiments disclosed so far are configured to illuminate a flat surface, because current liquid crystal displays are rigidly planar. For future conformal displays, some embodiments also have curved output surfaces.

Figure 43:
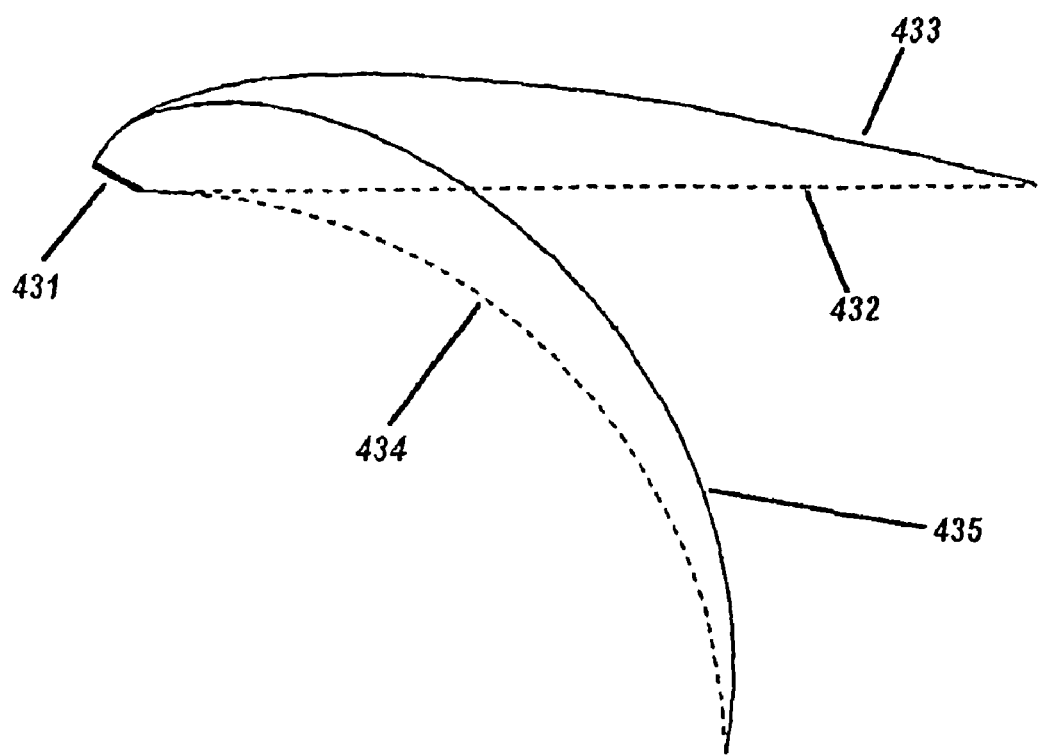
FIG. 43 shows a collimating backlight having an extractor with a curved output surface.

FIG. 43 shows light source 431 feeding two overlaid device profiles. Flat dotted line 432 shows the plane of flow-line ejectors receiving reflected light from CPC profile 433. Dotted line 431 shows the arbitrarily cambered profile of flow-line ejectors receiving reflected light from tailored curve 435 and sending it outwards through line 434.

Figure 44:
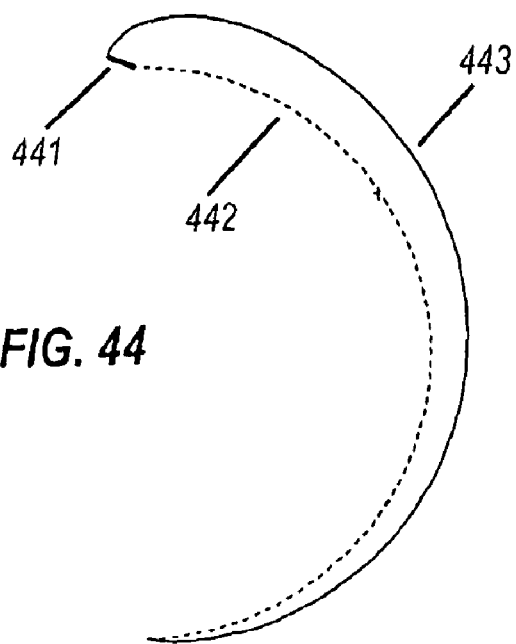
FIG. 44 shows a backlight with a semicircular output surface.

FIG. 44 shows light source 441 and flow-line ejector grooves 442 positioned on a semicircle. Spiral surface 443 reflects light from source 441 onto grooves 442.

Figure 45:
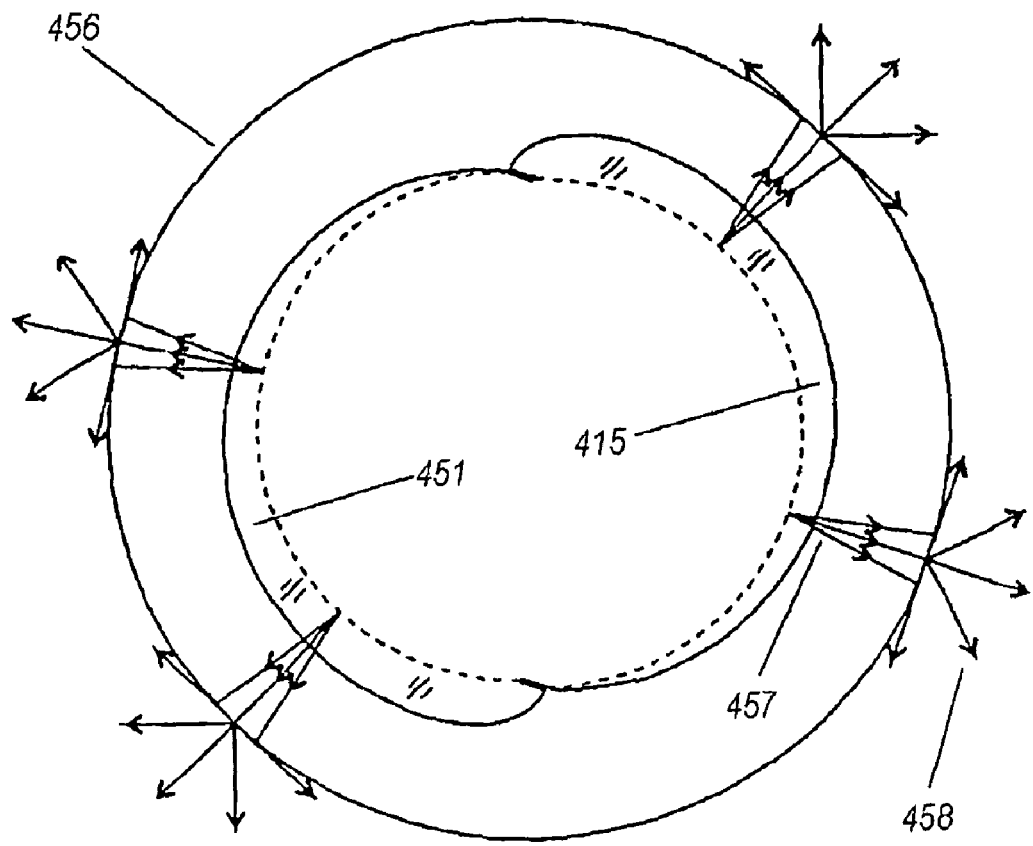
FIG. 45 shows two semicircular backlights formed into a circular light source with full angular output.

FIG. 45 shows semicircular luminaires 451 and 455 positioned to form a complete circle. Surrounding them is cylindrical diffuser 456, positioned so that ejected beamlets 457 are diffused into Lambertian outputs 458.

Some embodiments provide an etendue-limited backlight and/or front-light system with a non-imaging optical injector that are comprised typically of a collimator that receives light from a compact source such as an LED and a beam expander. The injector collimator confines the light to a tight acceptance angle, such as ±15°, while the beam expander has flow-line oriented reflectors that laterally deflect the partially collimated light as it is spread out along its length creating a line-array. This deflected line of light enters a planar waveguide, called an ejector, where it spreads out over its output area (the ejector acts as a beam expander), whence it is ejected upward and outward as a collimated beam, by the ejector faces on the bottom of the waveguide. Substantially all, and in some instances all light within the waveguide is specularly reflected, so that it retains its original luminance. The intermittent ejector faces are smaller than the pixels of the LCD they are illuminating, reducing apparent luminance. This collimated output is more advantageously utilized by an LCD, and wider angles can be achieved by a holographic diffuser a top it.

A better understanding of at least some of the concepts associated with some embodiments may be found in the following references: (1) R. Winston, J. C. Miñano, P. Benítez, "Nonimaging Optics", Elsevier Academic Press, 2004; (2) K. Käläntär, S. Matsumoto, and T. Onishi, "Functional light-guide plate characterized by optical microdeflector and micro-reflector for LCD backlight", IEICE TRANS. ELECTRON., E84-C, 1637-1646 (2001); (3) Di Feng, Yingbai Yan, Xingpeng Yang, Guofan Jin and Shoushan Fan, "Novel light-guide plate for liquid crystal display backlight", J. Opt. A: Pure Appl. Opt., 7, 111-117 (2005); and (4) Di Feng, Guofan Jin, Yingbai Yan, Shoushan Fan, "High quality light guide plates that can control the illumination angle based on micro-prism structures", Applied Physics Letters, 85, 6016-6018 (2004), each of which is incorporated herein by reference.

While the invention herein disclosed has been described by means of specific embodiments and applications thereof, numerous modifications and variations could be made thereto by those skilled in the art without departing from the scope of the invention set forth in the claims. The preceding description includes a best mode of practicing the invention and is not to be taken in a limiting sense, but is made merely for the purpose of describing the general principles of the invention.

What is claimed is:

1. A luminance-preserving non-imaging backlight composed of a transparent dielectric, comprising
a luminous source emitting light out of a bounded aperture that defines a y-z coordinate plane and has a surface normal that defines an x-axis;
an input port receiving said light;
an injector with said input port defining a first y-z boundary and a larger output port defining a second y-z boundary, said injector having an x-y profile that expands away from said input port to said output port, said x-y profile acting via total internal reflection to keep the x-y angular width of the source image inversely proportional to its luminance;
said injector being a surface of revolution with axis on said source and a swept profile that is a first portion of an upper half of a compound parabolic concentrator (CPC) tilted in a negative z direction by its acceptance angle, said sweep profile acting to collimate light in a plane of said swept profile while azimuthally distributing said light along said output port; and
a beam-expanding ejector comprising a planar waveguide in an x-y plane with its y-z boundary optically coupled to said output port of said injector so as to receive light therefrom, said ejector having a smooth upper surface of revolution with a profile that is a remaining portion of said CPC profile of said injector, said ejector having a reflective lower surface comprising microstructured facets of revolution coaxial with said surface of revolution of said upper surface, said facets comprising a face parallel to the flow-lines of said CPC profile and a connecting diagonal face with a tilt that reflects in a upwards z-direction said received light, said tilt of said diagonal face adjusted so that said upwardly reflected light is refracted into a collimated direction common to said facets.

2. A luminance-preserving non-imaging backlight system, comprising
a luminous source emitting light out of a bounded aperture;
a CPC-shaped injector comprising an input port receiving light from said aperture, said CPC-shape injector forming thereof a beam confined to an acceptance angle;
a linear beam-expander comprising a series of microstructured reflective facets each with a face tangent to a local flow-line and another angled to flow-lines of said CPC-shaped injector so as to deflect said light and form a transversely emitting line source; and
a beam-expanding ejector comprising a planar waveguide receiving said deflected light, said beam-expanding ejector comprising a smooth upper surface tangent to the flow-lines of said CPC-shaped injector and a lower surface with facets deflecting received light through said upper surface to form a beam, said lower surface facets comprising a face generally parallel to said flow-lines of said CPC shaped injector and a connecting diagonal face with a tilt that reflects in an upwards z-direction said received light, said tilt of said diagonal face adjusted so that said upwardly reflected light is refracted into a collimated direction common to said lower surface facets.

3. The system of claim 2 wherein said CPC-shaped injector triangular voids aligned with the flow-lines of said CPC-Shaped injector, said CPC-Shaped injector and said beam-expanding ejector being in optical contact.

4. The system of claim 2 wherein said CPC-shaped injector is optically separated from said beam-expanding ejector by an air gap therebetween, and said reflective facets of said linear beam-expander comprise transversely aligned linear facets, each of said facets comprising one face tangent to the flow-lines of said injector and another face tilted to deflect said rays towards said air gap for transmission to said beam-expanding ejector.

5. The system of claim 2 wherein said facets of said lower surface of said beam-expanding ejectors form linear grooves transverse to said deflected light.

6. The system of claim 2 wherein said beam-expanding ejector comprises retro-reflective means on an edge opposite said CPC-shaped injector.

7. The system of claim 2, further comprising:
one or more additional light sources optically coupled with one or more additional injectors.

8. The system of claim 2, further comprising:
a diffuser sheet positioned adjacent said beam-expanding ejector.

9. The system of claim 2 wherein said generally parallel faces of said lower surface facets are tilted so as to be unilluminated.

10. The system of claim 2, further comprising:
an uppermost block of transparent material, with planar upper surface and lower surface conformal to said upper surface of said beam-expanding ejector, and a layer of lower-index transparent material positioned therebetween.

11. The system of claim, 2 further comprising:
a lowermost block of transparent material, with planar lower surface and upper surface conformal to said lower faceted surface of said beam-expanding ejector, and a layer of lower-index transparent material positioned therebetween.

12. The system of claim 2 further comprising:
a planar reflector positioned proximate said lower surface of said beam-expanding ejector;
a quarter-wave plane positioned between said planar reflector and said lower surface of said beam-expanding elector; and
a polarization-recycling reflector positioned proximate said upper surface of said beam-expanding ejector.

13. The system of claim 2 further comprising:
an additional cooperated CPC-shaped injector, linear beam-expander and beam-expanding ejector arranged such that the upper surface of beam-expanding ejector and the upper surface of the additional beam-expanding ejector are fussed into a single block with two-sided emission.

14. A luminance-preserving non-imaging backlight composed of a transparent dielectric, comprising:
a luminous source emitting light out of a bounded aperture that defines a y-z coordinate plane and has a surface normal that defines an x-axis;
an input port receiving said light;
an injector with said input port defining one y-z boundary and a larger output port defining another boundary, said output port being angled between the y-z plane and the x-y plane, said injector having a CPC-shaped x-y profile that expands away from said input port to said output port, said x-y profile acting via total internal reflection to confine said light to a transverse acceptance angle, said injector comprising an x-z profile of a slab with a CPC coupled to said light source; and
a quarter-cylindrical turning prism bonded to said output port of said injector;
an upper, beam-expanding ejector positioned adjacent said injector and separated therefrom by an air gap, said beam-expanding ejector with an input port optically coupled to said turning prism, said beam-expanding ejector having a lower face that is diffusely reflecting.

15. The system of claim 14 wherein said beam-expanding ejector also comprises an upper surface that is a transversely swept CPC profile, and further comprises an upper prism block with planar upper surface, and a lower surface comprising a transversely swept CPC profile forming an air gap with said CPC profile upper surface of said beam-expanding ejector.

16. A luminance-preserving non-imaging backlight comprising:
an air-filled injector comprising reflective walls surrounding a bounded input aperture and expanding outward therefrom to a larger exit port, where the bounded input aperture defines a y-z coordinate plane and has a surface normal that defines an x-axis;
a z-axis cylindrical lens filling said exit port;
a y-axis cylinder optically attached to said z-axis cylindrical lens on a lower z-half of a y-z cross-section of said z-axis cylindrical lens; and
a planar beam-expanding ejector optically attached to an upper z-half of the y-z cross-section of said z-axis cylindrical lens.

17. A luminance-preserving non-imaging backlight system. comprising:
a first CPC-shaped injector comprising an input port receiving light from a source, said CPC shape forming thereof a beam confined to an acceptance angle;
a first linear beam-expander comprising a series of microstructured reflective facets each comprising one face tangent to a local flow-line field and another face angled to flow-lines of said first CPC-shaped injector so as to turn said light and farm a transversely emitting line source;
a first beam-expanding ejector comprising a cambered waveguide receiving said light of said transversely emitted line source, said first beam-expanding ejector comprising a smooth upper surface tangent to the flow-lines of said first CPC-shaped injector and a lower surface with facets deflecting light through said upper surface to form a planar collimated beam, said facets comprising a face generally parallel to said flow-lines and a connecting diagonal face with a tilt that reflects said received light in the radially outward direction;
a first backlight comprising the CPC-shaped injectors, linear beam-expanders and beam-expanding ejectors; and second, third and fourth backlights each respectively comprising cooperated CPC-shaped injectors, linear beam-expanders and beam-expanding ejectors, such that the first, second, third and fourth backlights are arranged so that said cambered ejectors of each of said first, second, third and fourth backlights monolithically form a complete annulus.

18. The backlight system of claim 17, further comprising: diffusing means positioned proximate an outer circumference of said cambered first ejector.

\* \* \* \* \*